US011590577B2

(12) United States Patent
Hsu et al.

(10) Patent No.: US 11,590,577 B2
(45) Date of Patent: Feb. 28, 2023

(54) ACOUSTIC-ENERGY BASED MATERIAL DEPOSITION AND REPAIR

(71) Applicant: Ivaldi Group, Inc., San Leandro, CA (US)

(72) Inventors: Keng Hsu, Louisville, KY (US); Anagh Deshpande, Louisville, KY (US)

(73) Assignee: Ivaldi Group, Inc., San Leandro, CA (US)

( * ) Notice: Subject to any disclaimer, the term of this patent is extended or adjusted under 35 U.S.C. 154(b) by 0 days.

(21) Appl. No.: 17/045,716

(22) PCT Filed: Apr. 3, 2019

(86) PCT No.: PCT/US2019/025654
§ 371 (c)(1),
(2) Date: Oct. 6, 2020

(87) PCT Pub. No.: WO2019/195470
PCT Pub. Date: Oct. 10, 2019

(65) Prior Publication Data
US 2021/0362235 A1     Nov. 25, 2021

Related U.S. Application Data

(60) Provisional application No. 62/787,117, filed on Dec. 31, 2018, provisional application No. 62/654,135, filed on Apr. 6, 2018.

(51) Int. Cl.
*B22F 10/25* (2021.01)
*B33Y 30/00* (2015.01)
(Continued)

(52) U.S. Cl.
CPC .............. *B22F 10/25* (2021.01); *B22F 10/38* (2021.01); *B22F 12/90* (2021.01); *B33Y 30/00* (2014.12); *B33Y 50/02* (2014.12)

(58) Field of Classification Search
CPC .......... B22F 10/25; B22F 10/38; B22F 12/90; B33Y 30/00; B33Y 50/02
See application file for complete search history.

(56) References Cited

U.S. PATENT DOCUMENTS

| | | |
|---|---|---|
| 6,244,498 B1 | 6/2001 | Jiang et al. |
| 6,511,898 B1 | 1/2003 | Sonderman et al. |

(Continued)

FOREIGN PATENT DOCUMENTS

| | | |
|---|---|---|
| JP | 2013063521 A | 4/2013 |
| WO | WO-2016202954 A1 | 12/2016 |

(Continued)

OTHER PUBLICATIONS

CH 431 Inorganic Chemistry Upper Division Inorganic Chemistry (Year: 2015).*

(Continued)

*Primary Examiner* — Timothy Kennedy
*Assistant Examiner* — Farah Taufiq
(74) *Attorney, Agent, or Firm* — Schwegman Lundberg & Woessner, P.A.

(57) ABSTRACT

Various embodiments include an acoustic-energy deposition and repair system that includes at least one Directed Acoustic Energy Deposition (DAED) tool configured to apply acoustic energy to feedstock material in at least one of three vibrational modes; and a drive system to move the DAED tool in at least one of three-coordinate positions. In various examples, the acoustic-energy deposition and repair system further includes at least one in-situ metrology tool mounted proximal to the DAED tool to measure a grain size of deposited material. Other methods, devices, apparatuses, and systems are disclosed.

11 Claims, 31 Drawing Sheets

(51) Int. Cl.
B33Y 50/02 (2015.01)
B22F 12/90 (2021.01)
B22F 10/38 (2021.01)

(56) References Cited

U.S. PATENT DOCUMENTS

| | | | |
|---|---|---|---|
| 6,814,823 | B1 | 11/2004 | White |
| 6,995,498 | B2 | 2/2006 | Wallaschek et al. |
| 2007/0257086 | A1 | 11/2007 | Schroeder |
| 2010/0040903 | A1 | 2/2010 | Kalt et al. |
| 2017/0113405 | A1 | 4/2017 | Gandhi |
| 2017/0252976 | A1* | 9/2017 | Braunschweig ....... B33Y 50/02 |
| 2017/0259498 | A1* | 9/2017 | Stevens ................. B29C 64/209 |
| 2018/0185955 | A1* | 7/2018 | Hsu ........................ B33Y 10/00 |

FOREIGN PATENT DOCUMENTS

| WO | WO-2017035442 A1 | 3/2017 |
|---|---|---|
| WO | WO-2019195470 A1 | 10/2019 |

OTHER PUBLICATIONS

"International Application Serial No. PCT/US2019/025654, International Search Report dated Jul. 19, 2019", 4 pgs.
"International Application Serial No. PCT/US2019/025654, Written Opinion dated Jul. 19, 2019", 11 pgs.
"European Application Serial No. 19780960.1, Extended European Search Report dated Oct. 1, 2021", 107 pgs.
"International Application Serial No. PCT US2019 025654, International Preliminary Report on Patentability dated Oct. 15, 2020", 13 pgs.
Abdullah, Amir, "Theoretical and experimental analyses of ultrasonic-assisted indentation forming of a tube", Journal of Engineering Manufacture, vol. 228, No. 3, (2014), 388-398.
Amini, Saeid, "An investigation of conventional and ultrasonic-assisted forming of annealed AA1050 sheet", Internation Journal of Advanced Manufacturing Technology, (2016), 1569-1578.
Blum, W, "Geometric dynamic recrystallization in hot torsion of Al—5Mg—0.6Mn", Materials Science and Engineering A, vol. 205, (1996), 23-30.
Deshpande, Anagh, "Acoustic energy enabled dynamic recovery in aluminium and its e?ects on stress evolution and post-deformation microstructure", Materials Science and Engineering A 711, (2018), 62-68.
Deshpande, Anagh, "Acoustoplastic Metal Direct-write: Towards Solid Aluminum 3D Printing in Ambient Conditions", Additive Manufacturing, vol. 19, (2018), 73-80.
Hadadzadeh, A, "A New Grain Orientation Spread Approach to Analyze the Dynamic Recrystallization Behavior of a Cast-Homogenized Mg—Zn—Zr Alloy using Electron Backscattered Diffraction", Materials Science and Engineering A, vol. 709, pp. 285-289, (2018), 14 pgs.
Harman, George, "The Ultrasonic Welding Mechanism as Applied to Aluminum- and Gold-Wire Bonding in Microelectronics", IEEE Transaction on Parts, Hybrids, and Packaging vols. PHP-13, No. 1, (Dec. 1977), 406-412.
Huang, K, "A review of dynamic recrystallization phenomena in metallic materials", Materials and Design, vol. 111, (2016), 548-574.
Ji, Hongjun, "Nano features of Al Au ultrasonic bond interface observed by high resolution transmission electron microscopy", Materials Characterization, vol. 59, (2008), 1419-1424.
Kelly, Gregory, "A model to characterize acoustic softening during ultrasonic consolidation", Journal of Materials Processing Technology, vol. 213, (2013), 1835-1845.
Koellhoffer, Steve, "Role of friction on the thermal development in ultrasonically consolidated aluminum foils and composites", Journal of Materials Processing Technology, vol. 211, No. 11., (Nov. 2011), 1864-1877.
Langenecker, B, "Effects of Ultrasound on Deformation Characteristics of Metals", IEEE Transasction on Sonics and Ultrasonics, vols. SU-13, No. 1,, (Mar. 1966), 1-8.
Li, Junhui, "Theoretical and experimental analyses of atom diffusion characteristics on wire bonding", Journal of Physics D: Applied Physics, vol. 41, (2008), 1-4.
Liu, Guanpeng, "Microstructure and Mechanical Properties of Ultrasonic Welded Joint of 1060 Aluminum Alloy and T2 Pure Copper", Metals 7, (2017), 361-371.
MacWan, A, "Microstructure and mechanical properties of ultrasonic spot welded copper-to-magnesium alloy joints", Materials and Design, vol. 84, pp. 261-269, 2015., (2015), 261-269.
Mariani, E, "Microstructure evolution of 6061 O Al alloy during ultrasonic consolidation: An insight form electron backscatter diffraction", Acta Materialia, vol. 58, (2009), 2492-2503.
McQueen, H J, "Dynamic recrystallization: plasticity enhancing structural development", Journal of alloys and compounds, vol. 378, (2004), 35-43.
McQueen, H J, "Sub-grain development in hot working of Al and Al—5Mg", Materials Science and Engineering A234-236, (1997), 830-833.
McQueen, H J, "Hot Deformation and Processing of Aluminum Alloys", CRC Press, (2011), 597 pgs.
Peng, He, "Microstructure and Mechanical Properties of an Ultrasonic Spot Welded Aluminum Alloy: The Effect of Welding Energy", Materials, vol. 10, (2017), 449-464.
Rusinko, A, "Analytical description of ultrasonic hardening and softening", Ultrasonics, vol. 51, (2011), 709-714.
Sakai, Taku, "Dynamic and post-dynamic recrystallization under hot, cold and severe plastic deformation conditions", Progress in Materials Science, 60, (2014), 130-207.
Siddiq, A, "Thermomechanical analyses of ultrasonic welding process using thermal and acoustic softening effects", Mechanics of Materials, vol. 40, (2008), 982-1000.
Sietins, J, "Transmission electron microscopy of an ultrasonically consolidated copper-aluminum interface", Journal of Materials Research, vol. 29, No. 17, (2014), 1970-1977.
Siu, K W, "New insighton acoustoplasticity-Ultrasonic irradiation enhances sub-grain formation during deformation", International Journal on Plasticity, vol. 27, (2011), 788-800.
Van Geertruyden, William, "Grain structure evolution in a 6061 aluminum alloy during hot torsion", Materials Science and Engineering A, vol. 419, (2006), 105-114.
Wusatowska-Sarnek, Agnieszka, "The New Grain Formation During Warm and Hot Deformation of Copper", Journal of Engineering Materials and Technology, vol. 127, (2005), 295-300.
Yang, C, "Titanium wire drawing with longitudinal-torsional composite ultrasonic vibration", International Journal of Advanced Manufacturing Technology, vol. 83., (2016), 645-655.
Yao, Zhehe, "Acoustic softening and residual hardening in aluminum: Modeling and experiments", International Journal of Plasticity, vol. 39, (2012), 75-87.
Zhang, C, "Microstructural characterization and mechanical properties of high power ultrasonic spot welded aluminum alloy AA6111—TiAl6V4 dissimilar joints", Materials Characterization 97, (2014), 83-91.
Zhong, Y B, "Effect of ultrasonic vibration on welding load, temperature and material flow in friction stir welding", Journal of Materials Processing Technology, vol. 239, (2017), 273-283.
Zhou, H, "A comparative study of mechanical and microstructural characteristics of aluminium and titanium undergoing ultrasonic assisted compression testing", Materials Science and Engineering A, vol. 682, (2017), 376-388.
"European Application Serial No. 19780960.1, Response filed Apr. 27, 2022 to Extended European Search Report dated Oct. 1, 2021", 22 pgs.

* cited by examiner

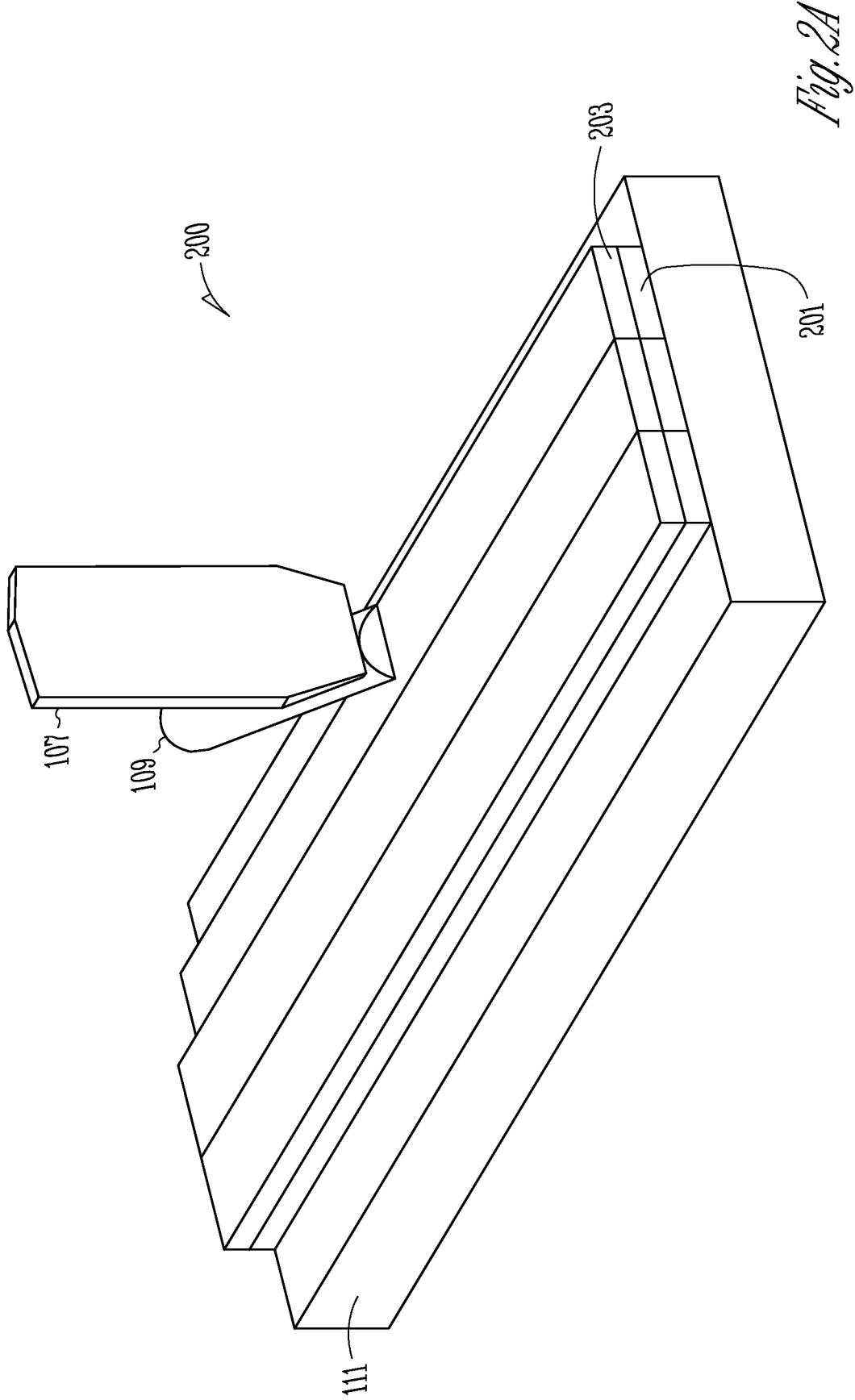

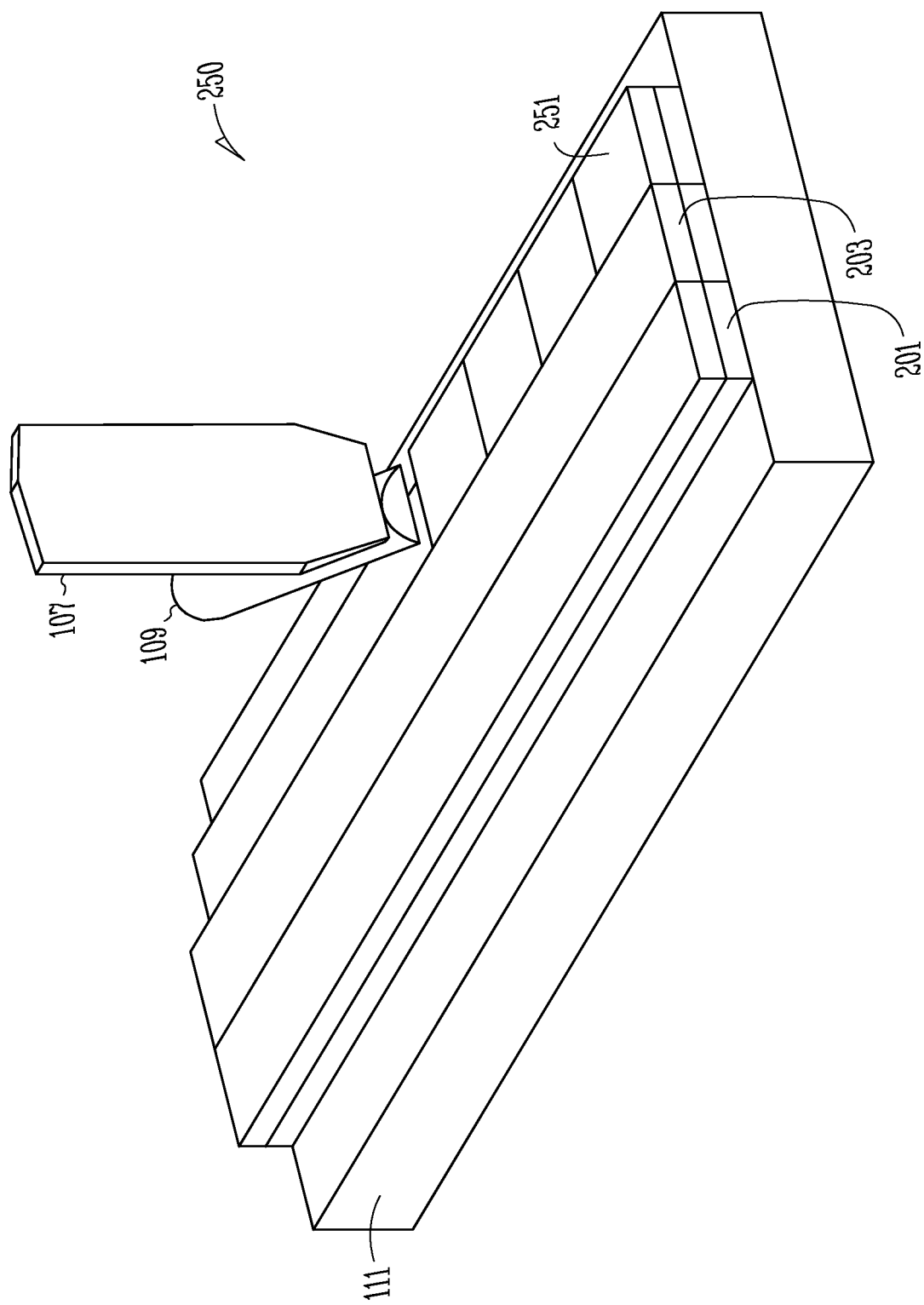

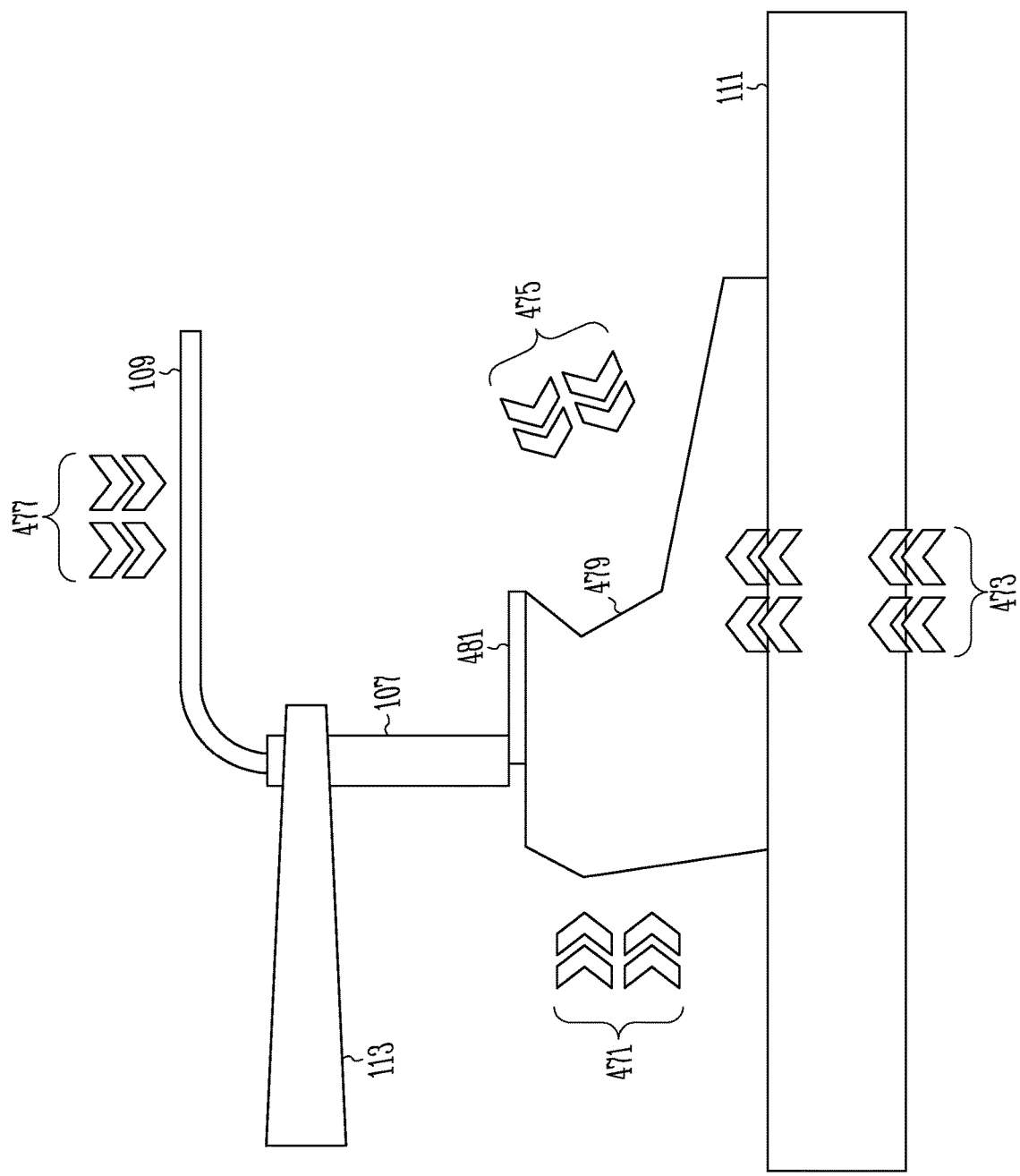

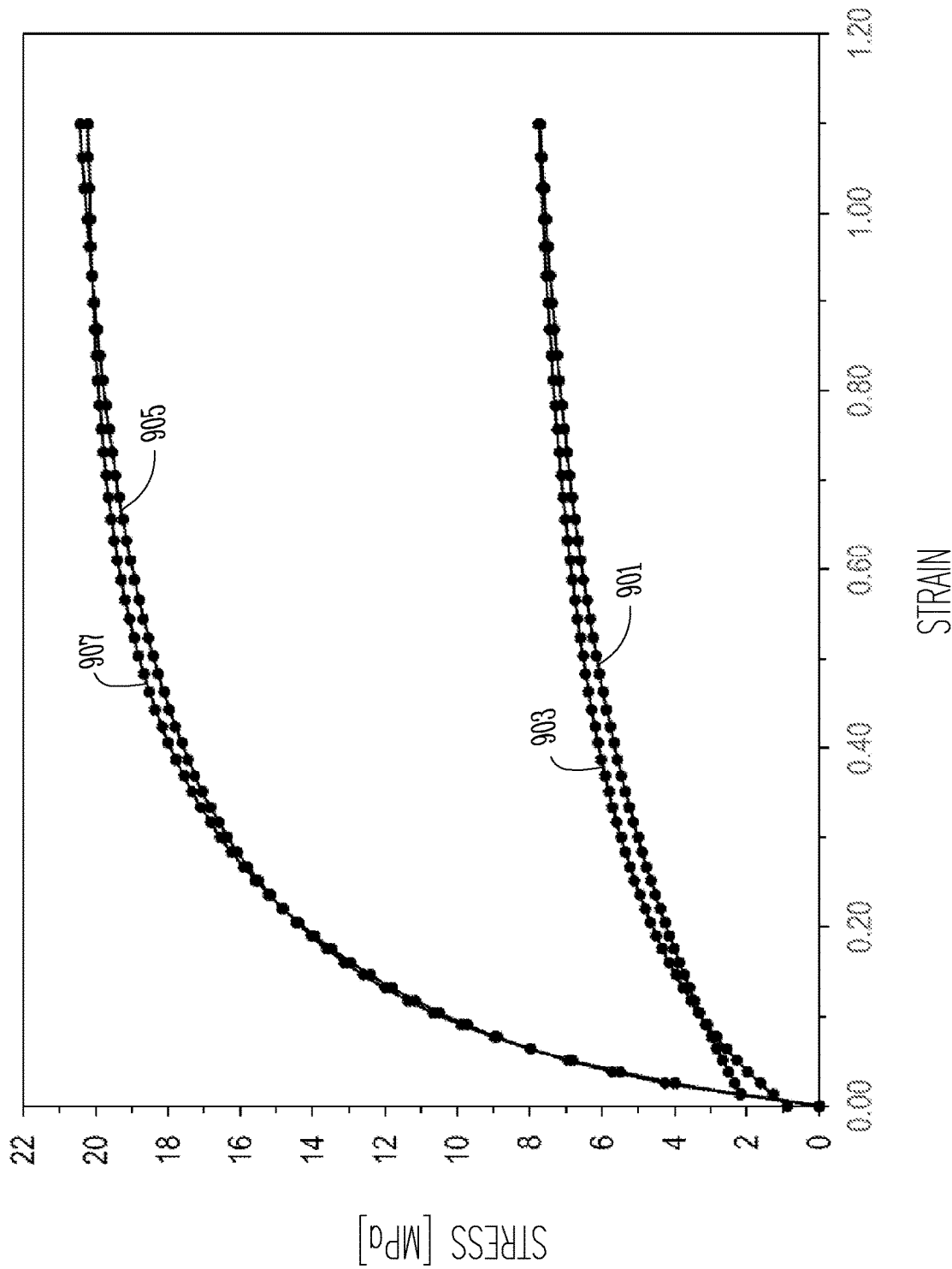

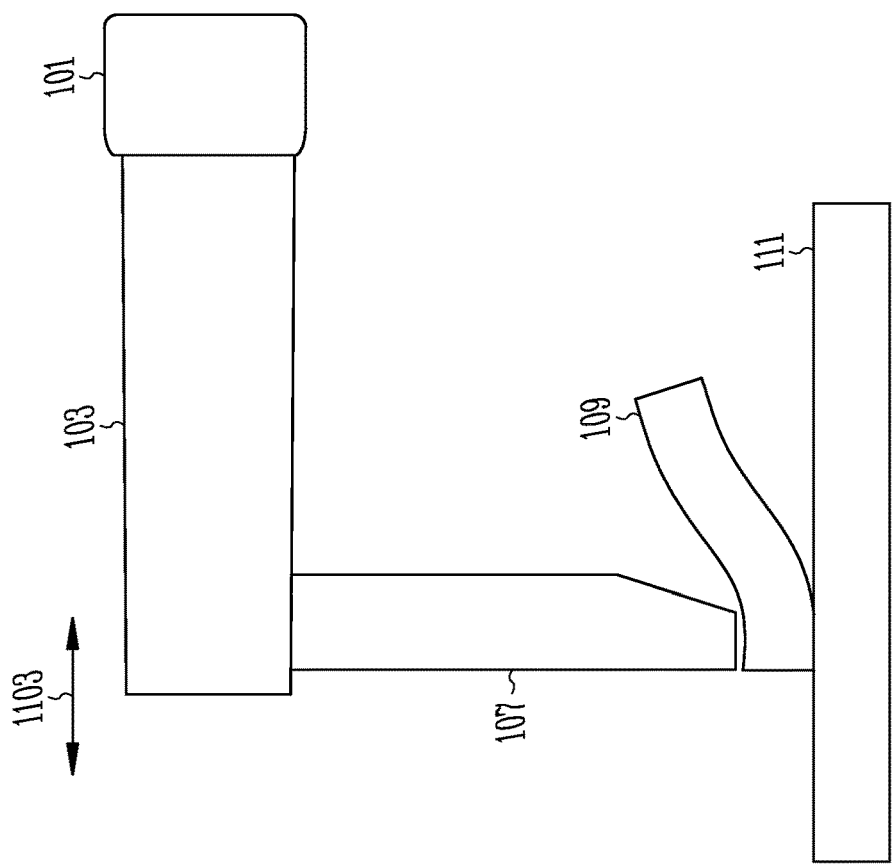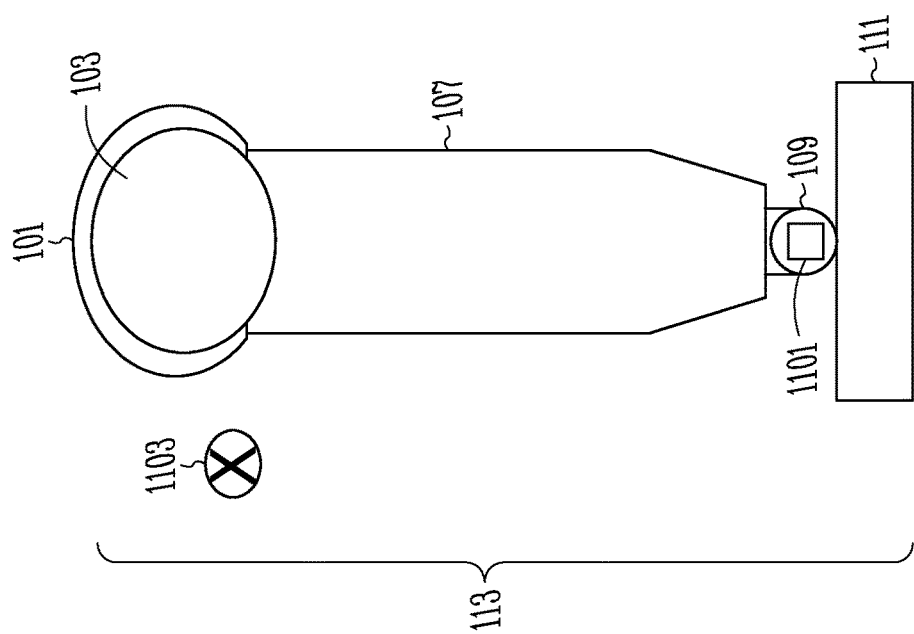

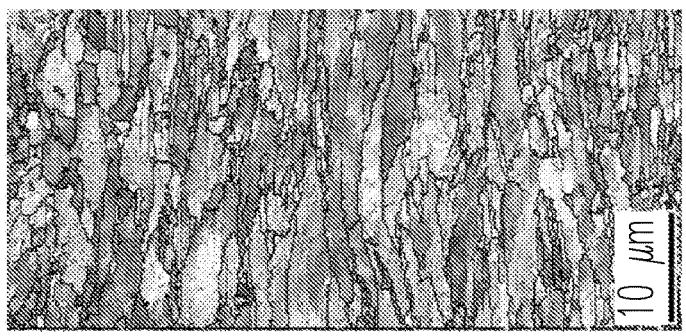
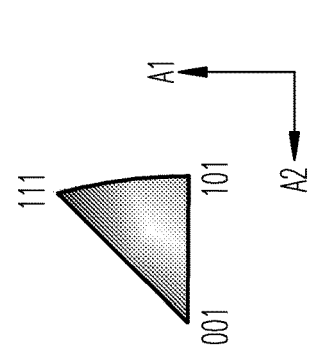
Fig. 12E
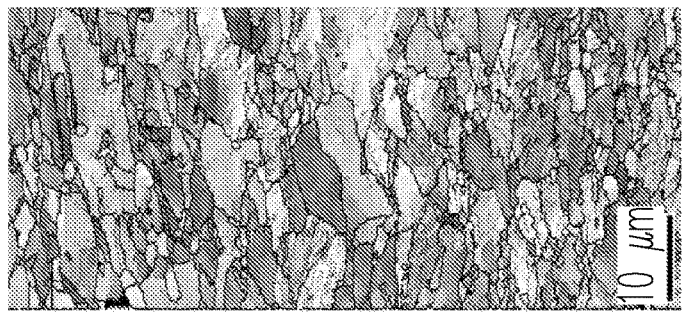
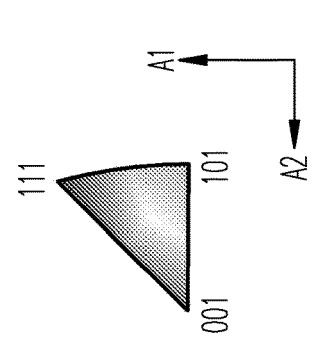
Fig. 12D
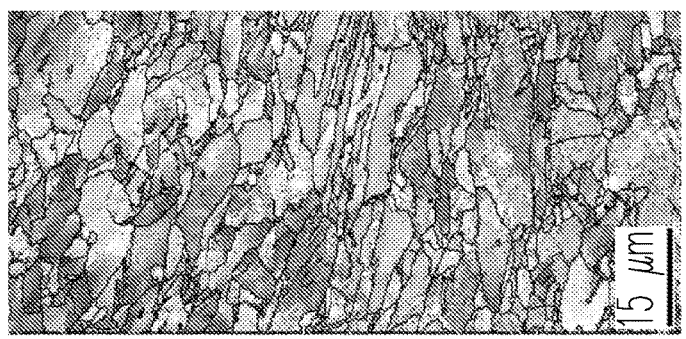
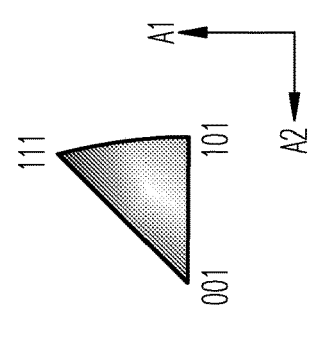
Fig. 12C
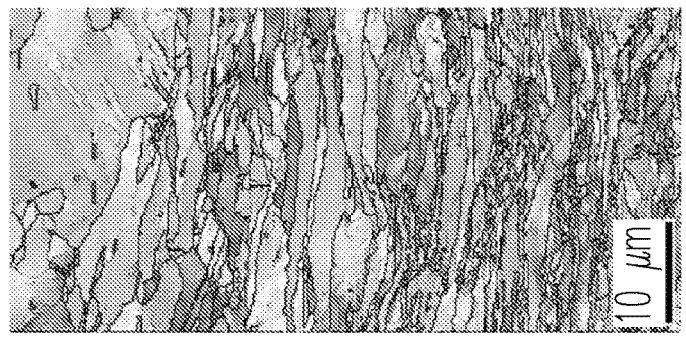
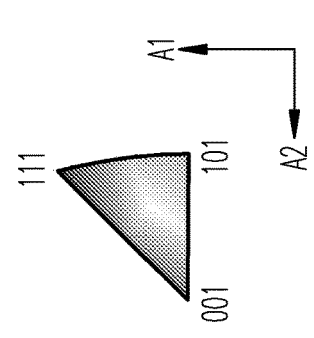
Fig. 12B
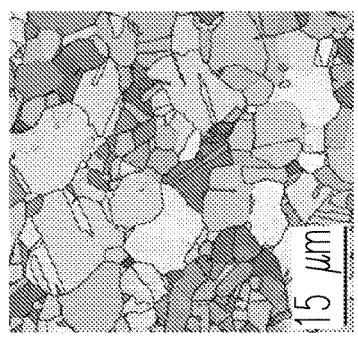
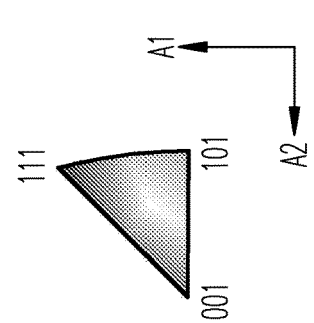
Fig. 12A

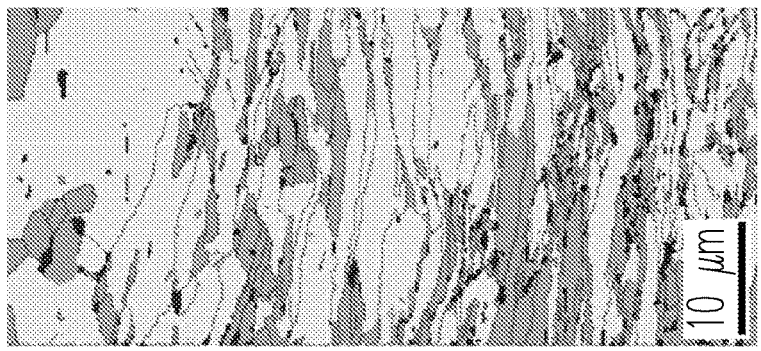
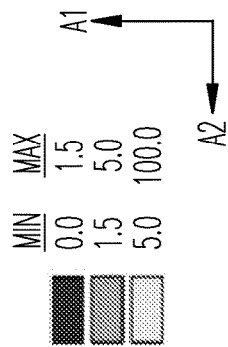
Fig. 13A
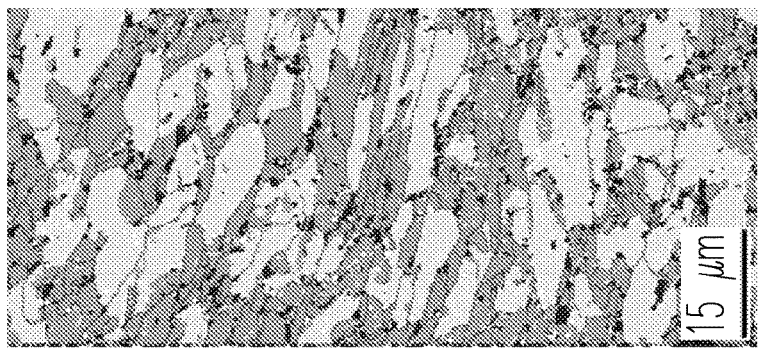
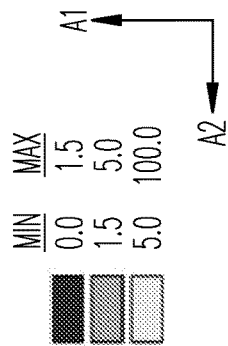
Fig. 13B
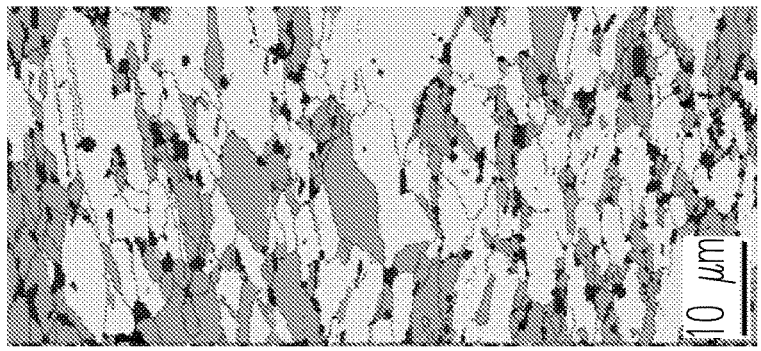
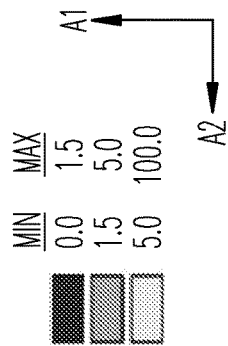
Fig. 13C
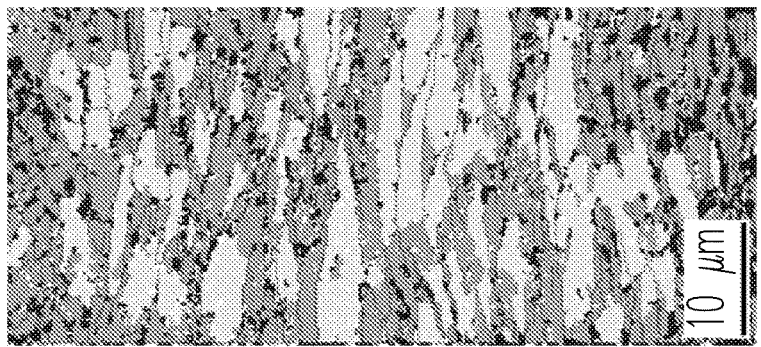
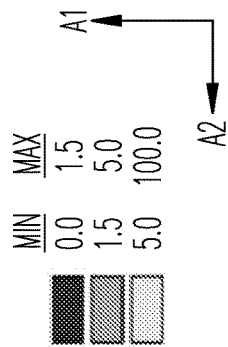
Fig. 13D

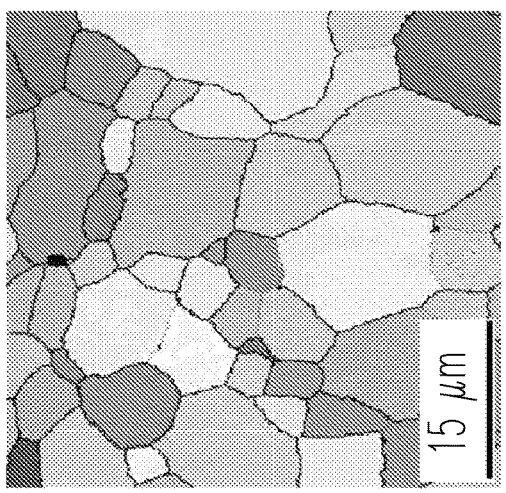
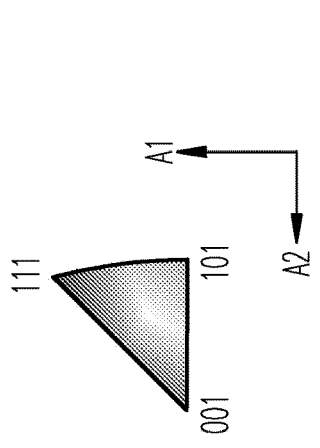
Fig. 16A
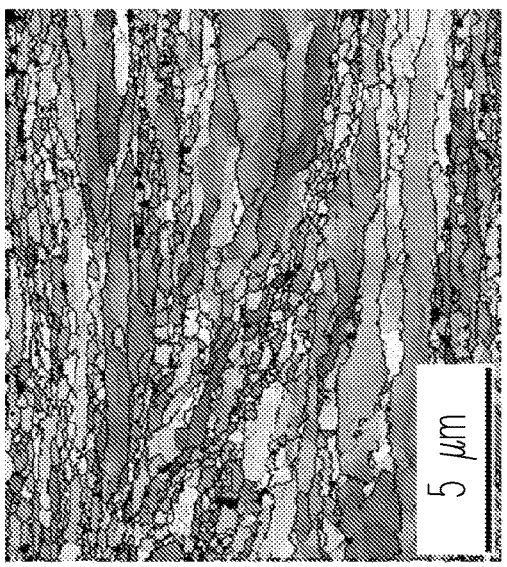
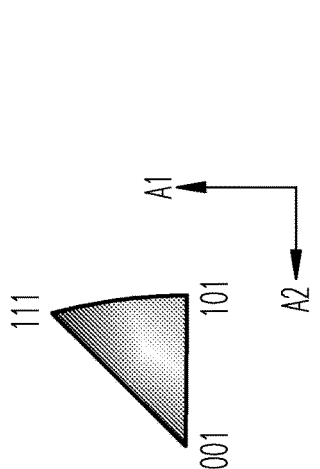
Fig. 16B
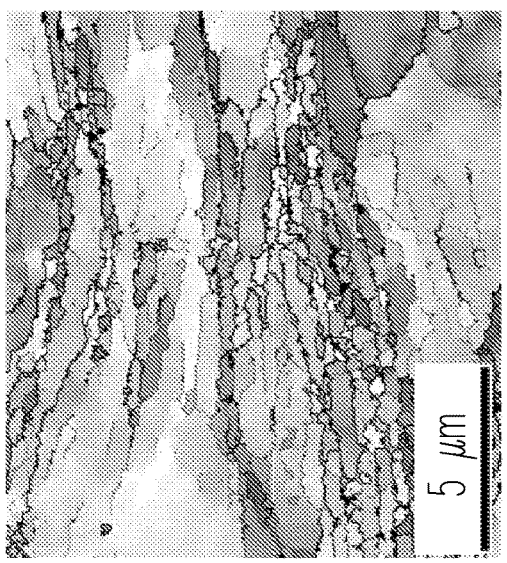
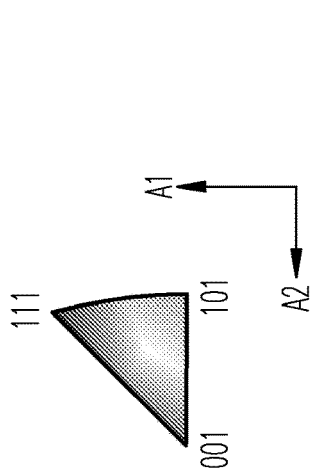
Fig. 16C

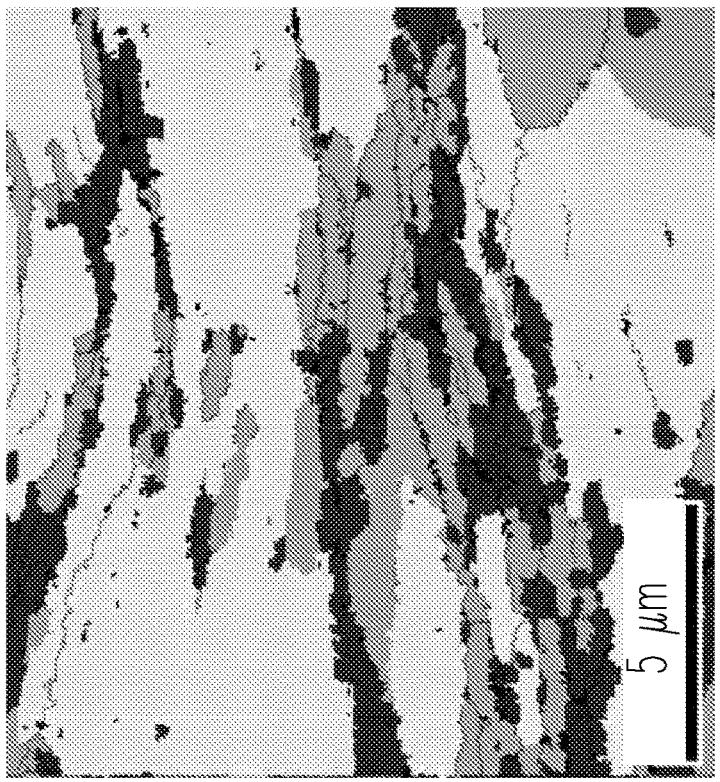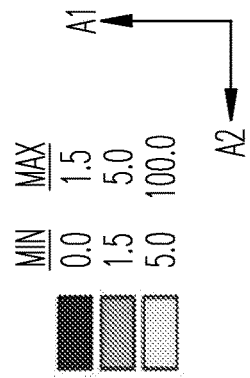
Fig. 17B
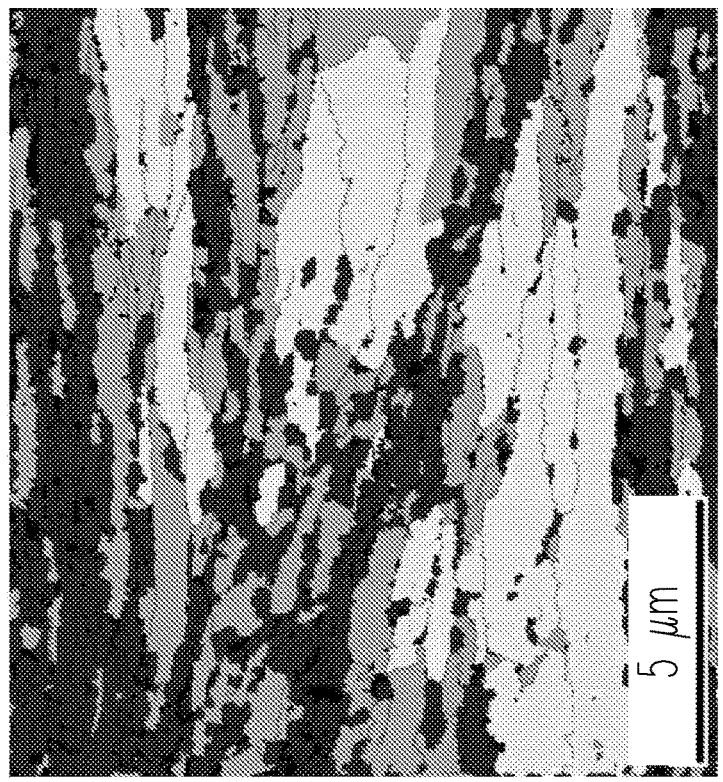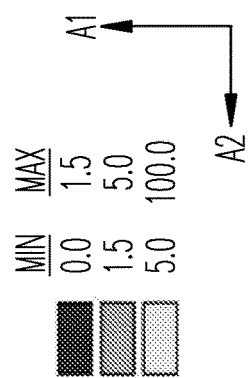
Fig. 17A

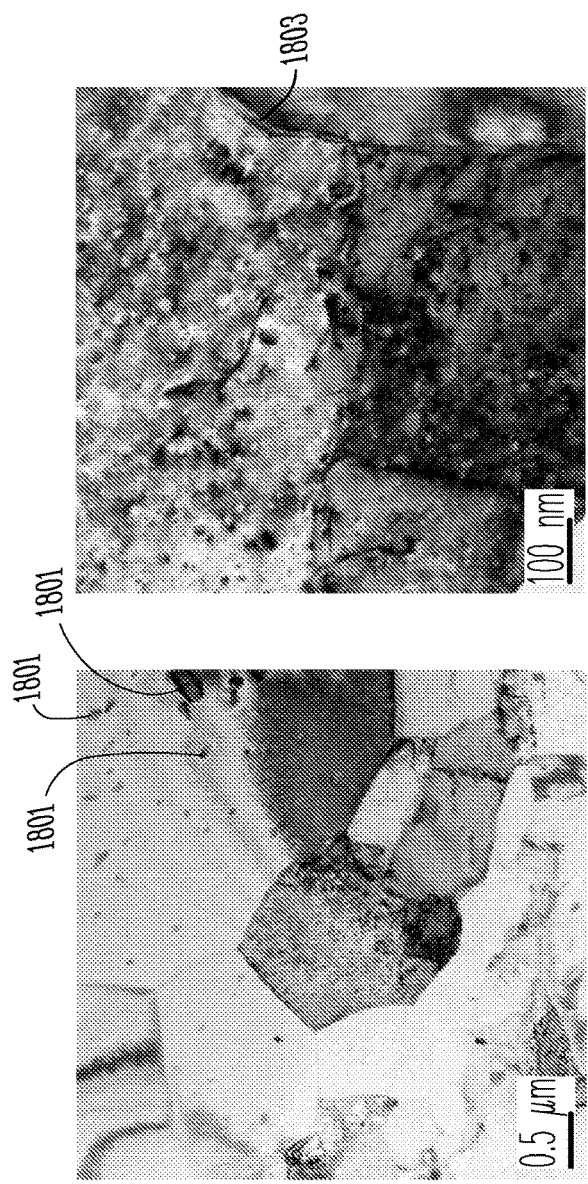
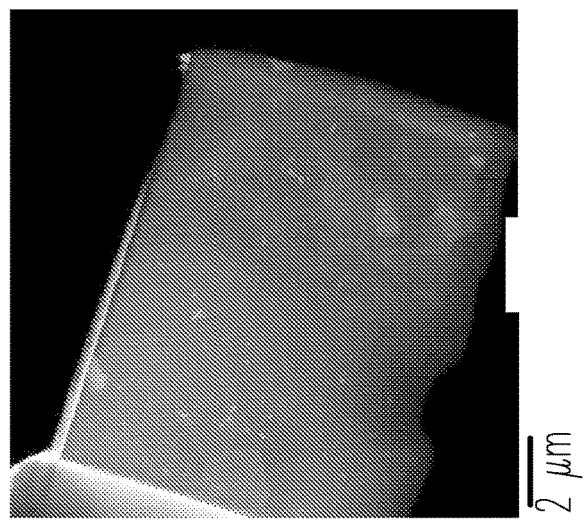
Fig. 18C
Fig. 18B
Fig. 18A

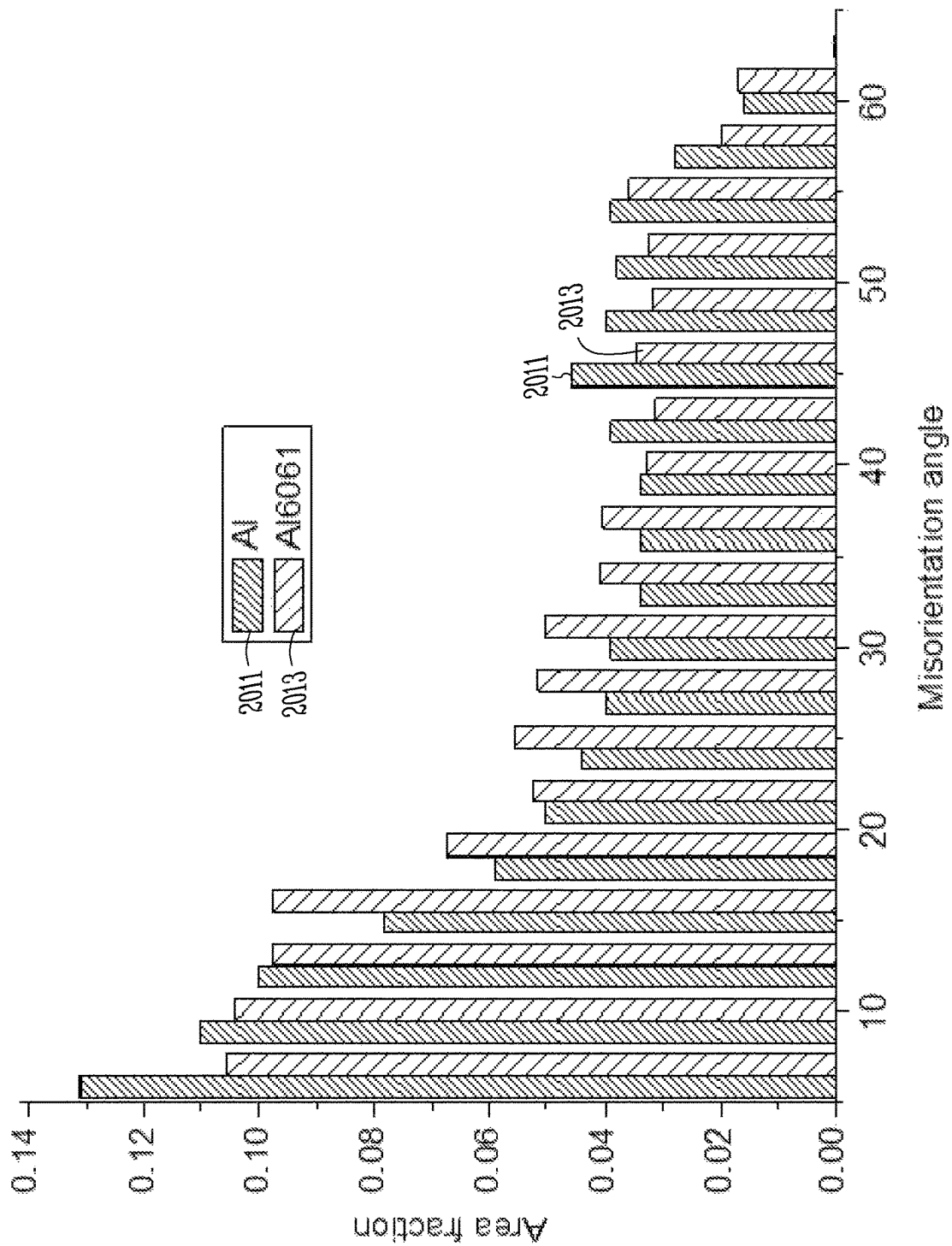

ACOUSTIC-ENERGY BASED MATERIAL DEPOSITION AND REPAIR

CLAIM OF PRIORITY

This application is a national-phase entry under 35 U.S.C. § 371 and claims the benefit of priority from PCT Application PCT/US2019/025654, filed 3 Apr. 2019, and entitled "ACOUSTIC-ENERGY BASED MATERIAL DEPOSITION AND REPAIR," which claims the benefit of priority to U.S. Provisional Patent Application Ser. No. 62/654,135, filed on 6 Apr. 2018, and entitled "ACOUSTIC-ENERGY BASED MATERIAL DEPOSITION AND REPAIR," and U.S. Provisional Patent Application Ser. No. 62/787,117, filed on 31 Dec. 2018, and entitled "MICROSTRUCTURE EVOLUTION OF FCC METALS DURING ULTRASONIC ENERGY ASSISTED DEFORMATION," each of which is incorporated by reference herein in its entirety.

TECHNICAL FIELD

The subject matter disclosed herein relates generally to acoustic-based deposition and repair of various materials and surfaces, and in particular, to high-frequency oscillatory, plastic-deformation based solid-state material deposition for forming components and other parts as well as repair of existing materials.

BACKGROUND

Currently, additive manufacturing approaches suffer from various drawbacks. Accordingly, improved additive manufacturing systems and methods remain desirable.

The information described in this section is given to provide the skilled artisan a context for the following disclosed subject matter and should not be considered as admitted prior art.

BRIEF DESCRIPTION OF THE FIGURES

FIG. 2A shows an exemplary additive-manufacturing operation performing parallel-layer depositions using the DAED tool of FIG. 1;

FIG. 2C shows an exemplary additive-manufacturing operation performing a combination of parallel-layer and voxel depositions using the DAED tool of FIG. 1;

FIG. 4D shows an example of an additive manufacturing system having various methods of introducing low-grade heat of several types, either prior to or after deposition by the DAED tool of FIG. 1 in accordance with various embodiments;

FIGS. 9A through 9C are graphs showing experimental and predicted stress versus strain curves for various acoustic energy densities and strain rates;

FIGS. 11A and 11B show additional examples of an experimental setup for ultrasonic energy assisted compression testing of metal wires using a directed Acoustic Energy Deposition (DAED) tool;

FIGS. 12A through 12E show example EBSD maps including FIG. 12A showing undeformed copper wire; FIG. 12B showing copper wire deformed without any ultrasonic energy assistance; FIG. 12C showing copper wire deformed with about 500 J/m$^3$ ultrasonic energy density; FIG. 12D showing copper wire deformed with about 710 J/m$^3$ ultrasonic energy density; and FIG. 12E showing copper wire deformed with about 710 J/m$^3$ ultrasonic energy density to a higher compressive strain of about 0.75. High angle grain boundaries are highlighted by thick black lines while low angle grain boundaries (or sub-grain boundaries) are highlighted by thin blue lines. An indicated direction, A1, represents the direction of compression;

FIGS. 13A through 13D show examples of grain orientation spread (GOS) maps including FIG. 13A showing copper wire deformed with about 500 J/m$^3$ ultrasonic energy density; FIG. 13B showing copper wire deformed with about 500 J/m$^3$ ultrasonic energy density; FIG. 13C showing copper wire deformed with about 710 J/m$^3$ ultrasonic energy density; and FIG. 13D showing copper wire deformed with about 710 J/m$^3$ ultrasonic energy density to a higher compressive strain of 0.75. The darker-shaded grains have an average GOS of between about 0 to about 1.5; the medium-shaded grains have an average GOS of between about 1.5 to about 5; and the lighter-shaded grains have an average GOS of between about 5 to about 100;

FIG. 15B showing undeformed copper wire, copper deformed without ultrasonic energy; copper deformed in the presence of ultrasonic energy density of about 500 J/m$^3$; copper deformed in the presence of ultrasonic energy density of about 710 J/m$^3$; and copper deformed in the presence of ultrasonic energy density of about 710 J/m$^3$ to a higher strain;

FIGS. 16A through 16C show examples of inverse pole figure maps with FIG. 16A showing undeformed Al 6061 wires; FIG. 16B showing Al 6061 wire deformed under the presence of ultrasonic energy density of about 150 J/m$^3$; and FIG. 16C showing Al 6061 wire deformed under the presence of ultrasonic energy density of about 215 J/m$^3$, with FIG. 16B and FIG. 16C showing maps with the Al 6061 both compressed to a strain of about 0.75. High angle grain boundaries are highlighted by thick black lines while low angle grain boundaries (or sub-grain boundaries) are highlighted by thinner lines. A direction, A1, represents the direction of compression;

FIGS. 17A and 17B show examples of grain orientation spread (GOS) maps including FIG. 17A showing Al 6061 wire deformed with about 150 J/m$^3$ ultrasonic energy density; and FIG. 17B showing Al 6061 wire deformed with about 215 J/m$^3$. The darker-shaded grains have an average GOS of between about 0 to about 1.5; the medium-shaded grains have an average GOS of between about 1.5 to about 5; and the lighter-shaded grains have an average GOS of between about 5 to about 100;

FIGS. 18A through 18C show examples of Scanning Transmission Electron Microscopy (STEM) images including FIG. 18A showing Al 6061 wire deformed with about 210 J/m$^3$ ultrasonic energy density; FIG. 18B showing a bright field TEM image of the same sample with precipitates and; FIG. 18C showing a bright field TEM image with a sub-grain boundary;

FIGS. 20A and 20B are examples of graphs showing misorientation angle versus area fraction histogram including the graph of FIG. 20A showing undeformed Al 6061 wire, Al 6061 wire deformed under ultrasonic energy density of about 150 J/m$^3$, and Al 6061 wire deformed under ultrasonic energy density of about 215 J/m$^3$; and the graph of FIG. 20B showing aluminum (Al) and Al 6061 deformed under similar conditions of ultrasonic energy density.

DETAILED DESCRIPTION

Figure 1:
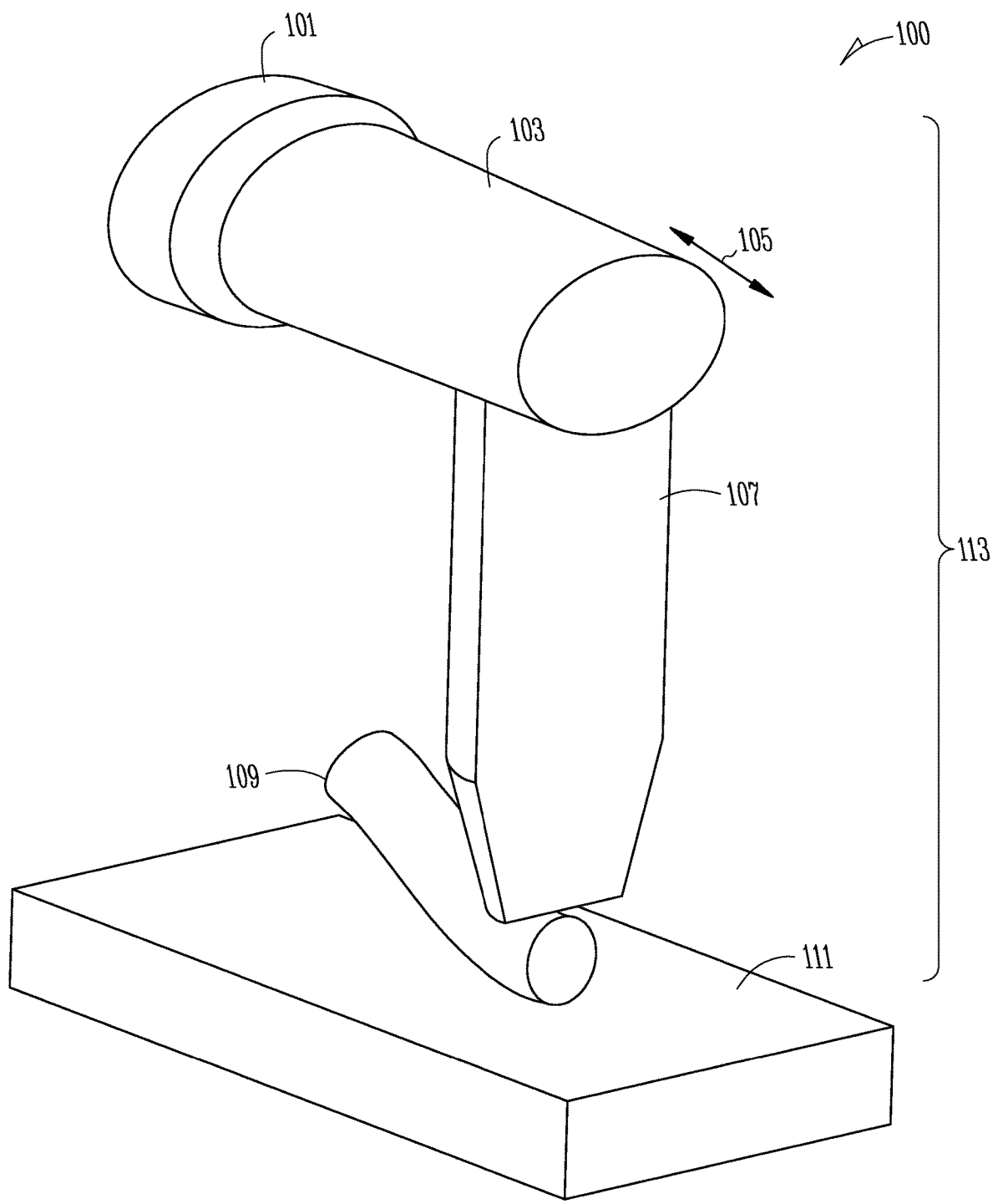
FIG. 1 shows a simplified example of a Directed Acoustic Energy Deposition (DAED) tool, along with a material feedstock and a surface plate upon which material depositions are added.

The disclosed subject matter will now be described in detail with reference to a few general and specific embodiments as illustrated in various ones of the accompanying drawings. In the following description, numerous specific details are set forth in order to provide a thorough understanding of the disclosed subject matter. It will be apparent, however, to one skilled in the art, that the disclosed subject matter may be practiced without some or all of these specific details. In other instances, well-known process steps or structures have not been described in detail so as not to obscure the disclosed subject matter. Further, although various examples are supplied and described herein, much of the material described may be considered as examples to provide a context so that a person of ordinary skill in the art may appreciate the disclosed subject matter. For example, although many times the acoustic-energy deposition and repairing processes use various types of metals as examples, the disclosed subject matter is not limited to metals only and may be readily applied with other materials or combinations of materials.

The property and performance of metal and other material components and parts are tightly linked to their various chemistries and microstructures. For example, in the field of manufacturing, one of the most sought-after metal-processing technologies is the ability to control microstructures of a metal part or component at the same time the part is being made. The desire for controlling the microstructures holds true in both subtractive processes and additive processes.

As is known to a person of ordinary skill in the art, subtractive processes include lathe turning, routing, planning, milling, and other shaping processes, as well as forming process such as forging, extruding, drawing, and other plastic deformation processes. Additive processes include various 3D printing schemes known in the art including as Selective Laser Melting. Depending of the physical principles of the metal process technology, this is very difficult to achieve, since control of microstructure and control of physical dimension and other attributes are often times at odds when it comes to process parameters sets that would allow them to happen.

Various innovations in the research described in this disclosure represents a revolutionary way of not only producing high-quality metal components at room temperatures, but also the ability to control and tune the microstructure, and therefore the property and performance of the product, in-process at the same time the part is being built. This innovation involves the use of high frequency (e.g., in one embodiment, the frequency range may from about 5 kHz to about 60 kHz; in another embodiment, the frequency range may be from about 60 kHz to about 180 kHz), small-amplitude (e.g., about 0.5 micrometers to about 2 micrometers) shear deformations induced locally at the voxel of material as it is being deposited to form the tracks, layers, and bulk of a three-dimensional (3D) printed component or part. Each of the selected frequencies and amplitudes can be produced at a given power level. The component or part can be printed from metals, polymers, or a combination of the two materials. As a result of this application of ultra-fast shear deformation locally, the microstructures of the voxel can be controlled in real-time by controlling how the defects in the crystalline lattice interacts. Due to the high frequency and small amplitude nature of this process, the introduced changes in the microstructure only occur locally. When combined with a metal 3D printing process, it, therefore, can be designed to control only portions of a metal part or the entire part.

As is understandable to a person of ordinary skill in the art, plasticity describes the deformation of a (solid) material undergoing non-reversible changes of shape in response to applied forces. That is, the deformation of the material has exceeded the elastic range, in which removal of the applied stress to an object allows the material to return substantially to the object's original shape.

Performance of a part is largely determined by its properties, be it physical, mechanical, electrical, chemical, etc. Among which, the mechanical property of a metallic part largely determines the mechanical performance of the said part. Mechanical property in crystalline metals are dictated by the chemical bonding, crystalline structure, and "defects" in the crystalline structure of the metal, namely dislocations, vacancy clusters, grain boundaries, precipitates, and phases, etc. in the context of the proposed technology, the grain boundaries (number of gains and their geometry), and phases can be controlled by using high-frequency vibrations.

Based on observations in our existing work, by adding different amounts of acoustic energy (in the form of high-frequency vibrations) into a metal the grain evolution process can be controlled such that the average size of grains and the shape of grains can be tuned to a desired range. In the terms of grain size, normally the smaller the grains are, overall the strength of the material increases. This means that by controlling the size of the grains in the metal, the strength of a part can be controlled and tuned to desired values. In the proposed technology, by increasing the amounts of acoustic energy imposed on the metal during a steady forming process, the size of the grains in the material can be increased by lower the acoustic energy, and vise-versa. It is also observed that by coupling of acoustic energy during metal shaping, the shape of the grains has a desired isotropic geometry (e.g., closer to a sphere). This means the overall property of the material is isotropic, or the same in whichever direction its property is evaluated. This is a desired characteristic for more engineering mechanical parts.

In one exemplary embodiment, the acoustic-energy process described herein is implemented by using a piezoceramic crystal-based actuator working in its mechanical resonance such that the material voxel is directly in contact with the tip of the tool. The tip of the tool is used to guide the voxel and continuously deposit metal voxels to form tracks, layers, and bulk of a metal 3D part, while the amplitude of the shear deformation locally is controlled to achieve controlled local microstructure.

In various examples and embodiments described herein, the disclosed subject matter includes:

A machine that can produce additively manufactured metal components in ambient conditions with desired microstructure, and therefore performance, without any post-fabrication processing;

A stand-alone tool that can be introduced into an existing metal 3D printing technology to introduce bulk to voxel level microstructure, and therefore performance, tuning of metal components;

A stand-alone technology that can be used to perform the described technology on an existing metal component to change its surface properties to allow better performance; and A technology and tool that can be used to tune the property, and therefore the performance, of the metal component in an assembly of parts/components of various materials that are otherwise impossible because of the temperature incompatibility between the different materials in the assembly.

In general, and as is known in contemporaneous arts, metals can be heat treated to alter the properties of strength, ductility, toughness, hardness, or resistance to corrosion. Common heat treatment processes include annealing, precipitation hardening, quenching, and tempering. The annealing process softens the metal by allowing recovery of cold work and grain growth. Quenching can be used to harden alloy steels, or in precipitation hardenable alloys, to trap dissolved solute atoms in solution. Tempering will cause the dissolved alloying elements to precipitate, or in the case of quenched steels, improve impact strength and ductile properties.

However, the technology described herein is superior to other heat-based approaches for several reasons. These reasons include, but are not necessarily limited to, (1) the technology described herein does not use heat to induce microstructure changes to metal, but precisely applied mechanical energy which is 1,000 to 1,000,000 times more energetically efficient for metal shaping and microstructure control; (2) the technology described herein uses and generates no heat so the entire process stays at room temperature, and therefore eliminates the danger and risk of fire or explosion when working with metals such as elemental aluminum (Al) and titanium (Ti), or various alloys thereof, in the context of additive manufacturing; and (3) the technology described herein does not raise the temperature of the metal being processed, which eliminates oxidation of the process metal that heat-based processes are prone to, it therefore eliminates the need for shielding gases or vacuum required for some metals.

It is now well established that simultaneous application of acoustic energy during deformation results in lowering of stresses required for plastic deformation. This phenomenon of acoustic softening has been used in several manufacturing processes, but there is no consensus on the exact physics governing the phenomenon. To further the understanding of the process physics, as described herein, after-deformation microstructure of aluminum (Al) samples deformed with simultaneous application of kilohertz range acoustic energy was studied using Electron-Back-scatter Diffraction (EBSD) analysis. The microstructure shows evidence of acoustic energy enabled dynamic recovery. It is found that the sub-grain sizes increase with an increase in acoustic energy density applied during deformation. A modified Kocks-Mecking (KM) model, described in more detail below, for crystal plasticity has been used to account for the observed acoustic energy enabled dynamic recovery. However, these standard models provide no information on microstructure evolution during the deformation process with simultaneous application of acoustic energy. Therefore, the standard KM model was modified to more closely represent the physical processes occurring with the disclosed subject matter.

Using the modified KM model, predicted stress versus strain curves were plotted and compared with experimental results. Good agreements were found between predictions and experimental results. The detailed description herein identifies an analogy between microstructure evolution in hot deformation and that in acoustic energy assisted deformation.

The study of microstructure evolution is imperative in that it can provide insights into the acoustic softening phenomenon and enables the development of a constitutive model that accurately captures the stress evolution during a static deformation process with simultaneous acoustic energy irradiation.

As described herein, characterization of microstructure using Electron Backscatter Diffraction (EBSD) analysis of aluminum samples after compression has been carried out. The microstructure characterization shows evidence of athermal dynamic recovery similar to that observed during hot deformation. As noted above, a model based on the one-internal-variable crystal plasticity model, the Kocks-Mecking model, has been used to predict the effect of simultaneous acoustic energy irradiation on stress evolution during compression.

Acoustic softening has been used to improve several manufacturing processes by taking advantage of the associated reduction in stresses required to achieve and sustain plastic deformation. Though the applications of acoustic softening to several manufacturing processes is wide-spread, understanding of the effects of acoustic softening on metals has not previously reached maturity. It is, therefore, important, particularly in the context of their microstructure which affects the eventual material properties to gain deeper understanding of the governing physics, which can result in further innovations in manufacturing. That understanding has been considered and is presented herein.

The Kocks-Mecking Model for Crystal Plasticity for Thermal-Energy-Induced Stress Reduction During hot deformation, as material is strained, new dislocations are generated. The increase in entanglement of dislocations in the material results in a rise in the stress required, for aluminum further deforming the material. The increase in stress required for further deforming the material is referred to as strain hardening.

For deformation at relatively low temperatures and high strain rates, generation of dislocations is faster due to which the steady state is reached at higher overall dislocation densities, and therefore smaller sub-grain sizes.

The Kocks-Mecking (KM) model embodies this phenomenon of dislocation density evolution by using a single internal variable dependent on dislocation density, relating the plastic strain rate, $\dot{\gamma}^p$, to the shear stress, $\tau$, through the kinetic equation given by equation (1):

$$\dot{\gamma}^p = \dot{\gamma}_0 \exp\left(\frac{-\Delta G}{kT}\right) \tag{1}$$

where $\dot{\gamma}_0$ is the pre-exponential factor and $\Delta G$ is the Gibbs free energy. As is known in the art, Gibbs free energy is a function of obstacle distribution and is related to total free energy, $\Delta F$, as shown in equation (2):

$$\Delta G = \Delta F \left(1 - \left(\frac{\tau}{\hat{\tau}}\right)^p\right)^q \tag{2}$$

where p and q are 3/4 and 4/3, respectively for aluminum. In general, however, the values for p and q are fitting parameters that relate to slip systems in crystalline metals. In this example, they are related to aluminum having a Face-Centered-Cubic (FCC) crystalline structure. The value of $\Delta F = 0.5 \mu b^3$, where $\mu$ is the shear modulus of the material and b is the burgers vector.

The KM model is based on a single internal variable, $\hat{\tau}$, known as a mechanical threshold. The mechanical threshold depends on a dislocation density, $\rho$. The mechanical threshold is a demarcation between thermally activated flow and viscous glide; below the mechanical threshold, plastic flow is only due to thermal activation and above the threshold is due to rate sensitive viscous glide. The relationship between and p is given by equation (3):

$$\hat{\tau} = \alpha \mu b \sqrt{\rho} \tag{3}$$

where $\alpha$ is a numeric constant. These variables are semi-empirical constituent relations, so they may be determined experimentally. Further, such variables are well-documented in the literature.

The evolution of dislocation density with plastic strain is controlled by two terms. The first term is the dislocation storage term that causes athermal hardening. The first term is inversely proportional to the average spacing between dislocations, and is therefore, directly proportional to $\sqrt{\rho}$. The second term is the dislocation annihilation term, which accounts for dynamic recovery due to the cross-slip of screw dislocations and climb of edge dislocations. The second term is proportional to $\rho$. The terms are used in a change in dislocation density to a change in resolved shear strain in the slip plane according to equation (4):

$$\frac{d\rho}{d\gamma^p} = \frac{d\rho^+}{d\gamma^p} + \frac{d\rho^-}{d\gamma^p} = k_1 \sqrt{\rho} - k_2 \rho \tag{4}$$

where $\gamma^p$ is the resolved shear strain in the slip plane. The coefficient for the dynamic recovery term, $k_2$, is given by equation (5):

$$k_2 = k_{20} \left(\frac{\dot{\gamma}^p}{\dot{\gamma}_0^*}\right)^{-1/n} \tag{5}$$

where $k_{20}$ is a numeric constant. These constants, discussed in more detail below, are crystalline-structure dependent. Consequently, these values differ for materials with different crystalline structures and lattice constants. The term $k_2$ is the strain rate and is temperature dependent. For low temperatures, n is inversely proportional to temperature, T, and $\dot{\gamma}_0^*$ is constant. However, this is a constitutive relation that links the dislocation density evolution with how an applied force is resolved to acting on dislocations on their slip planes based on the lattice structure and geometry. The value is experimentally obtained. At low temperatures, the cross slip and climb mechanisms are not activated, so the relation is governed by geometry of lattice. The value of $\dot{\gamma}_0^*$ is therefore geometrically determined once the lattice geometry is known. The demarcation between low temperatures and high temperatures is typically defined as ⅔ of the melting temperature for a given material.

However, at higher temperatures, $\dot{\gamma}_0^*$ is given by the Arrhenius equation (6):

$$\dot{\gamma}_0^* = \dot{\gamma}_{00}^* \exp\left(\frac{-Q_d}{kT}\right) \tag{6}$$

where $Q_d$ is activation energy for self-diffusion or dislocation climb, k is the Boltzmann constant, and T is temperature. For high temperatures, n is constant between 3 and 5. In hot working temperatures, dislocation climb and cross slips are activated, so the dislocation kinetics and dynamics play increasingly more important roles as temperature increases. These values are typically experimentally obtained by fitting curves.

To relate shear stresses and strains in a single-crystal material to macroscopic axial stresses and strains in polycrystalline materials, Taylor's factor, M, given by equation (7) is used:

$$M = \frac{\sigma}{\tau} = \frac{\gamma^p}{\varepsilon^p} \tag{7}$$

where M is microstructure dependent. The Taylor's factor, M, is an empirical scaling factor used to translate the plasticity models derived for single-crystal lattice into the more realistic poly-crystalline structures. (For most metal products, the crystalline structure in the product is not exactly the same throughout. There are grains where within each grain the crystalline structure is the same as others, but from one grain to another the orientation varies.) The value is captured by comparing the principle stresses, σ, with the shear stresses, τ. Since M is assumed to be changing much more slowly than the evolution of dislocation density, M is assumed to be constant.

Modification to KM Model to Account for Acoustic Softening

The after-deformation microstructure of the aluminum samples deformed under the influence of acoustic energy shows evidence of strain rate and athermal acoustic energy dependent dynamic recovery analogous to those observed in hot deformation. Details about the microstructure characterization results are given in more detail, below. To account for acoustic-energy-induced dynamic recovery, equations (4) and (6), as used to determine $\dot{\gamma}_0^*$ described above for the KM model, are modified according to equation (8):

$$\dot{\gamma}_0^* = \dot{\gamma}_{00}^* \exp\left(\frac{-Q_d \chi}{kTE}\right) \quad (8)$$

where $\chi$ is a constant with units of $J/m^3$. The value of $\chi$ is one of the keys to the modification as detailed herein. The value of $\chi$ is introduced to modify the thermal activation energy term $Q_d$. Effectively, since we are now no longer using random atom vibrations (thermal vibrations) to overcome the energy barriers for dislocation motion, but instead a "structured" lattice vibration (acoustic energy), the activation should see a scaling effect. It also partially cancels out the additional units introduced by "E." E is energy density in Joules per cubic meter Vial and is determined from equation (9):

$$E = \alpha^2 \omega^2 \rho_m \quad (9)$$

where α is the amplitude of vibration, ω is the frequency in rad/sec, and $\rho_m$ is the density of the material undergoing acoustic softening.

Based at least partially on the changes to the KM model to incorporate changes based on effects of acoustic softening, the effect of acoustic energy here can be considered the minimum amount of acoustic energy density required to achieve acoustic softening. An increase in the amount of acoustic energy density used during deformation results in an increase in the value of $\dot{\gamma}_0^*$ in equation (6), thereby causing an increase in $k_2$ in equation (5). As $k_2$ changes, the dislocation density, and therefore the microstructure, evolution changes accordingly, as modeled by equation (4).

Therefore, as discussed in more detail below, applying changes in at least one of energy density, amplitude of an applied acoustic signal, or frequency of the signal to effect a plastic change in material experiencing acoustic softening, allows advance control in at least two ways. First, a look-up table developed for each material to be deposited lists pre-determined grain structures for each of the three variables (i.e., energy density, amplitude, and frequency plus velocity of the material-depositing system) allows selected parameters for a desired grain microstructure to be transferred to a feed-forward control system. Second, a real-time control system incorporates in-situ metrology to measure, in substantially real time, the microstructure of various deposited materials. The various parameters (e.g., the three variables and the system velocity) may then be changed in a feedback control system to achieve a desired microstructure of the material being deposited. Each of these concepts is discussed in greater detail below.

Applications of Described Processes in Metal Surface Repair

During service or during manufacturing, cracks often form on the surface of metal components, often due to cyclic loading. These cracks grow to cause faster failure of components. Currently, fusion welding processes like Tungsten Inert Gas (TIG) are used to fill these cracks and thereby repair the surface of the components. These processes use heat energy, usually generated by an electric arc, to melt filler material and fill the crack. More recently, processes such as Laser Engineered Net Shaping (LENS), Laser Direct Metal Deposition (LMD), and Cold Spray have also been used for repairing cracks. The main disadvantage of these processes is that they create a large heat affected zone (HAZ) around the repaired crack because of the large amount of heat energy used to melt the filler material. This significantly alters the microstructure of component in the HAZ.

The technique described in this disclosure eliminates the aforementioned issues in the final product associated with thermal history and solidification. It is a solid state, room temperature technique in which high-frequency small amplitude local shear strain are used to achieve energy-efficient volumetric conformation of filler filament into a surface defect. Once the surface defect is filled, this technique also induces metallurgical bonding on filler-repair surface interfaces. This two-fold effect is similar to what heating and melting a filler metal does, but in this new technique no heat is used and both the filler and repaired surface remains solid at room temperatures the entire time. Further, the use of high-frequency small amplitude oscillatory shear strain results in softening of the metal filler and allows it to "flow" and conform to the shape of the surface defects. Additionally, it also enables large amount of materials exchange at the interface to enable metallurgical bonding. Since the technique described here use no heat energy and causes a negligible temperature-rise during the process, microstructure of the component around the repaired region remains unaffected. This process can be used to repair metal components in various industries ranging from aerospace, maritime and other automotive industries to small-scale fabrication shops.

As is well-known a person of ordinary skill in the art, elastic deformation is reversible. Once the forces are no longer applied, the object returns to its original shape. Plastic deformation is irreversible. However, an object in the plastic deformation range will first have undergone elastic deformation, which is reversible, so the object will return part way to its original shape. Under tensile stress, plastic deformation is characterized by a strain hardening region and a necking region and finally, fracture (also called rupture). During strain hardening the material becomes stronger through the movement of atomic dislocations. The necking phase is indicated by a reduction in cross-sectional area of the specimen. Necking begins after the ultimate strength is reached. During necking, the material can no longer withstand the maximum stress and the strain in the specimen rapidly increases. Plastic deformation ends with the fracture of the material.

Another deformation mechanism is metal fatigue, which occurs primarily in ductile metals. It was originally thought that a material deformed only within the elastic range returned completely to its original state once the forces were removed. However, faults are introduced at the molecular level with each deformation. After many deformations, cracks will begin to appear, followed soon after by a fracture, with no apparent plastic deformation in between. Depending on the material, shape, and how close to the elastic limit it is deformed, failure may require thousands, millions, billions, or trillions of deformations.

There are two ways to determine when a part is in danger of metal fatigue; either predict when failure will occur due to the material/force/shape/iteration combination, and replace the vulnerable materials before this occurs, or perform inspections to detect the microscopic cracks and perform replacement once they occur. There are two ways to determine when a part is in danger of metal fatigue; either predict when failure will occur due to the material/force/shape/iteration combination, and replace the vulnerable materials before this occurs, or perform inspections to detect the microscopic cracks and perform replacement or repair once they occur.

With reference now to FIG. 1, a simplified example 100 of a Directed Acoustic-Energy Deposition (DAED) tool 113, along with a material feedstock 109 and a surface plate 111. In one embodiment, the surface plate 111 may comprise a test plate for measuring, for example, uniaxial compression loading from the DAED tool 113 upon the material feedstock 109. The compression lading test are described in more detail with reference to FIG. 6, below. In another embodiment, the surface plate 111 may comprise various types of substrate upon which material depositions are formed or added, as shown and described with reference to FIGS. 2A through 2C, below.

The DAED tool 113 is shown to include a transducer 101, a coupling horn 103, and an acoustic-energy coupling tool 107. In various embodiments, the acoustic energy may comprise ultrasonic energy. Although one mode of oscillation, a shear transverse mode 105, is indicated in FIG. 1, other vibrational modes are discussed in more detail, below, with respect to FIG. 3.

The coupling horn 103 couples and amplifies the acoustic energy (e.g., ultrasonic energy) from the transducer 101 to the acoustic-energy coupling tool 107. In various embodiments, the coupling horn 103 is comprised of stainless steel and the acoustic-energy coupling tool 107 is comprised on tungsten carbide. Since the acoustic-energy coupling tool 107 is used to deform the material feedstock 109, tungsten carbide or another material with a relatively high density and hardness may be selected to form the acoustic-energy coupling tool 107. However, the skilled artisan will recognize that the coupling horn 103 and the acoustic-energy coupling tool 107 may be comprised of a variety of materials.

The transducer 101 converts an alternating current (AC) signal into an acoustical signal (e.g., a sound wave). In various embodiments, as discussed in more detail, below, the transducer may operate in a frequency range of between about 5 kHz to about 350 kHz. However, upon reading and understanding the disclosure provided herein, the skilled artisan will recognize that a variety of other frequencies may be employed, both below 5 kHz and above 350 kHz. A selection of frequency is at least partially dependent on a material used as the material feedstock 109. In one embodiment, the transducer 101 is a piezoelectric transducer. In another embodiment, the transducer 101 is an ultrasonic transducer. In still another embodiment, the transducer 101 is a capacitive transducer. Each of these transducer types is known in the art by a person of ordinary skill in the art.

In various embodiments, the material feedstock 109 may comprise a solid-metal filament that is used as a starting material to form a three-dimensional object via metallurgical bonding between, for example, the material feedstock 109 and the surface plate 111 as shown and described with reference to FIGS. 2A through 2C, below. In various embodiments, the material feedstock 109 may comprise a solid-polymeric filament that is used as the starting material to form the 3D objects. Also, the material feedstock 109 is described herein as having a circular cross-sectional area. However, the material feedstock 109 may have any cross-sectional area including oval, square, rectangular, and a variety of other shapes.

With reference now to FIG. 2A, an exemplary additive-manufacturing operation 200 performing parallel-layer depositions using the DAED tool 113 of FIG. 1 is shown. The exemplary additive-manufacturing operation 200 shows a first track of material 201 deposited, or otherwise formed, on the surface plate 111. A second track of material 203 is formed over and in parallel with the first track of material 201. As shown in FIG. 2A, multiple tracks are deposited side-by-side and in parallel with each other in various combinations. For example, the multiple tracks may first be deposited side-by-side with a second layer deposited over the side-by-side depositions. In other examples, a first track may first be deposited upon the surface plate 111, followed by a second deposition, forming a second track, on top of the first track. Such depositions may continue in any order. In this embodiment, the surface plate 111 is a substrate upon which depositions are formed through the interaction of the acoustic-energy coupling tool 107 of the DAED tool 113 with the material feedstock 109.

Figure 2B:
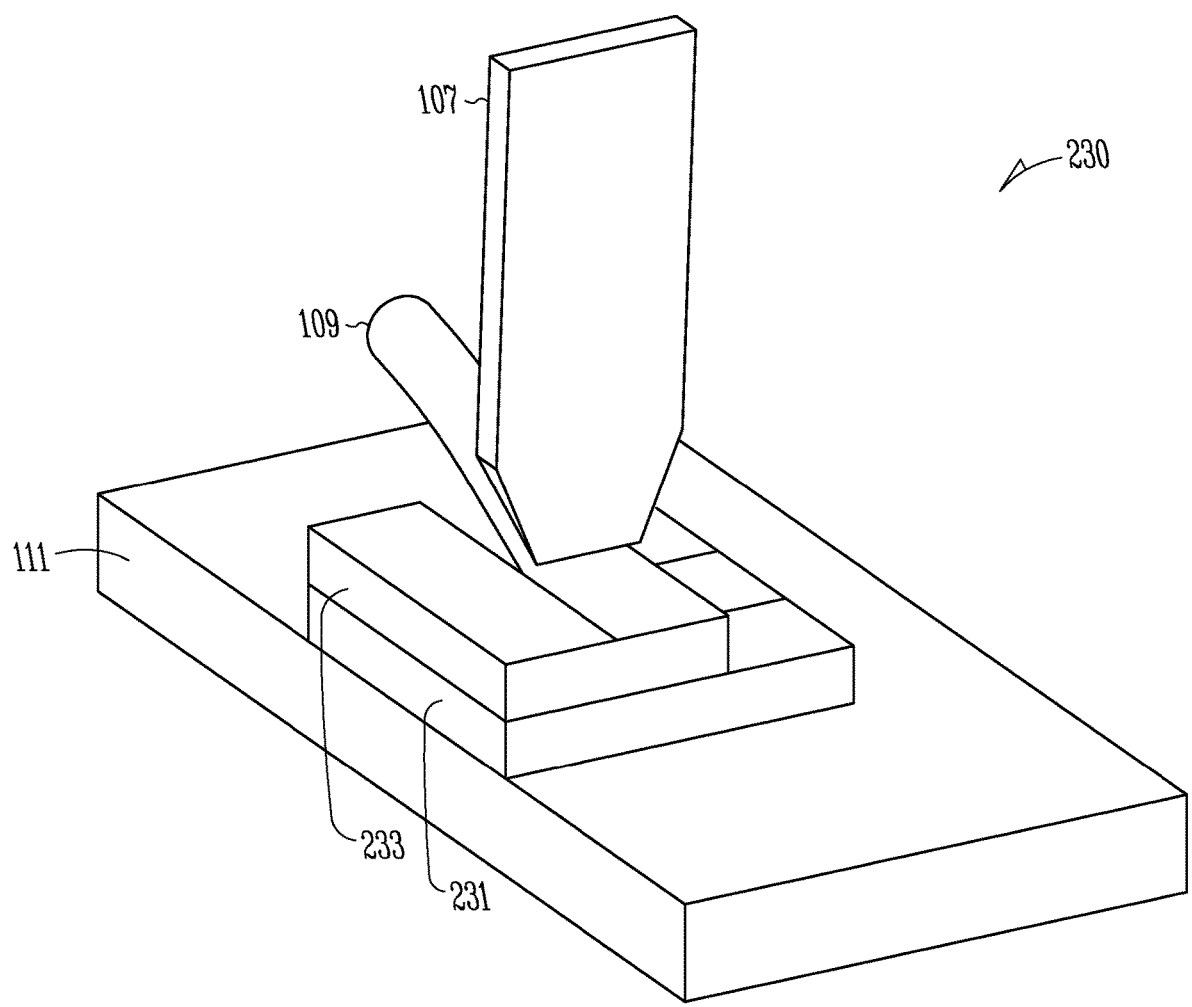
FIG. 2B shows an exemplary additive-manufacturing operation performing orthogonal-layer depositions using the DAED tool of FIG. 1.

FIG. 2B shows an exemplary additive-manufacturing operation 230 performing orthogonal-layer depositions using the DAED tool 113 of FIG. 1. The exemplary additive-manufacturing operation 230 shows a first track of material 231 deposited, or otherwise formed, on the surface plate 111. A second track of material 233 is then formed over and substantially orthogonal to the first track of material 231. As shown in FIG. 2B, multiple tracks are, for example, deposited side-by-side in a first layer and then forming tracks side-by-side in a second layer that is substantially orthogonal to, the tracks of the first layer. As with FIG. 2A, in this embodiment, the surface plate 111 is a substrate upon which depositions are formed through the interaction of the acoustic-energy coupling tool 107 of the DAED tool 113 with the material feedstock 109.

FIG. 2C shows an exemplary additive-manufacturing operation 250 performing a combination of parallel-layer and voxel (a 3D volume element) depositions using the DAED tool 113 of FIG. 1. As shown and described with reference to FIG. 2A, above, the exemplary additive-manufacturing operation 250 of FIG. 2C shows a first track of material 201 deposited, or otherwise formed, on the surface plate 111. A second track of material 203 is formed over and in parallel with the first track of material 201. Multiple tracks are deposited side-by-side and in parallel with each other in various combinations. FIG. 2C also shows additional individual voxels 251 formed in a second layer over the first track of material 201. Although the individual voxels 251 are shown as being continuously-formed, one after the other, the skilled artisan, upon reading and understanding the disclosure provided herein, that the individual voxels 251 may be formed as separate blocks, in various sizes of groups, and in any desired orientation. In this embodiment, the surface plate 111 is a substrate upon which depositions are formed through the interaction of the acoustic-energy coupling tool 107 of the DAED tool 113 with the material feedstock 109.

As shown in FIGS. 2A through 2C, through the acoustic energy applied (e.g., ultrasonic energy) to the material feedstock 109, the DAED tool 113 softens the material beyond the elastic region of the material and plasticly deforms the material, thereby extruding the material feedstock 109 to directly "write" the tracks and layers that comprise the 3D component or components. Therefore, in an example where the material feedstock 109 comprises a metal (e.g., Al), the solid-metal filament of the material feedstock 109 is guided, shaped, and metallurgically bonded to a substrate (e.g., the surface plate 111 or the previous track or layer) as well as the adjacent filaments 3D-volume element-by-3D volume-element (i.e., voxel-by-voxel) using a guided version of the DAED tool 113 on a positioning system. Various types of positioning systems are shown and described in detail with reference to FIGS. 4A through 4C, below.

In the foregoing examples, the DAED tool 113 was shown to operate in the shear transverse mode 105 (see FIG. 1) for ease of understanding. However, the DAED tool 113 can be structured to operate in one or more vibrational modes.

Figure 3:
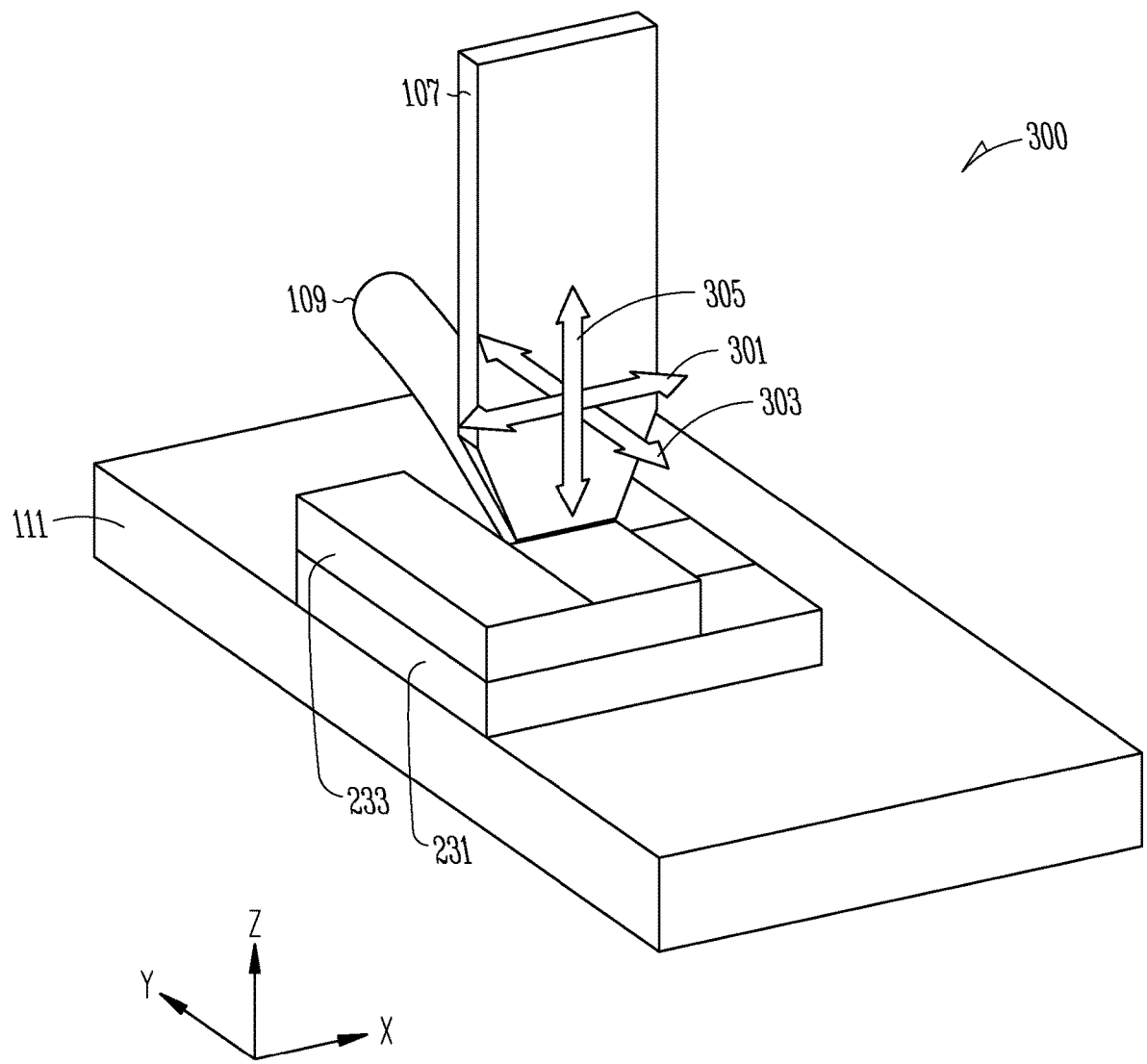
FIG. 3 shows examples of various vibrational modes of the DAED tool of FIG. 1.

Referring now to FIG. 3, examples of various vibrational modes 300 of the DAED tool 113 of FIG. 1 are shown. In various embodiments, there are primarily three different modes of tool vibration with respect to a deposited or formed part. As shown in FIG. 3, the three vibrational modes include a first shear (transverse) mode 301, a second shear (transverse) mode 303, and a longitudinal mode 305. At least one of three vibrational modes can be used to couple acoustic energy (e.g., ultrasonic energy) into the material feedstock 109 to perform operations of material forming (e.g., material deposition) and material bonding (material feedstock to a substrate or material feedstock to one or more prior-deposited layers of material feedstock).

Where the material feedstock 109 is a metal, the first shear (transverse) mode 301 and the second shear (transverse) mode 303 are more efficient than the longitudinal mode 305 in forming and bonding of metal voxels to build components or parts. Therefore, the longitudinal mode 305 is less suitable for forming and bonding of metal voxels than the vibrational modes of the first shear (transverse) mode 301 and the second shear (transverse) mode 303. Different modes of vibration may be used for different materials (e.g., metals versus polymers) or different crystalline structures (e.g., fully crystalline versus semi-crystalline versus fully amorphous). The exact mechanisms for these differences are still under investigation. However, to transition from the elastic region to the plastic region, vibrational amplitude and mode of vibration may be more strongly-determining factors than frequency. Current observations indicate that, in either of the shear modes of vibration, the material feedstock 109 experiences greater shear stresses as opposed to the longitudinal mode of vibration. When in the plastic deformation region, these shear stresses cause the resolved shear stress to be overcome more effectively, and therefore activate dislocation motion and lattice defect gradients in the material to allow for athermal diffusion of the material. The athermal nature of the disclosed subject matter presented herein is shown and described in more detail with reference to FIG. 5, below.

Following the same line of thought, when the vibration amplitude of a shear mode vibration increases, the increased amplitude allows the material in the feedstock to experience larger amounts of shear plastic deformation in each cycle of vibration. Consequently, more vibrational energy is coupled into the dislocation motion and forming defect gradients needed for diffusion and material bonding on internal interfaces of the built component or part.

Figure 4A:
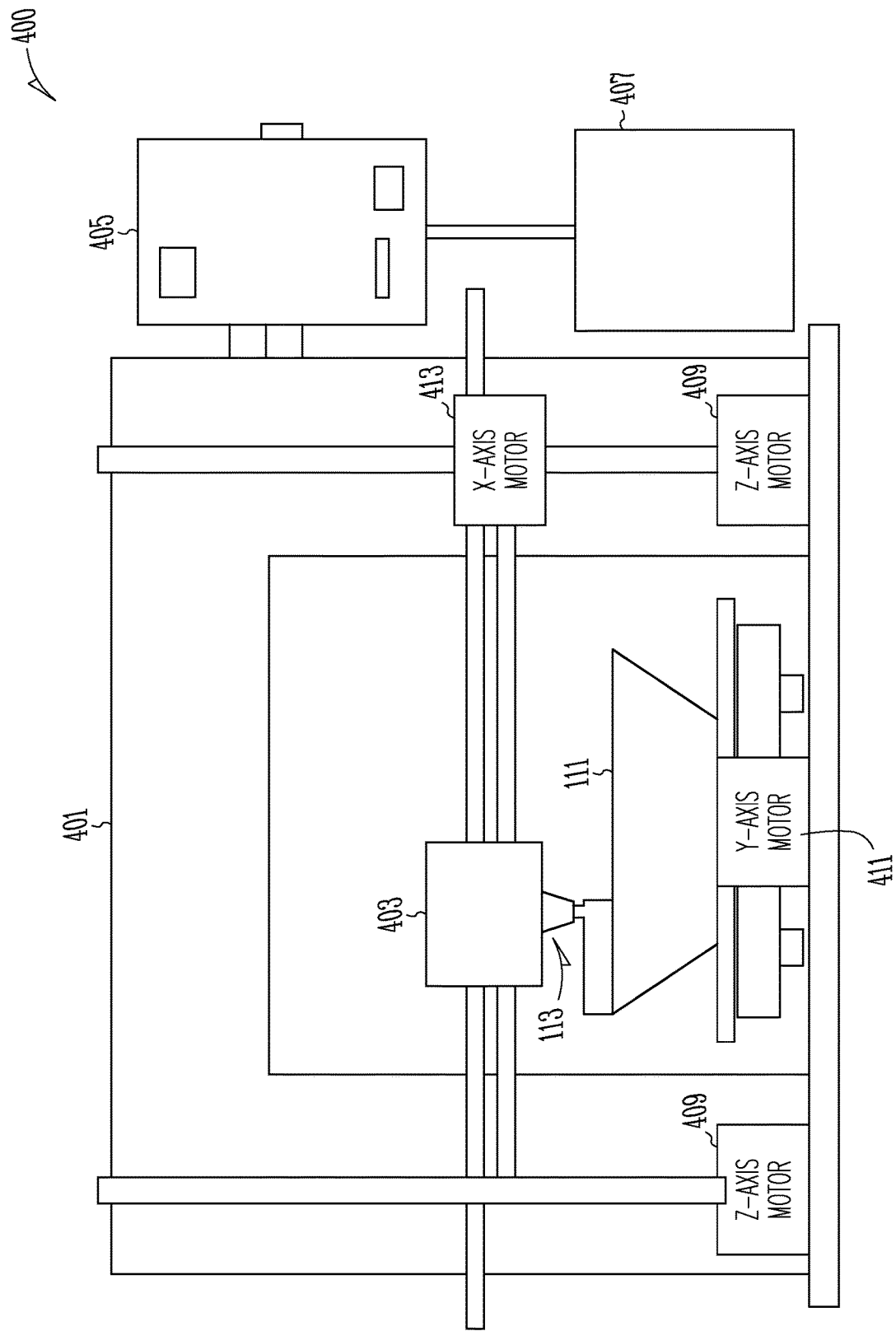
FIG. 4A shows an example of an additive manufacturing system in accordance with various embodiments.

FIG. 4A shows an example of an additive manufacturing system 400 in accordance with various embodiments. The additive manufacturing system 400 is shown to include a z-axis drive motor 409, a y-axis drive motor 411, an x-axis drive motor 413, a 3D-printing enclosure chamber 401, a 3D-print drive-circuit 405, and a power source 407. An acoustic-energy source 403 is coupled directly to the DAED tool 113. The 3D-print drive-circuit 405 may comprise any suitable electronic components, for example microprocessors, resistors, capacitors, inductors, transistors, diodes, light-emitting diodes, switches, traces, jumpers, fuses, amplifiers, antennas, and so forth, in order to control operation of the additive manufacturing system 400. In some exemplary embodiments, the additive manufacturing system 400 is controllable via a link to a software program operative on a personal computer, tablet, or other standalone control platform.

A 3D object (e.g., a component or a part) may be printed by the DAED tool 113 directly on the surface plate 111 or onto another object or other substrate mounted to the surface plate 111. Although shown in an exemplary configuration, the skilled artisan will recognize, upon reading and understanding the disclosure provided herein, that many different configurations are possible.

Overall, the z-axis drive motor 409, the y-axis drive motor 411, and the x-axis drive motor 413 provide three separate axes in which the combination of the acoustic-energy source 403 and the DAED tool 113. Additionally, and although not shown but readily understandable to a skilled artisan, additional degrees-of-freedom can be added to the combination of the acoustic-energy source 403 and the DAED tool 113. For example, a rotary-drive mechanism and a angular-drive mechanism may be added either to the combination of the acoustic-energy source 403 and the DAED tool 113 or the surface plate 111, or both. Therefore, either the combination of the acoustic-energy source 403 and the DAED tool 113 or the surface plate, or both, may either be fixed in place or may be translatable and/or rotatable in the x, y, and z directions, and various rotational angles. However, any suitable components or systems for translation, rotation, and/or other movement of relevant portions of the additive manufacturing system 400 are considered to be within a scope of the present disclosure.

The 3D-print drive-circuit 405 can also be configured to store computer-aided design (CAD) or computer-aided manufacturing (CAM) files of various components or parts that can be formed or otherwise deposited by the DAED tool 113. The 3D-print drive-circuit 405 can prepare components, parts, or perform repairs, according to the CAD or CAM files by driving and controlling the various mechanisms shown in the additive manufacturing system 400 of FIG. 4A. Such operations are known in the relevant art.

Additionally, the acoustic-energy source 403 may be mounted remotely from the DAED tool 113 and electrically coupled to the transducer 101 (see FIG. 1) of the DAED tool 113.

Therefore, as shown, the additive manufacturing system 400 is provided merely as an example of a possible manufacturing system that utilizes the DAED tool 113 to form various components or parts. Additionally, the additive manufacturing system 400 may be used to repair existing components or parts in addition to forming new components.

The skilled artisan will further recognize that there are no limitations on a physical size or dimensions of the additive manufacturing system 400. Also, although FIG. 4A shows only a single one of the DAED tool 113, the additive manufacturing system 400 can readily incorporate multiple DAED tools (even though only one tool is shown). Each of the additional DAED tools may be coupled to a separate drive system. Alternatively, more than one DAED tool may be coupled to the same drive system in order to, for example, form larger components or parts much more quickly. Additionally, multiple DAED tools (e.g., two or more) can be used to focus an acoustic beam at a given intersection within a material, thereby concentrating the effects of the acoustic energy at a given and specified location. This acoustic focusing can be especially useful in certain types of material repair operations. As noted elsewhere herein, surface repairs can be used on different existing material surfaces (and in the bulk) to repair defects, cracks, openings, and other undesirable or unwanted features of the existing structure.

In a specific exemplary embodiment, the acoustic-energy source 403 supplies acoustic energy to the DAED tool 113 at a frequency of 60 kHz. Acoustic energy source 212 may provide a desired amount of the acoustic energy, for example 5 watts, 10 watts, 15 watts, or a range of powers, that are selectable for a desired deposition rate or material. The acoustic energy applied to a filament of the material feedstock 109 (e.g., 300 μm diameter, 99.99% Al feedstock) to produce a voxel is modulated, for example, through a selected frequency, at a selected amplitude, for a given and time. In addition to the acoustic-energy input modulation, the force with which the material feedstock 109 is compressed onto a substrate or existing layer can also be controlled by the 3D-print drive-circuit 405.

The DAED tool 113 may comprise geometries of a blade, a needle, a cylinder, a rectangle, a slab, or other suitable shape. The DAED tool 113 may be configured with any suitable dimensions and/or materials for a given operation. For example, an aspect ratio or other characteristic dimension or dimensions may be selected to achieve an amplitude of vibration of about 1 micron, responsive to an applied acoustic energy vibration of about 60 kHz applied to the DAED tool 113, at a free end of the DAED tool 113 that is in contact with a substrate or an existing layer of deposited material.

In a specific exemplary embodiment, the DAED tool 113 is configured with a width of about 3 mm and a length of between about 12 mm and about 25 mm. In another specific exemplary embodiment, the DAED tool 113 is configured with a width of about 2 mm and a length of about 12 mm. Moreover, the skilled artisan will appreciate, upon reading and understanding the disclosure provided herein, that various dimensions of the DAED tool 113 may be selected and/or adjusted as desired, for example, based on the dimensions of material in the material feedstock 109, an actual cross-sectional shape of the material, the type of material (e.g., elemental metals or alloys, polymers, various combinations of materials, etc., all based at least partially upon material properties and other physical characteristics of the material), and other factors as utilized in the additive manufacturing system 400. In addition, one or more particular configurations and/or dimensions, shapes, etc. of the DAED tool 113 may be removed, replaced, or substituted from the additive manufacturing system 400 and replaced with a different 113 in order to accommodate different materials and/or achieve different properties for deposited materials.

In an exemplary embodiment, an operation of the additive manufacturing system 400 begins by bringing the DAED tool 113 guiding the filament of the material feedstock 109 to a desired voxel location and holding the filament in place with nominal compressive pressure (for example, via operation of one or more of the drive motors, 409, 411, 413). Once positioned, the DAED tool 113 applies both compressive force and acoustic energy to the filament to soften the material of the filament as described in detail herein. The combination of the force applied by the DAED tool 113 and the application of acoustic energy to the filament allows the section of the filament defined by contact proximal to the filament and the DAED tool 113 to form (print) and subsequently bond one or more voxels onto a substrate or existing deposited layer. The aforementioned process may be repeated as necessary as the DAED tool 113 moves along a given axis until a desired track is completed (e.g., see FIGS. 2A through 2C, and the accompanying verbiage). In various examples, each voxel may overlap with a previous voxel and a subsequent voxel and with those in any adjacent tracks. The entire process may then be repeated for each track and for each layer, until a desired structure is formed. In various exemplary embodiments, the additive manufacturing system 400 may achieve a target speed of build of, for example, about 0.2 mm$^3$/second to about 1 mm$^3$/second or higher, depending on input power, filament material, a number of the DAED tools employed, and other factors as described herein.

Control of Microstructure

Feed-Forward Control

As described above, the 3D printing process of the disclosed subject matter allows a user of the system to control a grain orientation and grain size. Consequently, the disclosed subject matter provides for a control of microstructure of printed voxels and tracks and the subsequent components or parts created by the voxels and tracks.

With continuing reference to FIG. 4A, in an embodiment, the 3D-print drive-circuit 405 may be configured to store (e.g., in a non-volatile memory or other type of data storage media) a variety of lookup tables. The lookup tables contain data related to a predetermined microstructure based on a number of factors (variables). For example, Table II shows a specific exemplary dynamic lookup table where changing one of the factors automatically changes the microstructure based on predetermined empirical data.

TABLE II

| Factor | Value of Factor | Resulting RMS Roughness Value of Microstructure [Å] |
|---|---|---|
| Feedstock Material Flow Rate [mm/sec] | To Be Input | [select spatial-bandwidth of related metrology tool from drop-down menu] |
| DAED Tool Travel Rate Relative to Substrate/Layer [mm/sec] | To Be Input | |
| Feedstock Material [select from drop-down menu] | To Be Input | |
| Acoustic Power [W] | To Be Input | |
| Acoustic Frequency [rad/sec] | To Be Input | |

TABLE II-continued

| | Value of Factor | Resulting RMS Roughness Value of Microstructure [Å] |
|---|---|---|
| Ambient Environment | | |
| Relative Pressure [kPa] | To Be Input | |
| Fluid Medium [select from drop-down menu] | To Be Input | |
| Ambient Temperature [K] | To Be Input | |

As shown in the specific exemplary lookup table, values of the various factors can be entered, and a resulting RMS-roughness value of the microstructure will be displayed. For example, a "Fluid Medium" drop-down menu is shown since the disclosed subject matter can function in a wide range of environments. In one specific example, the DAED tool 113 (see FIG. 1) can be operated to form components or parts, or to repair existing structures (e.g., repair to micro-cracks in a hull of a ship) while the tool operates underwater. Since a resulting microstructure may have a different RMS-roughness value when used underwater, a new predetermined value may be entered into the lookup table to account for such environments.

In this example, the RMS-roughness can be stored, from the predetermined empirical measurements, as a power-spectral density function that is spatially-bandwidth dependent, to replicate a variety of roughness measurement tools including, for example, atomic force microscopy, optical profilometry, mechanical profilometry, Nomarski (differential interference contrast) microscopy, and other tools known in the metrological arts. The person of ordinary skill in the art will recognize that a number of other values may be displayed other than a roughness value. Although not all values may be needed for an expected operational use of the disclosed subject matter, the various embodiments described herein are capable of being utilized in a wide variety of contexts, including additional contexts not described explicitly herein.

Once the desired factors are entered, or, alternatively, previously stored for a known operation, the 3D-print drive-circuit 405 can prepare components, parts, or perform repairs, by driving and controlling the various mechanisms shown in the additive manufacturing system 400 of FIG. 4A.

Feed-Back Control

Figure 4B:
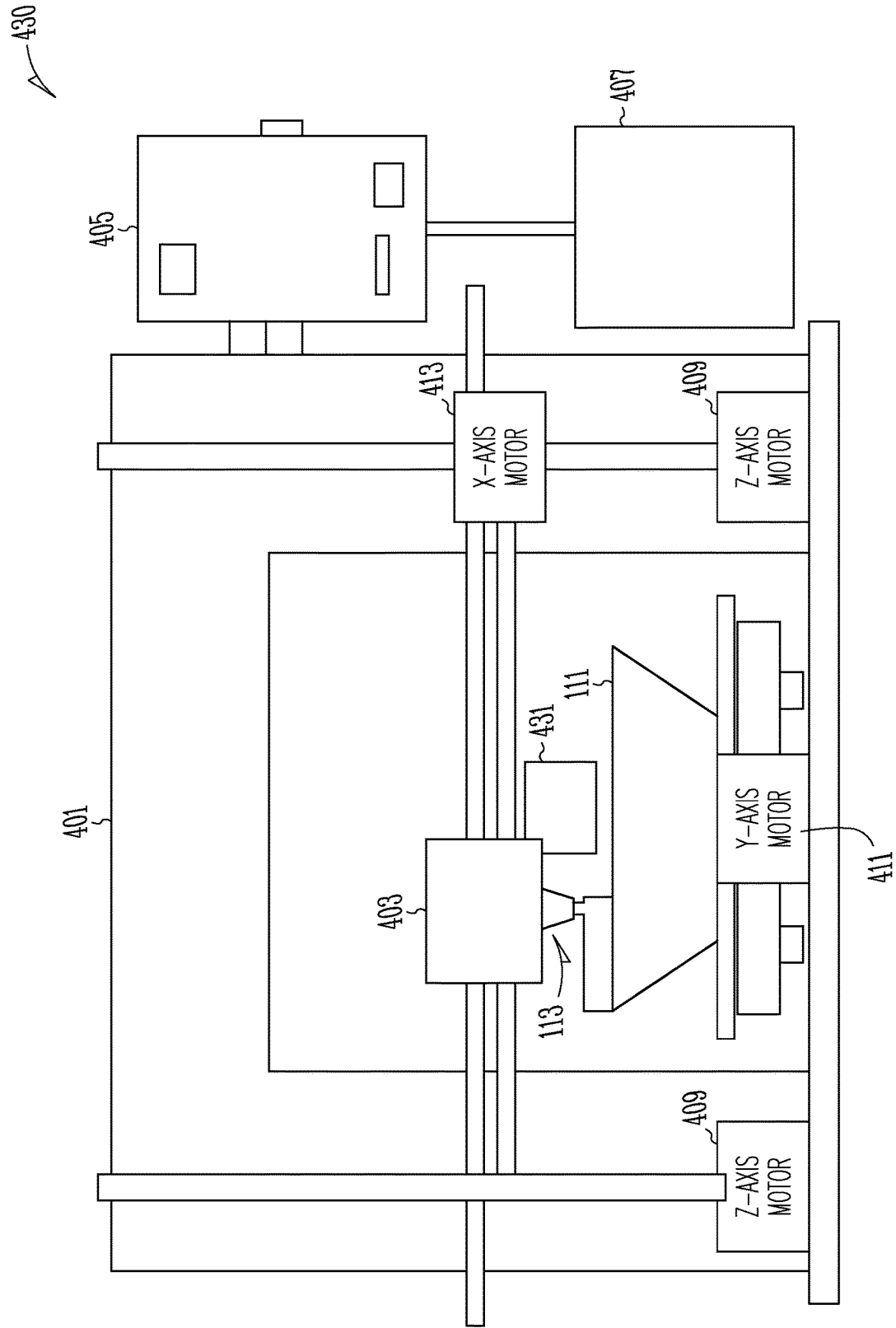
FIG. 4B shows an example of an additive manufacturing system having in-situ metrology equipment for feedback control of the DAED tool of FIG. 1 in accordance with various embodiments.

FIG. 4B shows an example of an additive manufacturing system 430 having in-situ metrology equipment 431 for feedback control of the DAED tool 113 of FIG. 1 in accordance with various embodiments. In this exemplary embodiment, the in-situ metrology equipment 431 is coupled directly to the DAED tool 113 and measures, for example, grain size or a roughness value (e.g., a surface roughness value), of a deposited voxel in substantially real time. Based on a desired value of grain size or roughness value, the 3D-print drive-circuit 405 can compare the desired value with the actual value and adjust various parameters (e.g., tool drive speed, filament feed-rate, acoustic power, acoustic amplitude, acoustic frequency, etc.) based on predetermined values programmed or stored in the 3D-print drive-circuit 405.

Depending upon an environment in which the additive manufacturing system 430 is used, and a level of grain or microstructure measurement resolution, accuracy, precision, and/or repeatability required, the in-situ metrology equipment 431 may comprise one or more types of metrology tool known in the art including, for example, atomic force microscopy, optical profilometry, mechanical profilometry, Nomarski (differential interference contrast) microscopy, scanning electron microscopy (SEM)—potentially including other analytical tools such as energy-dispersive spectroscopy for elemental analysis or chemical characterization of a voxel or hybrid bond between an underlying substrate and a voxel used for repair). In other types of microstructure measurement, metrology tools can include micro-computed tomography ($\mu$CT), x-ray, electron beam (e-beam) interrogation, and low-amplitude ultrasonic waves. In the case of a tool required to work within a vacuum environment (e.g., SEM or e-beam), the 3D-printing enclosure chamber 401 may be configured (e.g., structured) to include draw-down (e.g., turbomolecular) pumps to operation the DAED tool 113 in a vacuum environment.

Figure 4C:
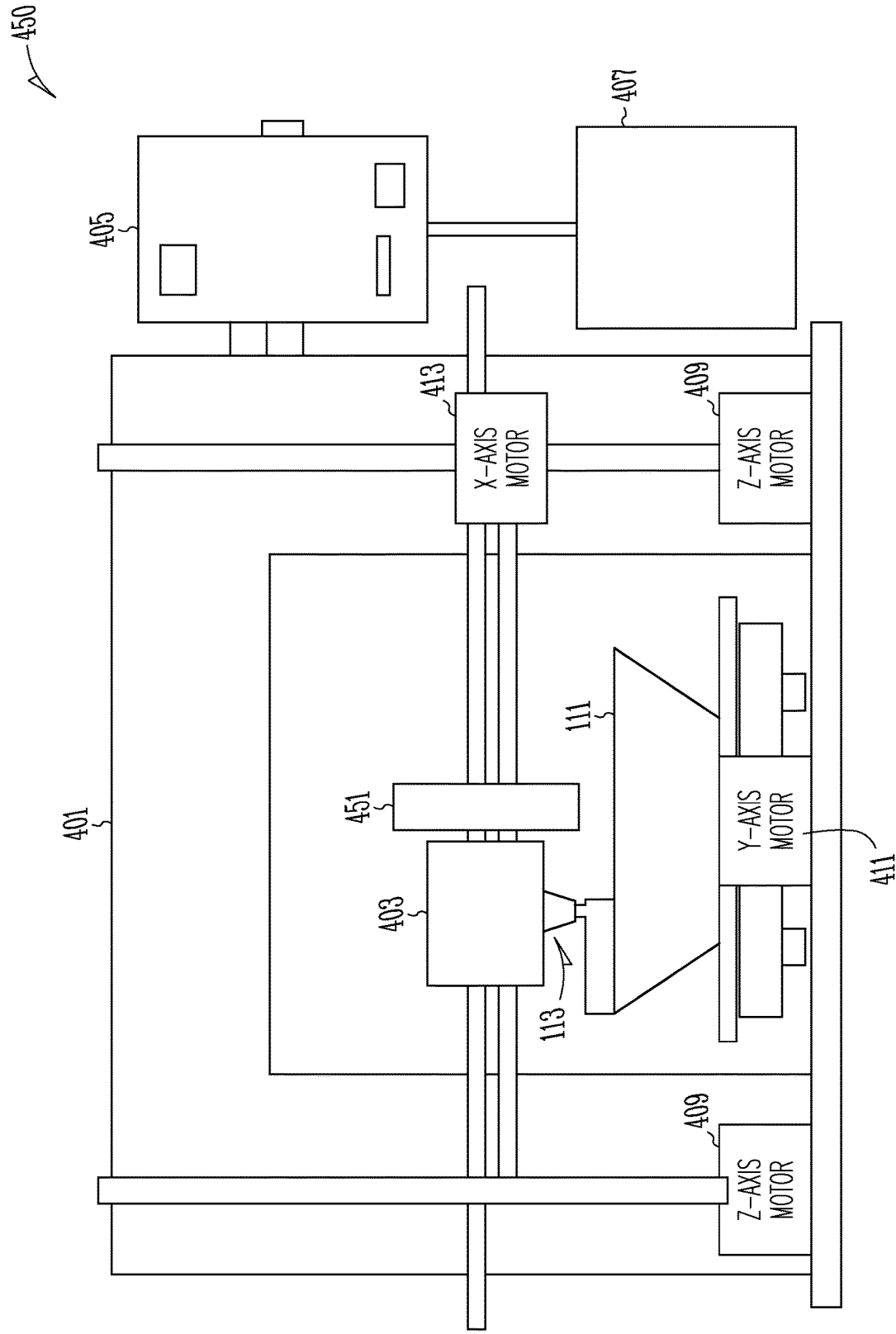
FIG. 4C shows an example of an additive manufacturing system having in-situ metrology equipment for inspection either prior to or after deposition by the DAED tool of FIG. 1 in accordance with various embodiments.

FIG. 4C shows an example of an additive manufacturing system 450 having in-situ metrology equipment 451 for inspection either prior to or after deposition by the DAED tool of FIG. 1 in accordance with various embodiments. The in-situ metrology equipment 451 may be operated similarly to the in-situ metrology equipment 431 of FIG. 4B. However, in FIG. 4C, the in-situ metrology equipment 451 is driven separately from the DAED tool 113. Therefore, the in-situ metrology equipment 451 can be used to drive ahead of or to different locations than the DAED tool 113. When used independently of the DAED tool 113, the in-situ metrology equipment 451 can, for example, scan ahead to view parts of a subs requiring repair. In other embodiments not shown explicitly, the in-situ metrology equipment 451 can be used in conjunction with the in-situ metrology equipment 431 of FIG. 4B.

In-Process Thermal Annealing of Interfaces in DAED

In various applications, the voxel-by-voxel, layer-by-layer deposition of metal in the DAED technique described herein may cause high crystalline defects to accumulate in the interface regions. These crystalline defects are typically stacking faults and vacancy clusters. However, when not mitigated, the accumulation of these defects, as stacking of voxels and layers continues, can occur. The accumulation of these defects can result in larger-scale defects that may eventually lead to, for example, fracturing or separation of interfaces in the build material.

To circumvent these problems due to defects, low-grade heat can be introduced into the build material to elevate the temperature of the build material to below, for example, approximately one-third of the melting temperature of the material. For example, when using aluminum alloys, about 150° C. to about 180° C. would be an appropriate amount of low-grade heat to be added into the build material. As the temperature of the build material is elevated, the crystalline defects in the interface regions become mobile and can go through recovery via crystalline defect annihilation processes to reduce the defect density in these regions. A result is that these interface regions can obtain properties similar to that of the bulk region and fracture of interfaces and failure of builds can be avoided. Further, taking care of the interfaces in the manner described herein as a part is formed allows for higher structures (e.g., in a z-direction) with possible overhanging features being formed.

With reference to FIG. 4D, an example of an additive manufacturing system 470 having various methods of introducing low-grade heat of several types, either prior to or after deposition by the DAED tool of FIG. 1, in accordance with various embodiments is shown. The various methods of introducing low-grade heat can be of several types such as, for example, one or more of conductive, convective, and non-contact methods (such as radiative heating or inductive heating). For example, in conductive mode, the surface plate 111 can be heated by conductive heating 473 using conventional methods, such as a heating element including cartridge heaters or heating tapes. The heat is then transported through the surface plate 111 into a part 479 being built (of a selected material or materials) by the addition of material layers 481. The temperature of the material is raised by the conductive heating to a desired temperature range. In an embodiment of a convective heating method 471, 475, hot air or other hot fluids can be used to heat up the material. In a radiative heating method 477, a heater (e.g., an IR heater) can be used to radiate heat directly onto the material to affect a rise in a temperature of the material feedstock to a desired temperature range. For example, in inductive heating, a coil can be used to cause internal joule heating in the material via an alternating field imposed by the coil. Upon reading and understanding the disclosed subject matter, a person of ordinary skill in the art will recognize than one or more of the heating methods disclosed herein may be used on different components within the additive manufacturing system 470. For example, in various embodiments, a conductive heating element may be applied to the material feedstock 109.

As noted above, another method of introducing heat into the build material is through in-process heating of the material feedstock 109 (e.g., a metal wire/filament) itself during deposition. Heating of the material feedstock 109 allows the same annealing process to occur in the filament (e.g., wire) just prior to and during the deposition step. Once during deposition, as the material feedstock 109 is being deposited the heated filament transmits heat into the newly formed interface, heating it up. The added heat allows for the aforementioned crystalline defect annihilation and material recovery process to occur in the newly formed interface (e.g., on the material layer 481), thereby effectively reducing the crystalline defect density in the interface regions during the build process.

Heating the material feedstock 109 can also be accomplished using one or more of the same conductive, conductive, or non-contact methods described above. Since the material feedstock 109 in the DAED tool 113 and DAED technique is in direct contact with the DAED tool through which the acoustic energy is coupled through, as described above, the conduction method may less effective and could have a negative effect on the resonance and process input window under certain conditions. In the convective, radiative, and inductive methods, the material feedstock 109 can be heated prior to its entrance into the acoustic-energy coupling tool where the acoustic energy is coupled. This heating can prevent unwanted heating of the DAED tool 113.

Depending on the type of materials used, each of the conductive, convective, and non-contact methods may be more effective than others. For aluminum, and parts with smaller z-height in the build direction, heating through the surface plate 111 may provide more flexibility of, and less complexity, in the hardware set up of any of the additive manufacturing systems 400, 430, 450, 470 of FIGS. 4A through 4D.

Overall, as is known to a person of ordinary skill in the art, the Hall-Petch (HP) equation, given by equation (10), below, relates grain size to the toughness of a metal by strengthening grain boundaries. The HP equation indicates that the strength of a metal is equal to the frictional stress plus a factor, k, a material-specific strengthening coefficient, times the inverse of the square root of the grain size, D, where D is a characteristic dimension of the grain. Therefore, grain size reduction is known to increase the toughness of a metal. According to equation (10):

$$\sigma_o = \sigma_i + \frac{k}{\sqrt{D}} \tag{10}$$

where $\sigma_i$ is a material constant for the starting stress for dislocation movement and $\sigma_i$ is the yield stress. Thus, as the grain size decreases, the yield stress increased.

In each of the microstructure development or forming scenarios described herein, the grains forming the microstructure can be deposited to form an isotropic or quasi-isotropic material. Isotropic materials are characterized by properties which are independent of a particular direction of the material. For example, grains may be formed that are substantially isotropically shaped, thereby producing a material with properties independent of direction in which the property is examined. Grain size development as a function of acoustic energy density is shown and described in more detail below with reference to FIG. 7.

Figure 5:
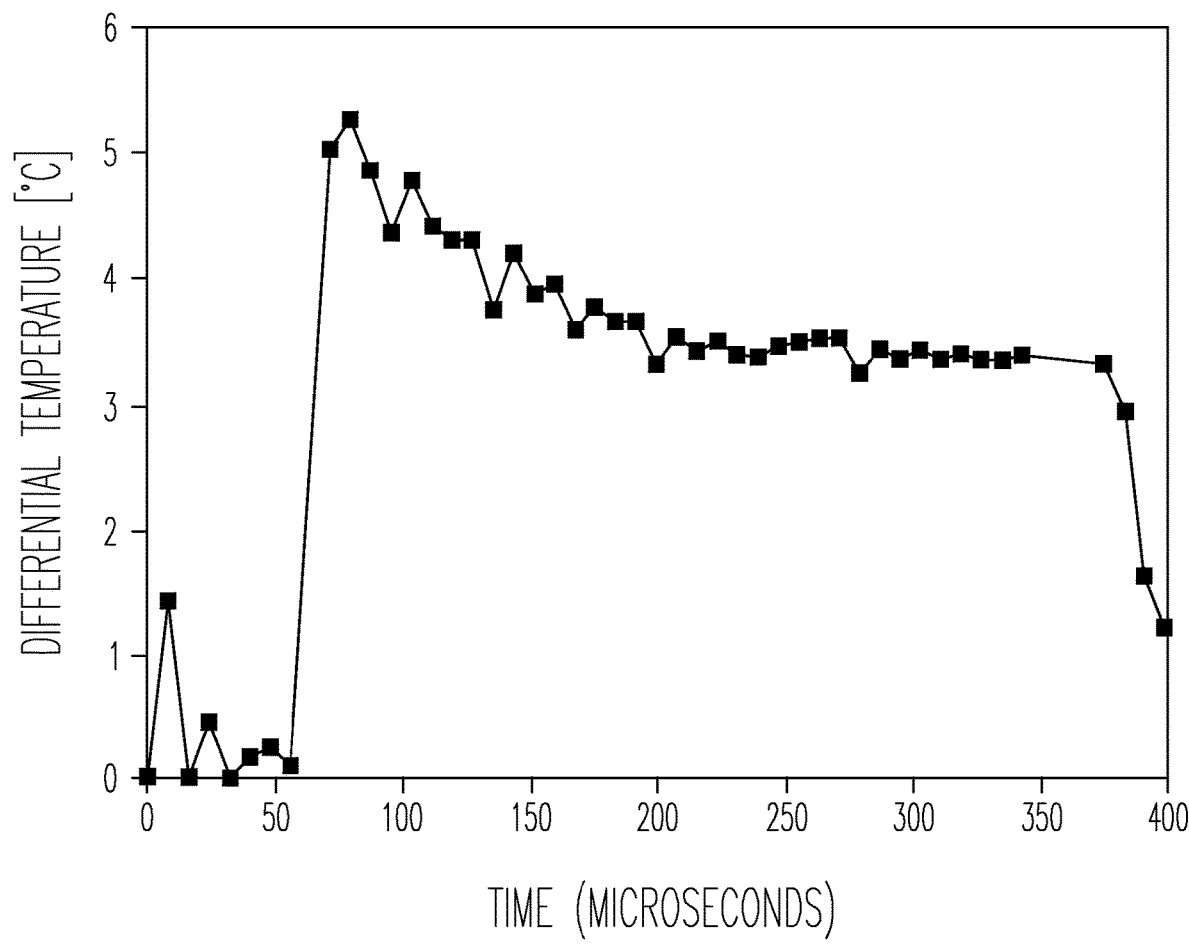
FIG. 5 is a graph showing an example of the substantially athermal nature of the DAED tool of FIG. 1.

With reference now to FIG. 5, a graph showing an example of the substantially athermal nature of the DAED tool 113 of FIG. 1 is shown. An exemplary time evolution of the temperature at a filament-substrate interface is shown over a period of 400 μsec. Based on experimental results, the time evolution of temperature at the filament-substrate interface indicates that the fusion of a voxel initiates within 30 μsec of an application of acoustic energy, while the shaping of the voxel continues to develop as the voxel process-time continues (in FIG. 5, the subjection of the acoustic energy on the voxel starts at about 50 μsec). The relative movements between the two surfaces provide frictional heating that results in the sharp temperature rise after 50 μsec. Another 30 μsec into the process, a metallurgical bond starts to form and the relative movements between the filament and the substrate stops, thereby removing the frictional heat source and allowing the interface temperature to drop. A maximum temperature rise of about 5° C. is observed.

Another feature in the illustrated temporal temperature profile is the sharp reduction at about 350 μsec where the acoustic vibration stops, indicating the removal of the second heat source in the process: cyclic plastic strain heating due to the high-frequency cyclic shear deformation in the voxel as it forms. In operation, the additive manufacturing systems 400, 430, 450, 470 (see FIGS. 4A through 4D) may apply acoustic energy to a voxel for a suitable length of time, for example, 100 μsec, 200 μsec, 320 μsec, 400 μsec, 550 μsec, or the like.

A temperature rise in the acoustic-based processes described herein can be attributed to three heat sources as captured in the temporal temperature evolution graph as shown in FIG. 5: (1) the volumetric heat generation from large amounts of plastic deformation associated with the height, h, change in the filament during voxel formation; (2) the frictional heat generated due to the cyclic relative motion between the filament and the substrate (or an existing deposited surface); and (3) the cyclic shear deformation of voxel in the filament-axial direction.

The volumetric heat generation due to plastic deformation associated with the voxel height change can be evaluated by first calculating the mechanical work done during linear deformation as shown by equation (11):

$$W_p = \int_{h_o}^{h} \text{area} \times \sigma_y \times \delta h \tag{11}$$

where $\sigma_y = \xi K \varepsilon_p^n$ is the flow stress, $\xi$ is the softening factor due to the applied acoustic energy, $\varepsilon_p$ is the plastic strain, and K and n are material constants. For example, for aluminum, K=155.65 MPa and n=0.2123. Assuming $\xi$=1, the total work for a voxel formation is $W_p$=0.01 Joules. For aluminum, researchers have shown that approximately 30% of plastic strain energy will dissipate as heat while the remainder of the energy is stored in defects in the lattice. Consequently, the compressive strain in the voxel formation amounts to less than about 0.01 W of the volumetric heat generated during formation of an aluminum voxel, considering that in the exemplary embodiment considered, the voxel formation process takes place over about 300 milliseconds.

The second source of heat generation, $Q_f$, is the frictional heating from the relative movements between the voxel and the substrate or the voxel and the DAED tool 113. If the assumption is made that there is no slip between the DAED tool 113 and the voxel, this can be modeled as shown by equation (12):

$$Q_f = \mu F U \tag{12}$$

where $\mu$ is the coefficient of friction of the voxel-substrate contact, and U is the speed of the relative movement between the two surfaces. U can be approximated as U=4Af, where A is the amplitude of vibration, f is the frequency of vibration, and F is the contact force.

In an exemplary operation of the additive manufacturing systems of FIGS. 4A through 4C with aluminum, a metallurgical bond forms at approximately 30 microseconds into voxel formation when the contact force of the DAED tool 113 is about 10 N, the vibrational amplitude is about 0.98 microns, and the frequency is about 60 kHz. For an aluminum filament-aluminum substrate interface subjected to the 60 kHz ultrasound vibration, a friction coefficient of about 0.3 is assumed during voxel formation. Based on these values, the total frictional heat generation on the filament-substrate contact is calculated to be about 0.7 W.

The third component of heat generation takes place as the plastic strain due to the cyclic deformation in the voxel dissipates as volumetric heat. In an exemplary embodiment, the amplitude of vibration at the DAED tool 113-to-voxel contact is 0.98 microns; this is also the maximum displacement on the surface of a voxel at a given cycle of vibration. The resulting total shear strain during voxel formation varies from 0.33% to 0.83%. For the aluminum used in this exemplary embodiment, the strain above which the voxel enters plastic deformation is 0.13%). The amount of strain in each vibration cycle contributing to plastic strain heating, therefore, varies from 0.2% to 0.7%. Taking into account the 30% heat dissipation partition and the operating frequency of this exemplary UFM process, the average total heat generation due to cyclic plastic deformation during voxel formation is about 0.75 W.

With concurrent reference now to FIG. 6 and reference again to FIG. 1, in a specific exemplary embodiment used in one experimental setup, the acoustic-energy coupling tool 107 is coupled through the coupling horn 103 to the transducer 101, which is vibrating at 60 kHz. The material feedstock 109 comprises a 300 μm diameter, pure aluminum wire (99.9%) that is fed between the DAED tool 113 and the surface plate 111. In this experimental setup, the surface plate 111 is placed on a load cell (not shown in FIG. 1) to measure forces exerted by the DAED tool 113 on the aluminum wire during a uniaxial compression test. An amplitude of the acoustic vibration at the tip of the DAED tool 113 was measured using a vibrometer.

Figure 6:
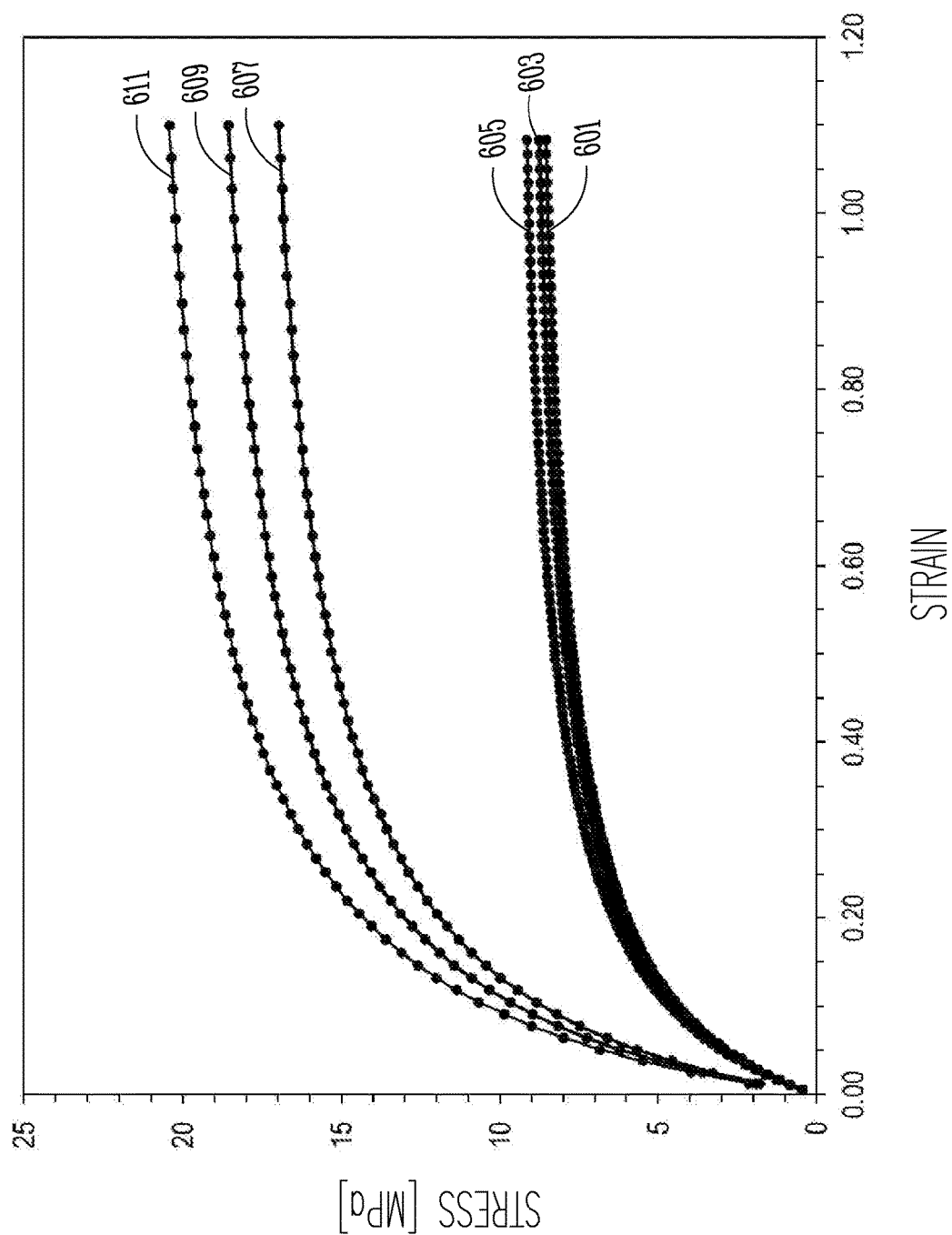
FIG. 6 is a graph showing an example of a stress versus strain curves for a variety of different acoustic energy densities and strain rates.

During the experimental uniaxial compression tests, the DAED tool 113 vibrates at 60 kHz frequency and at the same time compresses the 300 μm aluminum wire at a constant strain rate to a logarithmic strain of 1.1. Force exerted by the tool on the wire is recorded by the load cell. By deforming the filament at different strains, instantaneous area measurements were performed to calculate the true stress (as opposed to engineering stress, which assumes that the initial cross-sectional area of the 300 μm aluminum wire does not change). Several compression tests were conducted at different acoustic energy densities and compression strain rates to study the effect of acoustic energy density and strain rate on the evolution stress and microstructure. Table III, below, summarizes the parameters of each experiment. FIG. 6 is a graph showing an example of a stress versus strain curves for a variety of different acoustic energy densities and strain rates as exemplified by Table III. The true stress-true strain curves (as opposed to engineering stress-strain curves) were plotted for all experiments.

TABLE III

| Element Number of FIG. 6 Curves | Strain Rate [sec$^{-1}$] | Energy Density [J/m$^3$] |
|---|---|---|
| 611 | 9.5 | 434.35 |
| 609 | 9.5 | 493.61 |
| 607 | 9.5 | 556.66 |
| 605 | 2.9 | 434.35 |
| 603 | 2.9 | 493.61 |
| 601 | 2.9 | 556.66 |

FIG. 6 indicates that, for any experimental condition, initially the stress increases indicating an increase in dislocation density. The slope of each of the curves decreases gradually, and the curves tend to become horizontal for higher values of strain thereby indicating that the stress approaches a steady state. In other words, the rate of strain hardening decreases as the material is strained until negligible strain hardening is observed. As discussed above with regard to the plasticity model discussion, this is due to the rate of dislocation generation and annihilation reaching a balance.

For a fixed strain rate, the steady state is reached at a lower value of stress for compression deformation with higher simultaneous acoustic-energy density irradiation. It is therefore evident that more acoustic softening is achieved at higher input acoustic-energy densities during deformation. Also, the effect of acoustic energy is more pronounced at a higher strain rate. For a particular value of acoustic energy density, steady state is reached at a lower value of stresses at lower static compression strain rates. This means a lower static compression strain rates allows for higher amounts of acoustic softening. This strong strain-rate dependence of static stress-strain behavior is seen in FIG. 6. The inventors note that this strong strain-rate dependence is not in agreement with the results of other researchers who observed that the strain rate has no effect on the amount of softening.

Figure 7:
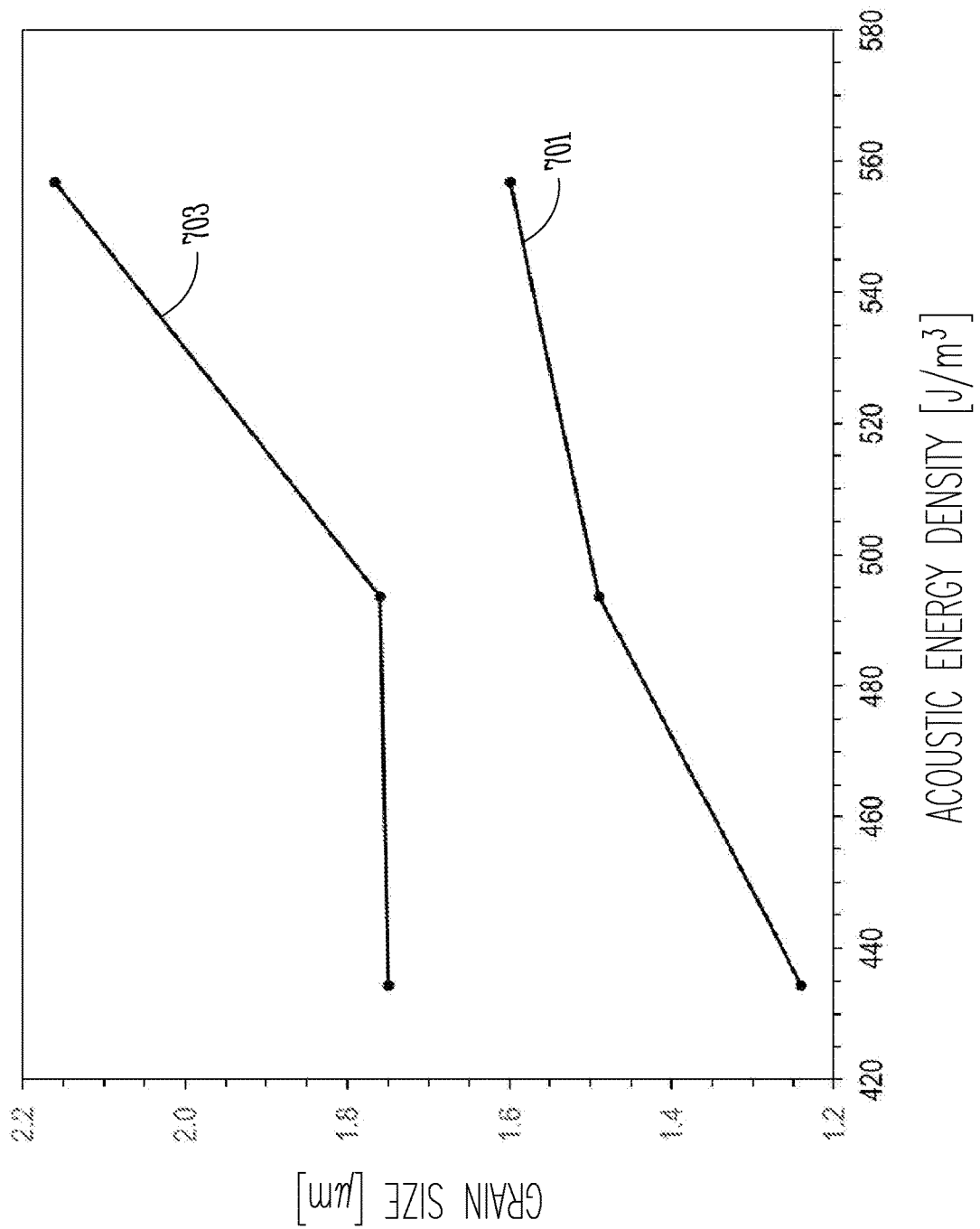
FIG. 7 is a graph showing an example of variations in grain size variation for various acoustic energy densities and strain rates.

FIG. 7 is a graph showing an example of variations in grain size variation for various acoustic energy densities and strain rates. Curve 701 shows grain size as a function of acoustic-energy density for a strain rate of 9.17 sec$^{-1}$. Curve 703 shows grain size as a function of acoustic-energy density for a strain rate of 2.75 sec$^{-1}$. In general, an increase in grain size is observed with an increasing acoustic-energy density applied during deformation. Also, at decreased strain rates, an increase in the grain sizes is observed.

The microstructure evolution during deformation under the influence of acoustic energy follows a similar trend to that during hot deformation. For deformations under the influence of higher acoustic-energy densities, there is an acoustic energy enabled increase in dynamic recovery. This results in rapid dislocation annihilation. A similar increase in dynamic recovery is also observed during deformation with lower strain rates since the dislocations have more time to annihilate. Hence, the steady state between the generation and annihilation is reached at a lower overall dislocation density, which gives rise to larger sub-grain size and lower flow stresses as indicated by FIG. 6, above. On the other hand, at lower acoustic energy densities or higher strain rates, the dislocation annihilation is slower. The balance between generation and annihilation is, therefore, achieved at higher overall dislocation densities, giving rise to smaller grain sizes and higher flow stresses (see FIG. 6).

To model the stress evolution during compression tests with simultaneous acoustic-energy irradiation, experimental data were used to determine several parameters in the KM model. Table IV, below, summarizes the list of parameters obtained from references and the parameters determined using experimental data. Experimental data from one experiment (acoustic-energy density=434.35 J/m$^3$ and strain rate=9.54 sec$^{-1}$) was used to predict evolution of dislocation density with strain.

location density evolution is significantly different from the predicted dislocation-density evolution observed by other researchers.

Using curve fitting, k1 (of the athermal dislocation generation term in equation (4)), $k_2$ (of the strain rate and acoustic energy density dependent annihilation term in equation (4)), and the exponent n in equation (5) were determined. Since $k_2$ is an acoustic-energy dependent, values of $k_2$ for each acoustic-energy density value were determined. Constants $k_{20}$ in equation (5) and $\dot{\gamma}_{00}$* and $\chi$ in equation (8) were also determined using curve fitting. These constants were used in equations (1) through (8), above to find stress values for increasing strains. The stress versus strain curves were plotted for all compression experiments.

Figure 9B:
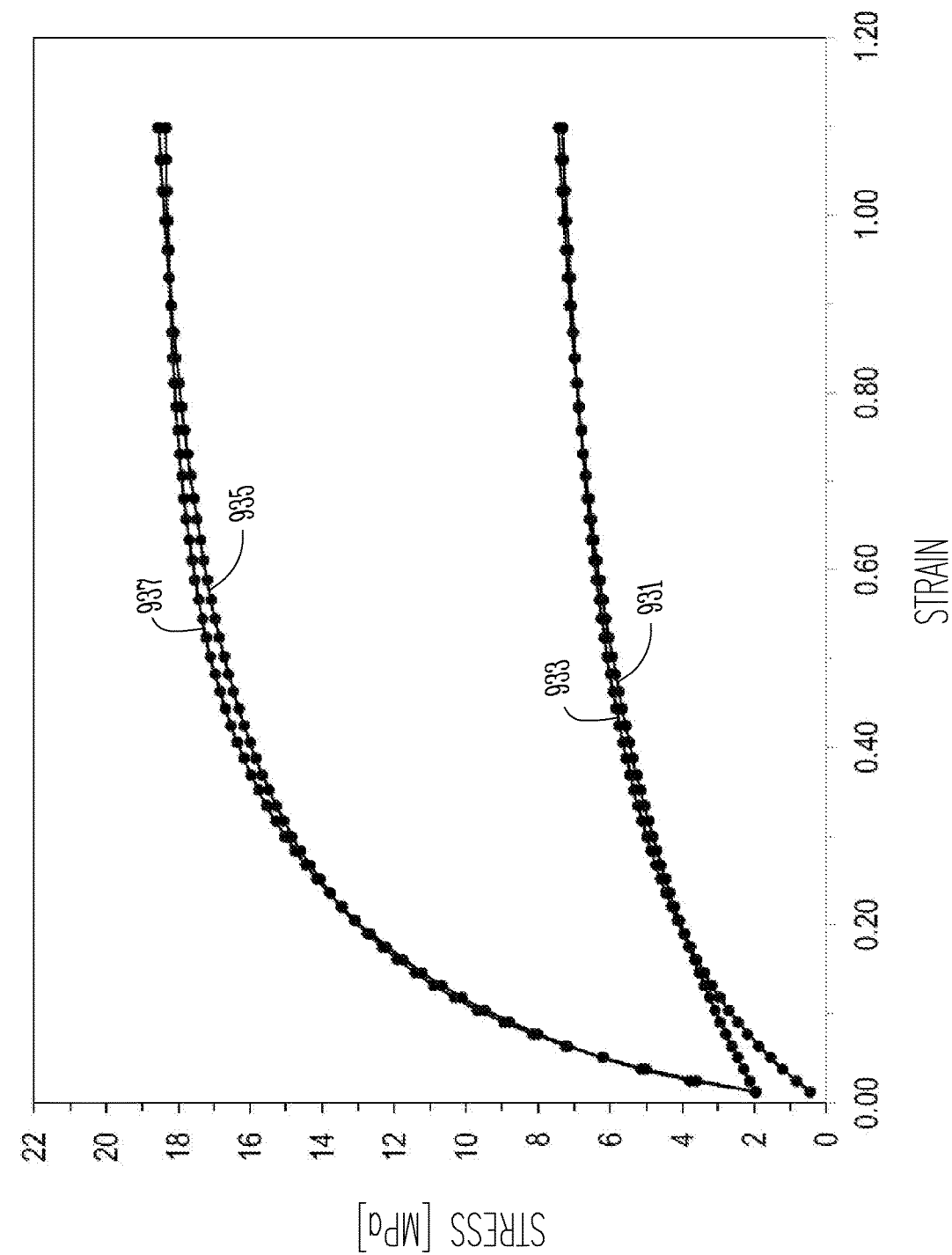
Figure 9C:
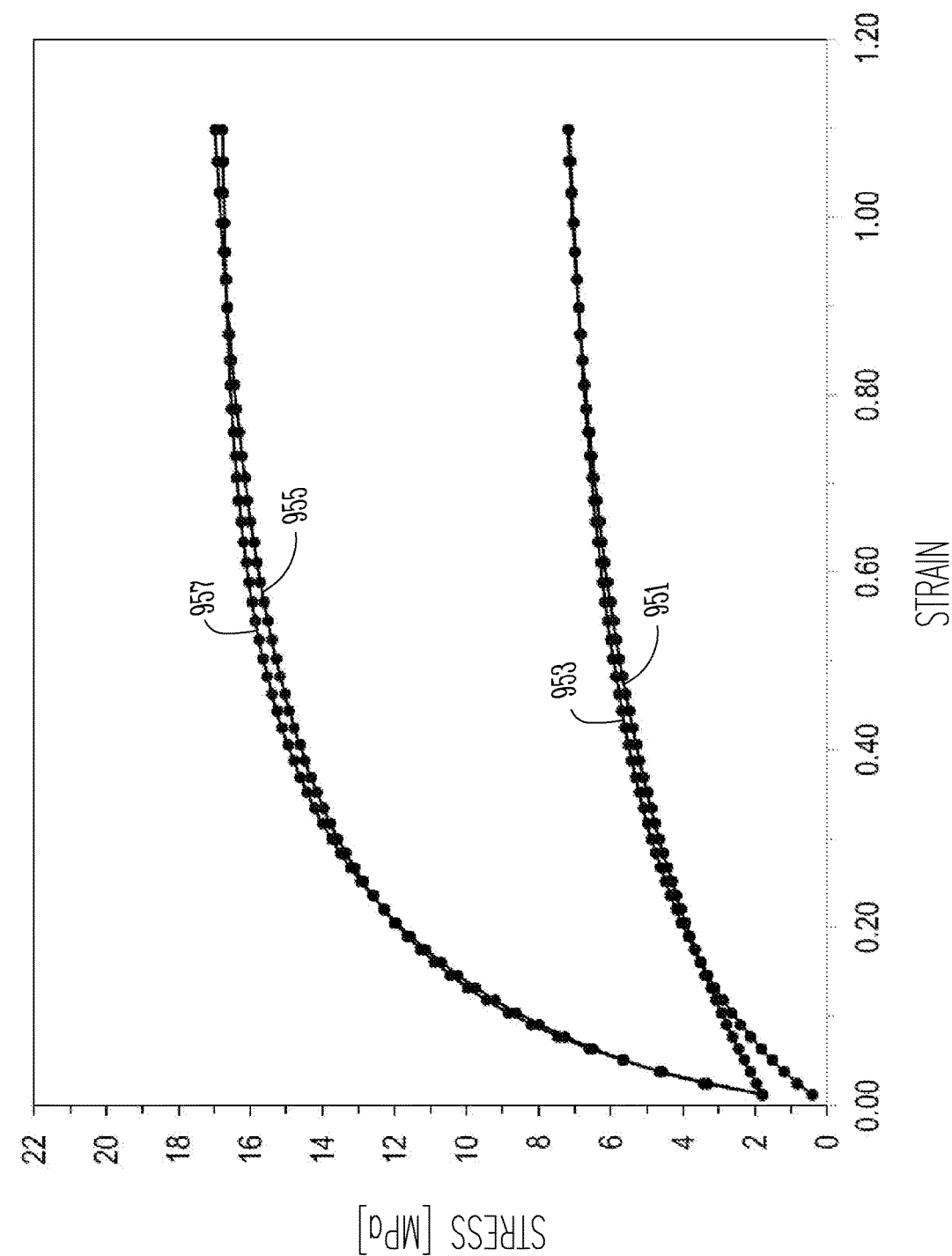

FIGS. 9A through 9C are graphs showing experimental and predicted stress versus strain curves for various acoustic energy densities and strain rates. The curves 900 of FIG. 9A were developed for an ultrasonic energy-density of 434.35 J/m$^3$. Curve 901 shows predicted values for a strain rate of 2.75 sec$^{-1}$; curve 903 shows actual experimental values for a strain rate of 2.75 sec$^{-1}$; curve 907 shows predicted values for a strain rate of 2.75 sec$^{-1}$; and curve 905 shows actual experimental values for a strain rate of 2.75 sec$^{-1}$.

The curves 930 of FIG. 9B were developed for an ultrasonic energy-density of 493.61 J/m$^3$. Curve 933 shows predicted values for a strain rate of 2.75 sec$^{-1}$; curve 931 shows actual experimental values for a strain rate of 2.75 sec$^{-1}$; curve 935 shows predicted values for a strain rate of 2.75 sec$^{-1}$; and curve 937 shows actual experimental values for a strain rate of 2.75 sec$^{-1}$.

The curves 950 of FIG. 9C were developed for an ultrasonic energy-density of 556.66 J/m$^3$. Curve 951 shows predicted values for a strain rate of 2.75 sec$^{-1}$; curve 953 shows actual experimental values for a strain rate of 2.75 sec$^{-1}$; curve 957 shows predicted values for a strain rate of 2.75 sec$^{-1}$; and curve 955 shows actual experimental values for a strain rate of 2.75 sec$^{-1}$.

TABLE IV

| | Parameter | Value | Equation Number |
|---|---|---|---|
| Parameters from References | Pre-exponential Factor, $\dot{\gamma}_0$ [sec$^{-1}$] | $10^6$ | (1) |
| | Shear Modulus, $\mu$ [MPa] | $26 \times 10^3$ | (2), (3) |
| | Burgers Vector, b [nm] | 0.286 | (3) |
| | Exponent in Equation (2), p | 3/4 | (2) |
| | Exponent in Equation (2), q | 4/3 | (2) |
| | Constant in Equation (3), $\alpha$ | 1/3 | (3) |
| | Activation Energy, $Q_d$ [kJ/mol] | 144 | (6) |
| | Taylor Factor, M | 3.06 | (7) |
| Experimentally-Determined Parameters | Coefficient in Equation (4), $k_1$ | 10,779.5 | (4) |
| | Exponent in Equation (5), n | 3.4 | (5) |
| | Coefficient in Equation (5), $k_{20}$ | 22.48 | (5) |
| | Coefficient in Equation (8), $\dot{\gamma}_{00}$* | 0.705 | (6), (8) |
| | Exponent in Equation (8), $\chi$ [J/m$^3$] | 10.05 | (8) |

Figure 8:
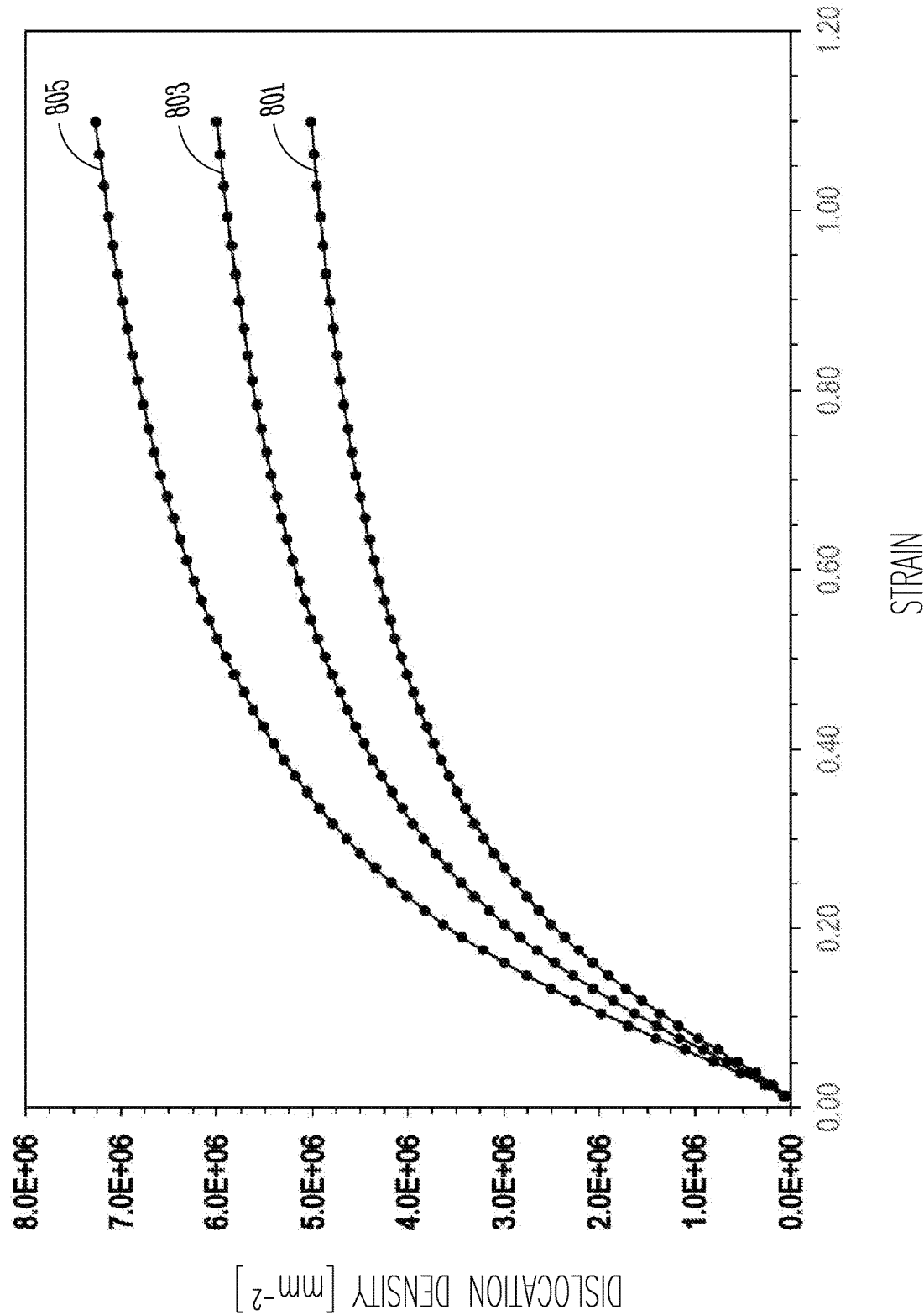
FIG. 8 is a graph showing an example of dislocation density evolution as a function of strain rate for three different acoustic energy densities.

FIG. 8 is a graph showing an example of dislocation density evolution as a function of strain rate for three different acoustic energy densities. Curve 801 is for an acoustic-energy density of 556.66 J/m$^3$; curve 803 is for an acoustic-energy density of 493.61 J/m$^3$; and Curve 805 is for an acoustic-energy density of 434.35 J/m$^3$. FIG. 8 shows that the dislocation density values approach a steady state for larger values of strain. As discussed above, the steady state for dislocation density evolution is reached at a lower value of dislocation density for deformations with higher simultaneous acoustic energy input densities. This predicted dis- It is clear from FIGS. 9A through 9C that for deformations with higher acoustic energy densities, the stress strain curve approaches a steady-state value at lower stresses. This can be attributed to the balance between dislocation annihilation and generation being reached at lower overall dislocation densities, as a result of "athermal" dynamic recovery enabled by increased acoustic energy.

By comparing the experimental and predicted stress versus strain curves in FIGS. 9A through 9C, it can be seen that for all curves, the predicted behaviors reach a steady state at a slightly lower strain than the experimental curves. The slope of all predicted stress versus strain curves is almost zero for a strain of 1. This could be because the microstructure dependent value of Taylor factor M has been considered to be constant assuming that the evolution of dislocation density is much faster than the evolution of the microstructure. In reality, due to the slow evolution of microstructure, value of M changes. This, in turn, causes a prediction of the steady state at lower values of strain. To eliminate this, KM models needs to be further modified to incorporate the changing value of M with microstructure evolution. The KM model described and implemented assumes plasticity from the beginning of loading. Consequently, the KM model does not accommodate yielding phenomenon. This is also the reason why a finite stress is predicted by the KM model for zero strain.

Additional Uses of the Additive Manufacturing Systems of FIGS. 4A through 4D

During service or during manufacturing, cracks often form on the surface of metal components, often due to cyclic loading. These cracks grow to cause faster failure of components or parts. Currently, fusion welding processes like Tungsten Inert Gas (TIG) are used to fill these cracks and thereby repair the surface of the components. These processes use heat energy, usually generated by an electric arc, to melt filler material and fill the crack. More recently, processes such as Laser Engineered Net Shaping (LENS), Laser Direct Metal Deposition (LMD), and Cold Spray have also been used for repairing cracks. The main disadvantage of these processes is that they create a large heat affected zone (HAZ) around the repaired crack because of the large amount of heat energy used to melt the filler material. Unlike the disclosed subject matter described herein, the added heat significantly alters the microstructure of components or parts in the HAZ. The technique described in this disclosure eliminates the aforementioned issues in the final product associated with thermal history and solidification.

As noted herein, the disclosed subject matter is a solid state, room temperature technique in which high-frequency, small amplitude local shear strains are used to achieve energy-efficient volumetric conformation of filler filament into a surface defect. Once the surface defect is filled, this technique also induces metallurgical bonding on filler-repair surface interfaces. This two-fold effect is similar to what heating and melting a filler metal does, but in this new technique no heat is used and both the filler and repaired surface remain solid at room (or ambient) temperatures the entire time. Further, the use of high-frequency, small amplitude oscillatory shear strain results in softening of the metal filler and allows it to "flow" and conform to the shape of the surface defects. Additionally, it also enables large amounts of material exchange at the interface to enable metallurgical bonding. Since the disclosed subject matter described herein uses no heat energy and causes a negligible temperature rise (see FIG. 5, below) during the process, a microstructure of the component around the repaired region remains unaffected. This process can be used to repair metal components in various industries ranging from aerospace, maritime, and automotive industries to small-scale fabrication shops as is described in more detail, below.

As shown and described with regard to FIGS. 4A through 4D, above, various systems can perform surface repairs on, for example, metal components; a robotic arm with a surface repair tool head (e.g., the DAED tool 113 of FIG. 1) based on the technique described in this disclosure to perform in-place/in-situ repair of components or parts in service; and, as especially shown in FIGS. 4B and 4C, the systems use surface vibrations to both (1) detect surface defects; and then (2) repair the defects.

The concept and idea has been validated through two sets of experiments. Artificially created cracks in samples have been filled using the proposed process.

Microstructure Evolution of FCC Metals During Ultrasonic Energy Assisted Deformation Simultaneous application of ultrasonic energy during deformation results in softening of metals allowing plastic deformation at flow stresses much lower than the yield stress of the metal being deformed. There is still a lack of understanding regarding the effect of ultrasonic energy irradiation during deformation on the microstructure, which inhibits wider adoption of ultrasonic energy in more manufacturing processes. In the subject matter described herein, a detailed analysis of the microstructure of metals having face-centered-cubic (FCC) structure after deformation under simultaneous application of ultrasonic energy has been presented. The effect of stacking fault on the microstructure has been analyzed. The differences in microstructure evolution of medium stacking fault energy metal, copper, and high stacking energy metal, aluminum, have been highlighted using and Transmission Electron Microscopy (TEM) and Electron Backscatter Diffraction (EBSD) analysis.

Figures 10A, 10B:
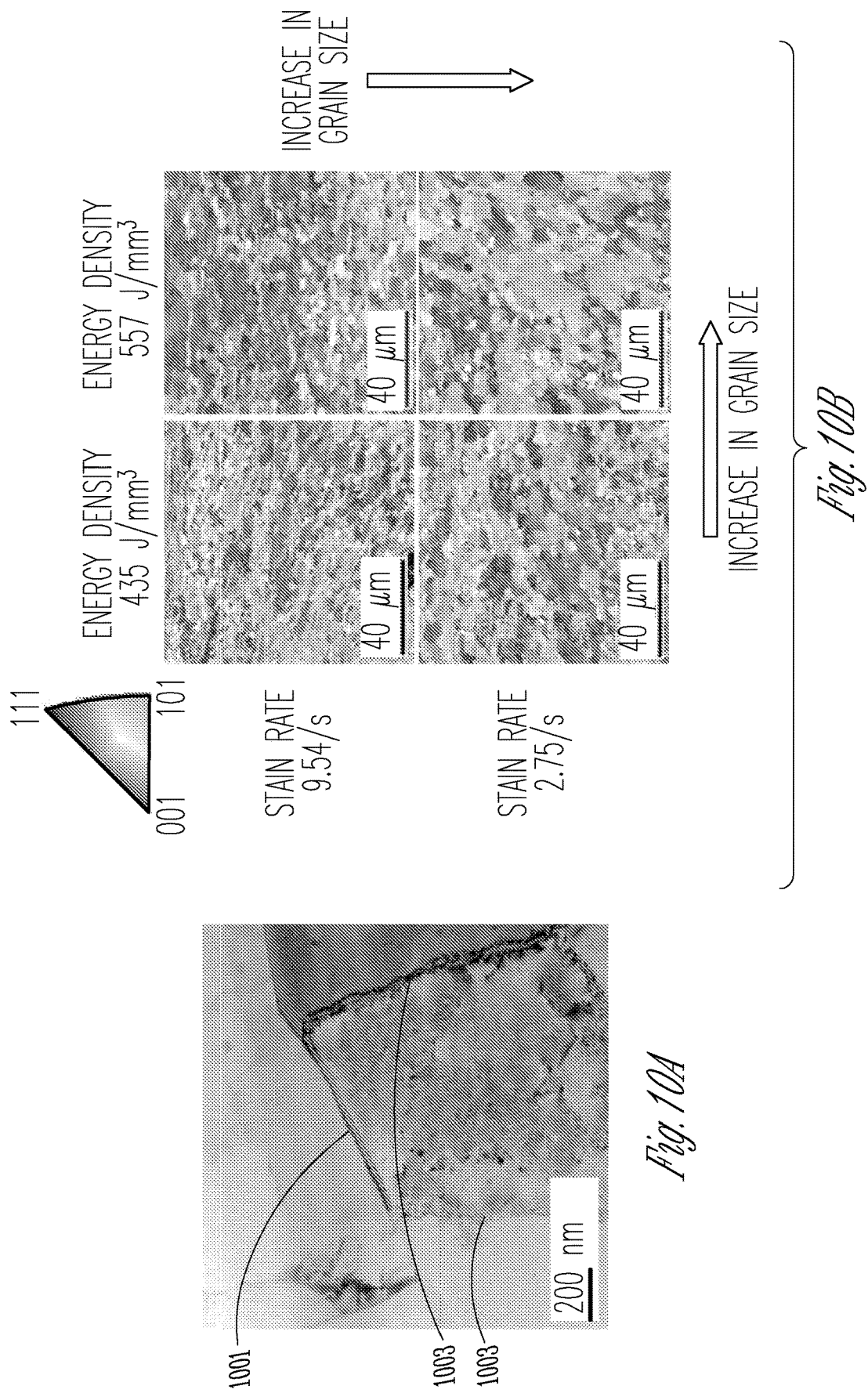
FIG. 10A shows an example of a bright field Transmission Electron Microscopy (TEM) image of the after-deformation microstructure of pure aluminum wire compressed under simultaneous application of acoustic energy.
FIG. 10B shows an example of Electron Backscatter Diffraction (EBSD) micrographs of aluminum wires deformed under the presence of different ultrasonic energy densities and strain rates.

FIG. 10A shows an example of a bright field Transmission Electron Microscopy (TEM) image of the after-deformation microstructure of pure aluminum wire compressed under simultaneous application of acoustic energy. FIG. 10A shows, in this example, grain boundaries 1001 and sub-grain boundaries 1003.

EBSD analysis revealed assistance to sub-grain formation. FIG. 10B shows an example of Electron Backscatter Diffraction (EBSD) micrographs of aluminum wires deformed under the presence of different ultrasonic energy densities and strain rates.

Figure 10C:
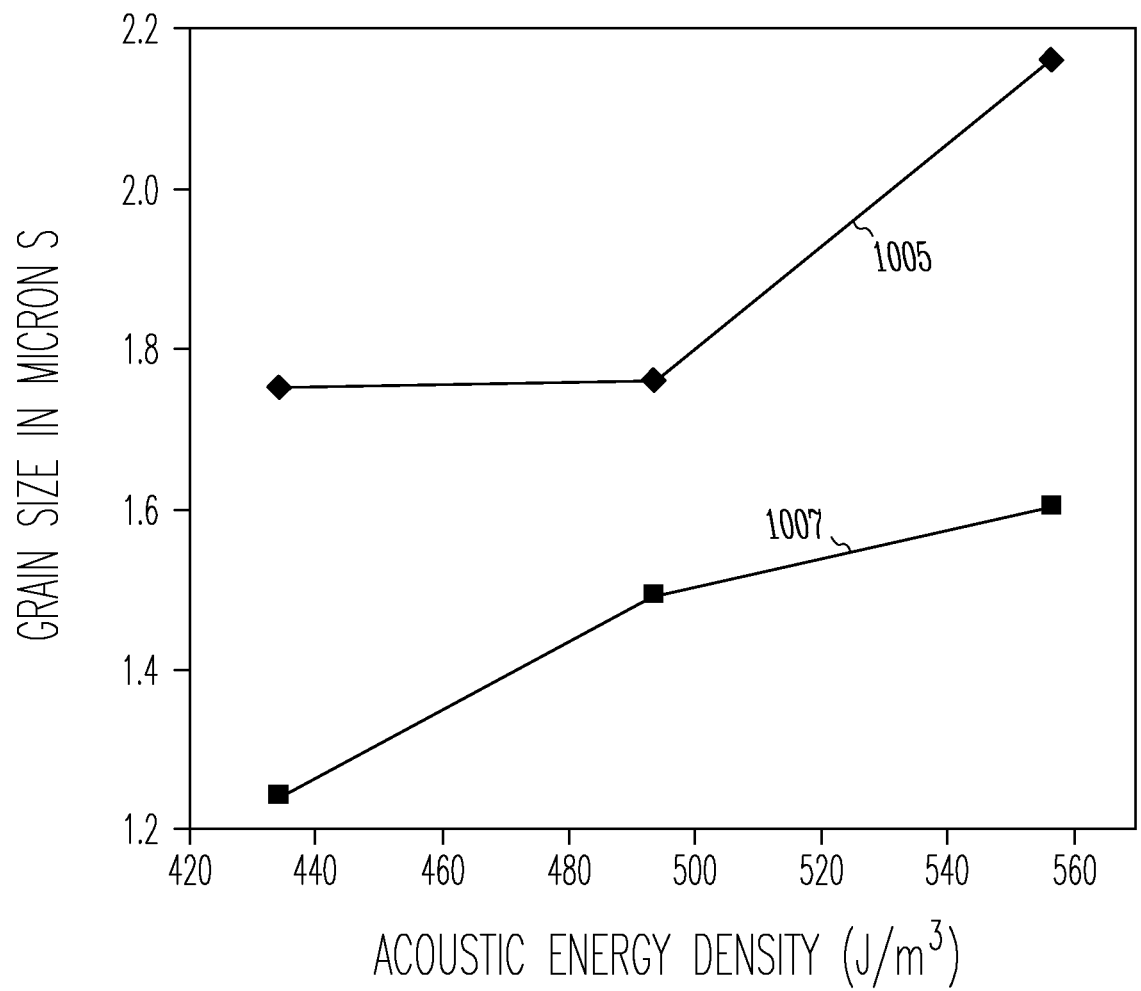
FIG. 10C shows an example of a summary of the effect of ultrasonic energy density and strain rate on the grain size.

FIG. 10C shows an example of a summary of the effect of ultrasonic energy density and strain rate on the grain size. Curve 1005 of the graph of FIG. 10C indicates an approximately grain size at a strain rate of about 2.75 $s^{-1}$. Curve 1007 of the graph of FIG. 10C indicates an approximately grain size at a strain rate of about 9.17 $s^{-1}$.

It was observed that due to lack of dynamic recovery, copper undergoes discontinuous dynamic recrystallization (DDRX) during ultrasonic energy assisted deformation. On the other hand, the recrystallization mechanism in an alloy of aluminum (Al), specifically Al 6061, was found to be geometric dynamic recrystallization (gDRX). The insights obtained in this work advances understanding of parameter-microstructure-property correlation for manufacturing processes such as wire bonding, ultrasonic consolidation, and ultrasound assisted incremental forming. It can also enable new arrays of ultrasonic-vibration energy-assisted advanced manufacturing processes.

Thermomechanical processing is widely used for metal shaping. The reduction in yield stress due to elevated temperature processing reduces the forces required for shaping or forming. It was observed in the 1960s that, similar to deformation at elevated temperature, deformation under the simultaneous application of high frequency acoustic energy (or ultrasonic energy) also results in a reduction in yield stress of metals [1]. This phenomenon is called acoustic/ultrasonic softening. Ultrasonic softening has three distinct characteristics. The first is that it is a transient phenomenon, which ceases to exist once the ultrasonic energy irradiation is stopped. This could potentially help to eliminate cooling time or quenching operations after material processing. The second characteristic is that the amount of ultrasonic energy required to achieve equivalent softening is orders of magnitude less than thermal energy [1]. The third characteristic is that effects of ultrasonic energy can be localized. These unique characteristics present a potential for the use of ultrasonic energy during metal shaping as an alternative to thermomechanical processing.

Ultrasonic energy has been incorporated in wire drawing by Yang et al. [2], in forming by Amini et al. [3] and Abdullah et al. [4], and in friction stir welding by Zhong et al. [5], to take advantage of one or more of the characteristics of ultrasonic softening mentioned above. Wire bonding is a process that is routinely used in the semiconductor industry to achieve an electrical connection between two pads in an integrated circuit (IC) or a semiconductor device. During this process, ultrasonic energy is used to deform and bond metal wires to bond pads. Ultrasonic energy softens the metal wires, thereby enabling their plastic deformation on the bond pad at stresses much lower than the yield stress of metals. Simultaneously, the wire also bonds to the bond pad, thereby establishing an electrical connection [6] [7] [8]. More recently, ultrasonic energy has been used in hybrid additive-manufacturing process called Ultrasonic Consolidation [9] [10] [11] and also in ultrasonic welding [12] [13] [14] [15]. In previous work conducted by the inventors of the disclosed subject matter disclosed herein, a new ultrasonic energy based solid-state additive-manufacturing process was demonstrated that uses wires as starting material and can fabricate near net-shape components in ambient conditions [16] (reference [16] is an article written by both inventors associated with the disclosed subject matter described herein and published after the priority date of the present application). Despite some of its advantages, one main roadblock in the adoption of ultrasonic energy in manufacturing processes has been the lack of understanding of the ultrasonic softening phenomenon.

Since the discovery of the ultrasonic softening phenomenon, the effect of ultrasonic energy on the flow stresses during plastic deformation has been investigated and attempts have been to model the behavior by several researchers [17] [18] [19]. The main focus of most of the investigations has been aluminum or aluminum alloys. Nevertheless, the fundamental understanding of the physics of the softening phenomenon is still incomplete, especially with regard to its effects on the microstructure evolution during deformation process. This understanding of microstructure evolution is critical since the post-deformation microstructure determines the mechanical properties of the deformed metal. Some efforts have been made to this end by researchers. In the context of ultrasonic welding or ultrasonic consolidation, the focus in the literature has been on analyzing the microstructure at the interface between the welded materials [9] [14]. In such studies conducted at the interface, it becomes difficult to decouple the impact of frictional heating and ultrasonic energy on the microstructure evolution.

Zhou et al. used Electron Backscatter Diffraction Analysis (EBSD) to compare the after-deformation microstructure of aluminum and titanium after ultrasonic-assisted compression [20]. Siu et al. used EBSD and TEM analysis to investigate the microstructure and dislocation substructure of aluminum after ultrasonic energy-assisted indentation, and dislocation dynamic simulation was used to hypothesize that ultrasonic energy provides a superimposed oscillatory stress, which helps in dislocation annihilation.

Similar annihilation of dislocations during ultrasonic energy assisted deformation, which led to coarsening of the sub-grain network, was observed in our previous study. The cause of this annihilation remains to be verified. The enhanced dislocation annihilation was taken into account, to model the stress evolution during deformation. The summary of results of ultrasonic assisted deformation of 300-micron aluminum wires has is shown and described with reference to FIGS. 10A through 10C, below, as well as FIG. 1 of reference [22] (reference [22] is an article written by both inventors associated with the disclosed subject matter described herein and published after the priority date of the present application).

As described herein, the effect of stacking fault energy on the microstructure evolution during ultrasonic energy assisted compression has been investigated using EBSD and TEM analysis of aluminum, copper, and aluminum 6061 alloy (Al 6061). An analogy between the resulting microstructure post hot deformation and ultrasonic assisted deformation has been shown. A thorough analysis through a comparison between high stacking fault energy material (aluminum) and medium stacking fault energy material (copper) has been presented.

The effect of stacking fault energy on microstructure evolution during hot working of metals is well understood. For FCC materials, the motion of dislocations in the (111) closed packed slip plane happens along the <110> direction. Whether the motion of dislocations happens as perfect dislocations or through dissociation of dislocations into two partial dislocations (Shockley partial dislocations) is determined by the stacking fault energy of the material. For metals like gold, nickel, and copper with low to medium stacking fault energy, the motion of dislocation by dissociation into two partials is favored since the energy required to generate the wide stacking fault associated with dissociation is less. The dissociation and formation of this stacking fault inhibits climb and cross-slip which restricts recovery and results in an increase in dislocation density.

Beyond a certain limit, the local difference in dislocation density results in grain nucleation. This phenomenon of new grain nucleation and growth during deformation is called discontinuous dynamic recrystallization (DDRX). For high stacking fault energy materials like aluminum, the dissociation of dislocations is not energetically preferred.

Consequently, the motion of dislocation happens as perfect dislocations or with a stacking fault with a very small width. This promotes climb and cross-slip, facilitating dynamic recovery (DRV). The resulting microstructure in the high stacking fault energy materials contains sub-grains with grain interiors having much lower dislocation densities [23] [24]. However, aluminum and aluminum alloys have been shown to exhibit recrystallization behavior during hot deformation. This unique recrystallization behavior is caused by formation of serrated grain boundaries due to sub-grains and subsequent pinching-off of these serrated grain boundaries at a high enough strain which results in formation of new grains. This type of recrystallization is called geometric dynamic recrystallization (gDRX) [23] [24] [25].

A similar fundamental understanding and analysis for post-deformation microstructure of materials deformed under the influence of ultrasonic energy is crucial for the wide spread-application and use of ultrasonic energy in manufacturing processes. The work presented herein provides a detailed insight into the effect of ultrasonic energy on microstructure evolution of FCC metals with different stacking fault energies. The insight reported here will also advance current understanding of parameter-microstructure-mechanical property correlations for manufacturing techniques such as wire bonding, ultrasonic consolidation, and ultrasound-assisted incremental forming.

Experimental Methods

Apparatus

The experimental apparatus for compression testing of 200 μm metal filaments/wires is shown in FIGS. 11A and 11B, which are additional examples of an experimental setup for ultrasonic energy assisted compression testing of metal wires using a directed Acoustic Energy Deposition (DAED) tool similar or the same as the DAED tool 113 of FIG. 1. FIGS. 11A and 11B show a direction of oscillation 1103 (into an out of the page with reference to FIG. 11A) and an area 1101 at which EBSD analysis was conducted. The EBSD analysis is described in detail herein. The apparatus of FIGS. 11A and 11B consists of an acoustic-energy coupling tool 107 that is connected to a transducer 101 (e.g., such as a piezo-electric crystal) through a coupling horn 103 (e.g., that may be comprised of stainless-steel). In various embodiments, the resonant frequency of the system is designed to be 40 kHz although a person of ordinary skill in the art, upon reading and understanding the disclosed subject matter, will recognize that other frequencies, as described herein, may be used as well.

A material feedstock 109 (e.g., a metal filament) is fed under the acoustic-energy coupling tool 107. The tool compresses the filament at a pre-defined strain rate. For all experiments performed and described herein, a constant strain rate of 6 s$^{-1}$ was used.

A material feedstock 109 (e.g., a metal filament) is fed under the acoustic-energy coupling tool 107. The tool compresses the filament at a pre-defined strain rate. For all experiments performed and described herein, a constant strain rate of 6 s$^{-1}$ was used.

The amount of ultrasonic energy density applied to the metal filament during compression was controlled by varying the amplitude of vibration of the acoustic-energy coupling tool 107. The ultrasonic energy density was calculated using the formula, $E = \alpha^2 \omega^2 \rho$, as given by equation (9), above, where $\alpha$ is the vibration amplitude measured at the tip of the ultrasonic energy coupling using a vibrometer, w is the vibration amplitude in rad/s and p is the density of the filament being deformed.

Sample Preparation for Microstructural Analysis

Copper and Al 6061 filaments were deformed under the application of two different ultrasonic energy densities (about 500 J/m$^3$ and about 710 J/m$^3$ for copper and about 150 J/m$^3$ and about 215 J/m$^3$ for Al 6061). A cross section of the deformed filaments was cut, and a standard polishing sequence was followed to prepare the samples for EBSD analysis.

The samples were initially embedded in a two-part epoxy resin for convenience during polishing. Beginning with a 320-grit silicon-carbide (SiC) abrasive paper, the samples were mechanically polished by abrasive papers of increasing grit up to 1200 grit. This was followed by polishing with 3 μm polycrystalline diamond slurry, 0.5 μm polycrystalline diamond slurry, and 0.05 μm colloidal silica slurry. The final polishing step was to polish the samples in a vibratory polisher for about 4 to 5 hours using 0.05 μm colloidal silica slurry. Samples were cleaned in an ultrasonic bath between each polishing step. These samples were then analyzed on an FEI Nova Nanolab™ 600 (Field-Emission Gun, Scanning Electron Microscope (FEG-SEM) equipped with an EDAX EBSD detector. The EBSD maps generated were imported in Orientation Imaging Microscopy (OIM) analysis software for data presentation and analysis.

Sample Preparation for TEM Analysis

To prepare samples for TEM analysis, a cross section of the sample along the length of the wire was cut. The same sample preparation method as described above was used to polish the samples. An FEI Helios Nanolab™ 660 Dual-Beam™ Focused Ion Beam (FIB) was used to lift-out an electron transparent lamella of the sample. A protective platinum layer was deposited on the region of interest. Two trenches were milled on either side of the region of interest. The lamella (or region of interest) was then welded to a needle and separated from the bulk material. The lamella was transferred onto a copper half grid and further thinning was performed at low beam current. The lamellas so prepared were analyzed in a 200 kV FEI Tecnai F20 TEM/STEM equipped with an EDAX EDS detector.

Results and Discussion

Microstructure Analysis of Copper

FIGS. 12A through 12E show example EBSD maps of undeformed copper wire, wire deformed with two different ultrasonic energy densities (approximately 500 J/m$^3$ and approximately 710 J/m$^3$) and at a strain of about 0.51 and about 0.75. FIG. 12A shows undeformed copper wire having an average grain size of about 3.68 μm. FIG. 12B shows copper wire deformed without any ultrasonic energy assistance, a strain of about 0.51, and an average grain size of about 0.89 μm. FIG. 12C shows copper wire deformed with about 500 J/m$^3$ ultrasonic energy density, a strain of about 0.51, and an average grain size of about 1.22 μm. FIG. 12D shows copper wire deformed with about 710 J/m$^3$ ultrasonic energy density, a strain of about 0.51, and an average grain size of about 1.32 μm. FIG. 12E shows copper wire deformed with about 710 J/m$^3$ ultrasonic energy density to a higher compressive strain of about 0.75. The average grain size shown in FIG. 12E is about 0.754 μm. High angle grain boundaries are highlighted by thick black lines while low angle grain boundaries (or sub-grain boundaries) are highlighted by thinner lines. An indicated direction, A1, represents the direction of compression. As noted above, the average grain size of the undeformed wire is 3.68 μm with isotropic grains. The undeformed wire consists of annealing twins marked by various lines in 12A. After deformation, grains appear to be flattened and the grain size decreases to 0.89 μm for deformation without ultrasonic energy assistance as shown in FIG. 12B. For deformation in the presence of ultrasonic energy, the average grain size is higher than that for deformation without ultrasonic energy as shown in FIGS. 12C through 12E. Also, the average grain size increases, albeit only slightly, with an increase in ultrasonic energy density applied during deformation as shown in FIGS. 12D and 12E. FIG. 12C and FIG. 12D show formation of small grains in the vicinity of grain boundaries of larger grains.

FIGS. 13A through 13D show examples of grain orientation spread (GOS) maps for the EBSD maps shown in FIG. 12B through FIG. 12E. FIG. 13A shows copper wire deformed with about 500 J/m$^3$ ultrasonic energy density, a strain of about 0.51, and a recrystallized grain fraction of about 0.041. FIG. 13B showing copper wire deformed with about 500 J/m$^3$ ultrasonic energy density, a strain of about 0.51, and a recrystallized grain fraction of about 0.067. FIG. 13C showing copper wire deformed with about 710 J/m$^3$ ultrasonic energy density, a strain of about 0.51, and a recrystallized grain fraction of about 0.068. FIG. 13D showing copper wire deformed with about 710 J/m$^3$ ultrasonic energy density to a higher compressive strain of 0.75, and a recrystallized grain fraction of about 0.125. The darker-shaded grains have an average GOS of between about 0 to about 1.5; the medium-shaded grains have an average GOS of between about 1.5 to about 5; and the lighter-shaded grains have an average GOS of between about 5 to about 100. Grain orientation spread of each grain is calculated by the OIM software by first calculating the average orientation of the grain. Then, misorientation of each pixel within the grain with the average orientation of the entire grain is calculated. The average of all such misorientations within the grain determines the grain orientation spread of an individual grain. The formula used is given by equation (13):

$$GOS(i) = \frac{1}{J(i)} \sum_j \omega_{ij} \qquad (13)$$

where J(i) is the number of pixels in grain i, $\omega_{ij}$ is the misorientation angle between the orientation of pixel j, and the average orientation of the grain i [26].

Typically, newly formed recrystallized grains have low deformation structure within them. Generally, a low Grain Orientation Spread (GOS) value of about 0 to about 1.5 indicates a recrystallized grain, while a value higher than about 1.5 indicates deformed grains. As is evident from FIGS. 13A through 13D, there is an increase in the fraction of recrystallized grains (represented by the darker-shaded grains) from approximately 0.041 for deformation in absence of ultrasonic energy to approximately 0.068 for deformation in the presence of ultrasonic energy.

With an increase in strain from about 0.51 to about 0.75, the fraction of recrystallized grains increases further to 0.125, as shown in FIG. 13D. The size of the recrystallized grains increases for deformation in the presence of ultrasonic energy and with an increase in acoustic energy during deformation.

Figure 14A:
FIGS. 14A through 14C show examples of TEM bright field images of copper samples after deformation under simultaneous application of ultrasonic energy, where the ultrasonic energy density is about 500 J/m$^3$)
Figure 14B:
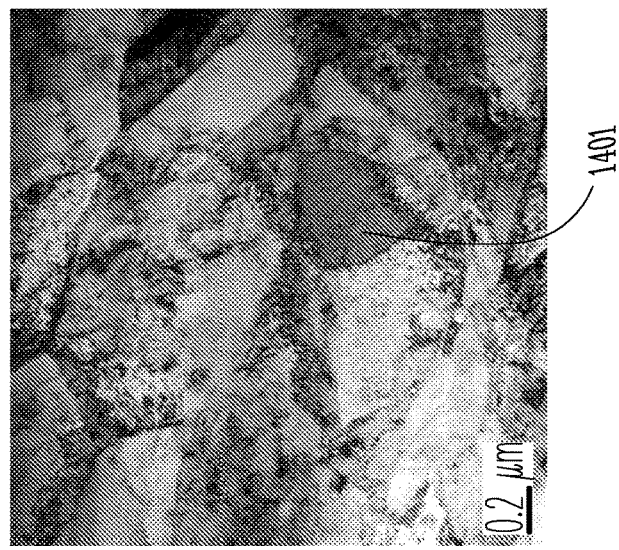
Figure 14C:
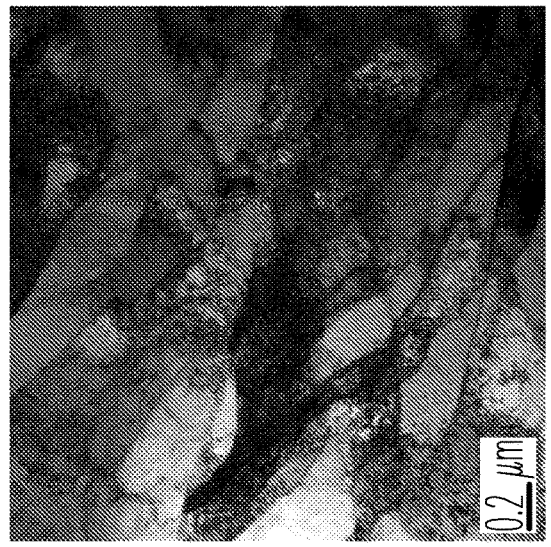

TEM bright field images for copper samples deformed under the presence of ultrasonic energy (ultrasonic energy density of about 500 J/m³) are shown in FIGS. 14A through 14C. The flattened substructure with a very high dislocation density in the interior is clearly evident from FIG. 14A.

FIG. 14B shows recrystallized grain 1401 in the substructure that has a very different orientation as compared to the rest of the substructure as evidenced by the contrast within FIG. 14B. The dislocation density in this grain is also relatively lower than rest of the substructure. FIG. 14C shows formation of low angle sub-grain boundaries 1403 in the vicinity of a grain boundary 1405 of a primary grain.

In warm and hot deformation of medium stacking fault energy materials like copper, as described above, the lack of dynamic recovery in the material leads to local increases in the dislocation density. Of particular interest is the region near the grain boundaries where the relatively large local misorientations result in formation of potential grain nucleation sites and eventual dynamic recrystallization of grains. A similar behavior can be observed in ultrasonic energy assisted deformation. With further deformation accompanied by dislocation entanglement in regions similar to the ones shown in FIG. 14C, the local misorientation of these regions near the grain boundaries 1403, 1405 increases, leading to grain nucleation (grains depicted by darker-shaded regions in FIG. 13B, FIG. 13C, and FIG. 13D).

For hot and warm deformation, it is well documented that an increase in deformation temperature or reduction in strain rate results in an increase in grain size and recrystallized grain volume fraction [24] [27] [28]. The grain size analysis shown and described above with reference to in FIGS. 12B through 12E indicates that when thermal energy is replaced with ultrasonic energy, analogous results in microstructure evolution can be observed. The increased fraction of recrystallized grains for deformation under the presence of ultrasonic energy can be attributed to the assistance of ultrasonic energy in formation of sub-grain boundaries. This sub-grain formation, particularly near the grain boundaries, results in the formation of regions with local misorientations and potential grain nucleation sites.

Figure 15A:
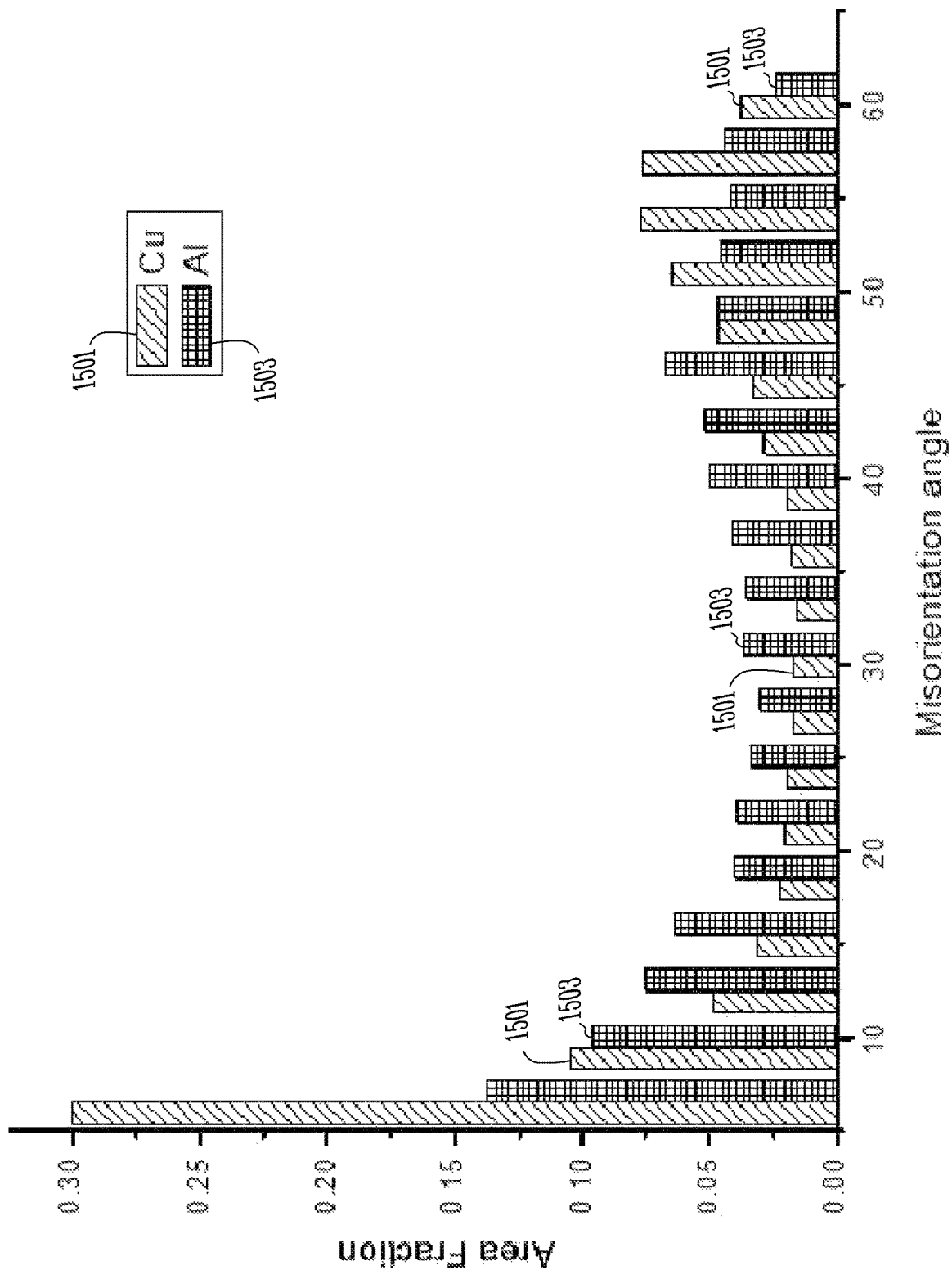
FIGS. 15A and 15B show example graphs of misorientation angle versus area fraction histograms for FIG. 15A showing copper and aluminum deformed under the presence of same ultrasonic energy density.
Figure 15B:
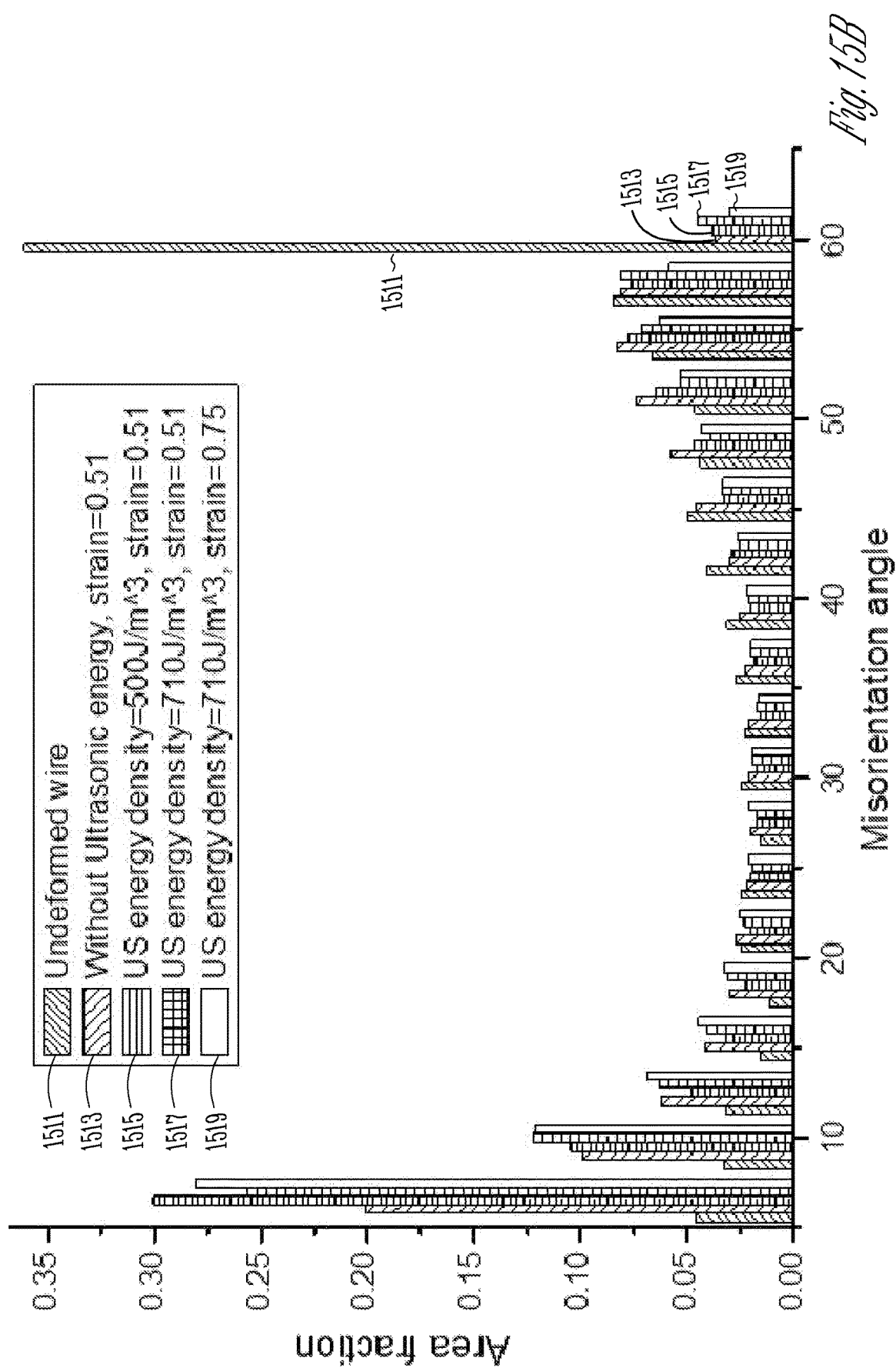

An evidence of assistance to sub-grain boundary (or low angle boundary) formation due to simultaneous application of ultrasonic energy can also be seen in FIG. 15B. FIG. 15B shows undeformed copper wire 1511; copper deformed without ultrasonic energy at a strain of 0.51, 1513; copper deformed in the presence of ultrasonic energy density of about 500 J/m³ at a strain of 0.51, 1515; copper deformed in the presence of ultrasonic energy density of about 710 J/m³ at a strain of 0.51, 1517; and copper deformed in the presence of ultrasonic energy density of about 710 J/m³ to a higher strain of about 0.75, 1519. The area fraction of low angle boundaries (first two columns of the histogram) for copper samples deformed with ultrasonic energy (area fraction of approximately 0.4) is significantly higher than the area fraction for copper samples deformed without ultrasonic energy (area fraction of approximately 0.19). Similar assistance to sub-grain formation was observed during ultrasonic energy assisted indentation experiments [21].

The complete absence of such recrystallization in aluminum after ultrasonic energy assisted deformation, as seen in FIGS. 10A through 10C and FIG. 1 of [22], which was published (subsequent to the priority date of this application) by the inventors of the present disclosed subject matter, is because aluminum has high stacking fault energy. This high stacking fault energy promotes dynamic recovery during deformation of aluminum assisted by ultrasonic energy. Hence, although there is formation of low angle or sub-grain boundaries (as seen in Error! Reference source not found. 10A), the low dislocation density prevents local misorientations from increasing, thereby suppressing DDRX. The very high fraction of low angle boundaries in copper as compared to aluminum, as evident from FIG. 15A, also indicates higher local misorientations within the primary grains, which contribute to increased DDRX. FIG. 15A shows copper 1501 and aluminum 1503 deformed under the presence of same ultrasonic energy density. Even though copper and aluminum have the same FCC crystal structure, it is only the difference in their stacking fault energies that results in a starkly different microstructure after deformation under similar conditions of ultrasonic energy density and strain rate.

Microstructure Analysis of Al 6061

FIGS. 16A through 16C show examples of inverse pole figure (IPF) maps. FIG. 16A shows undeformed Al 6061 wires with an average grain size of about 6.05 μm. FIG. 16B shows Al 6061 wire deformed under the presence of ultrasonic energy density of about 150 J/m³, a strain of about 0.75, and an average grain size of about 0.33 μm. FIG. 16C shows Al 6061 wire deformed under the presence of ultrasonic energy density of about 215 J/m³, a strain of about 0.75, and an average grain size of about 0.52 μm. High angle grain boundaries are highlighted by thick black lines while low angle grain boundaries (or sub-grain boundaries) are highlighted by thinner lines. A direction, A1, represents the direction of compression. The IPF maps show a negligible amount of sub-grain boundaries. In contrast, the EBSD maps of FIGS. 12C through 12E of wires deformed under the presence of ultrasonic energy show substantial sub-grain formation. The after-deformation grain size decreases and very fine grains appear at the grain boundaries of larger grains. As noted above, for deformation using ultrasonic energy density of about 150 J/m$^3$, the average grain size is about 0.33 μm and increases to about 0.52 μm for deformation using ultrasonic energy density of approximately 215 J/m$^3$.

The corresponding grain orientation spread maps of the EBSD maps in FIGS. 16A through 16C are shown in FIGS. 17A and 17B. FIGS. 17A and 17B show examples of grain orientation spread (GOS) maps. FIG. 17A shows Al 6061 wire deformed with about 150 J/m$^3$ ultrasonic energy density, at a strain of about 0.75, with an average grain size of about 0.33 μm. FIG. 17B showing Al 6061 wire deformed with about 215 J/m$^3$ ultrasonic energy density, at a strain of about 0.75, with an average grain size of about 0.52 μm. The darker-shaded grains have an average GOS of between about 0 to about 1.5; the medium-shaded grains have an average GOS of between about 1.5 to about 5; and the lighter-shaded grains have an average GOS of between about 5 to about 100. A very high fraction of recrystallized grains (approximately 0.36), depicted by the darker-shaded grains, can be seen in the GOS maps. Although it might appear from this particular map that the fraction of recrystallized grains is higher for sample deformed with ultrasonic energy density of 150 J/m$^3$, an overall average of several such maps showed that there was no significant change in the fraction of recrystallized grains with the change in ultrasonic energy density.

Figure 19:
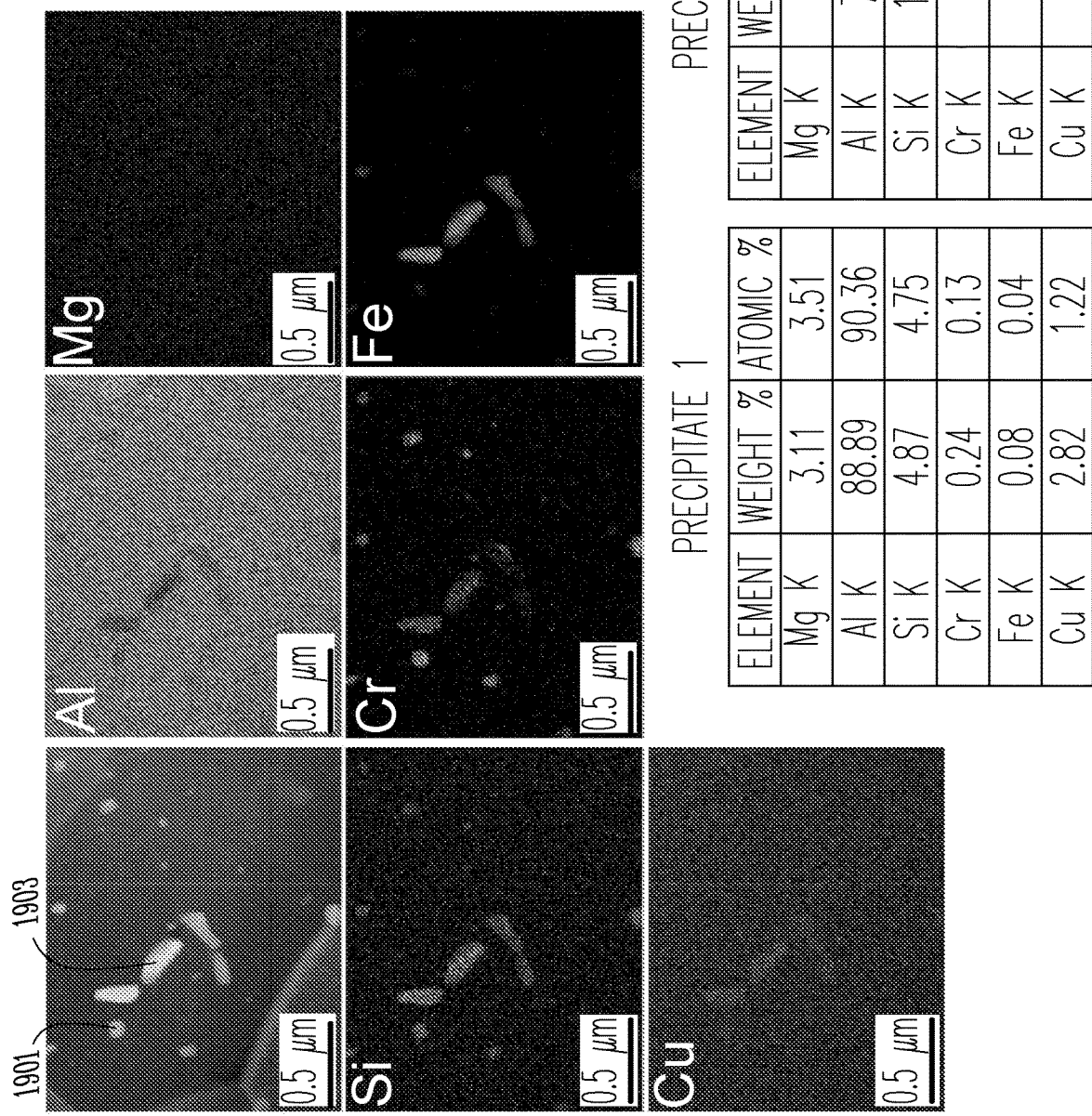
FIG. 19 shows examples of Energy Dispersive X-Ray Spectroscopy (EDS or EDX) maps of the Al 6061 sample deformed with about 210 J/m$^3$ ultrasonic energy density. The table indicates the quantitative EDS point analysis for the two precipitates shown in the electron image.

FIGS. 18A through 18C show examples of Scanning Transmission Electron Microscopy (STEM) images. FIG. 18A showing Al 6061 wire deformed with about 210 J/m$^3$ ultrasonic energy density. The STEM image in FIG. 18A shows a classical recrystallization microstructure with a larger grain surrounded by smaller recrystallized grains. The Al 6061 alloy is a precipitation-hardened Al—Mg—Si alloy. FIG. 18B showing a bright field TEM image of the same sample with precipitates 1801. The precipitates 1801 are Mg$_2$Si precipitates in the alloy, which provide hindrance to dislocation motion [29]. FIG. 19 shows examples of Energy Dispersive X-Ray Spectroscopy (EDS or EDX) maps of the Al 6061 sample deformed with about 210 J/m$^3$ ultrasonic energy density. The table indicates the quantitative EDS point analysis for the two precipitates shown in the electron image. The table shows the elemental distribution in the precipitates and the matrix. It can be seen that Si, Cr, and Fe are concentrated in the precipitates while Mg and Cu are distributed approximately uniformly. Some precipitates are richer in Cr and Fe as seen from the two tables which show the quantitative EDS analysis in the respective precipitates shown in the electron image (e.g., precipitate 2 is richer than precipitate 1). FIG. 18C showing a bright field TEM image with a sub-grain boundary 1803. The sub-grain boundary 1803 is formed by entangled dislocations and can be seen along with other dislocations within the sub-grain. In this example, the overall dislocation density is much lower than that observed for copper samples.

The grain refinement observed in the after-deformation microstructure of samples deformed under simultaneous application of ultrasonic energy (see FIGS. 16A through 16C) can be attributed to the recrystallization, as observed in FIGS. 17A and 17B. Although aluminum alloys have a high stacking fault energy, these alloys have shown to undergo recrystallization during hot deformation. The recrystallization is caused by formation of serrated grain boundaries which get pinched during deformation. This pinching results in formation of small grains of the order of sub-grains at the boundaries of larger grains. This phenomenon, called geometric dynamic recrystallization (gDRX), has been observed for aluminum alloys [25] [30] [31]. There are two possible explanations for observation of gDRX in Al 6061 and not in pure aluminum (as seen in FIGS. 10A through 10C and [22]). Al 6061 alloys contain precipitates that obstruct dislocation motion and cause dislocation pile-up and generation of new dislocations at the precipitates, as shown in FIG. 18B and FIG. 18C. Interaction of local dislocations with pile-ups results in subsequent formation of sub-grains. These sub-grains are the cause for formation of serrated grain boundaries [31].

A second factor is that the initial average grain size of the undeformed pure aluminum wire was approximately 10 μm while the average size of the undeformed Al 6061 wire was approximately 6 μm. It has been observed during hot deformation that the reduction in initial grain size helps to initiate gDRX at a lower value of strain [25]. During compression, the width (dimension along the compression direction) of grains with smaller initial size approaches the sub-grain size at a lower strain value. Hence, the pinching-off of sub-grains and subsequent gDRX happens at a lower strain value than for grains with larger initial size. So, the smaller grain size of Al 6061 wire contributed to the observation of gDRX in Al 6061. But whether it was the only factor or whether the precipitates in Al 6061 also played a role requires further investigation.

Figure 20A:
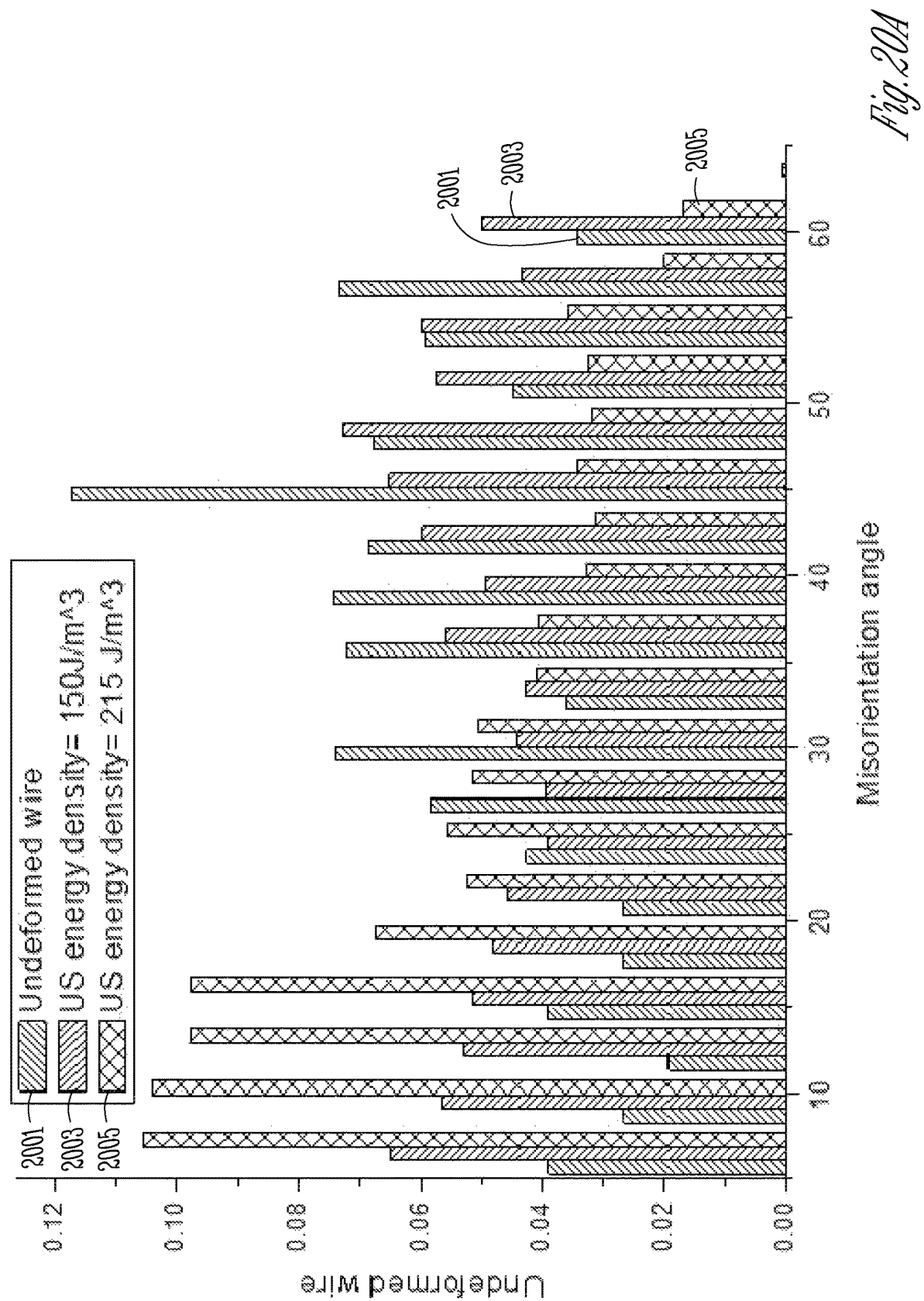

The assistance to sub-grain formation due to simultaneous application of ultrasonic energy is evident from the misorientation angle versus area fraction graph shown in FIG. 20A. FIG. 20A shows undeformed Al 6061 wire 2001, Al 6061 wire deformed under ultrasonic (US) energy density of about 150 J/m$^3$ 2003, and Al 6061 wire deformed under ultrasonic energy density of about 215 J/m$^3$ 2005. The fraction of sub-grain boundaries or low angle boundaries (first two columns in the histogram) increases significantly with an increase in ultrasonic energy density. The average grain size and the size of the grains which have gone through gDRX depends on the sub-grain size [25]. It was observed in [22] that for pure aluminum, the sub-grain size increases with an increase in ultrasonic energy density. For Al 6061, the increase in average grain size and the size of recrystallized grains (see FIGS. 16A through 16C) with an increase in ultrasonic energy density can be attributed to this increase in sub-grain size. FIG. 20B shows aluminum (Al) 2011 and Al 6061 2013 deformed under similar conditions of ultrasonic energy density. The lesser fraction of sub-grain boundaries for Al 6061 as compared to aluminum, evident to a person of ordinary skill in the art from FIG. 20B, is due to gDRX of sub-grains which transforms sub-grain boundaries into high angle boundaries.

As disclosed herein, a detailed analysis of the effect of stacking fault energy on the microstructure of FCC metals during ultrasonic energy assisted deformation was conducted. It was observed that ultrasonic energy assists in sub-grain formation. This observation is in line with earlier observations made in the literature [21]. For copper, which is a medium stacking fault energy metal, lack of dynamic recovery resulted in high dislocation density. Evidence of discontinuous dynamic recrystallization (DDRX) was observed analogous to hot deformation. A comparison of microstructure of medium stacking fault energy metal (copper) and high stacking fault energy metal (aluminum from previous studies) was made using EBSD and TEM analysis. For Al 6061, geometric dynamic recrystallization (gDRX) was observed after ultrasonic energy assisted deformation.

Figure 21:
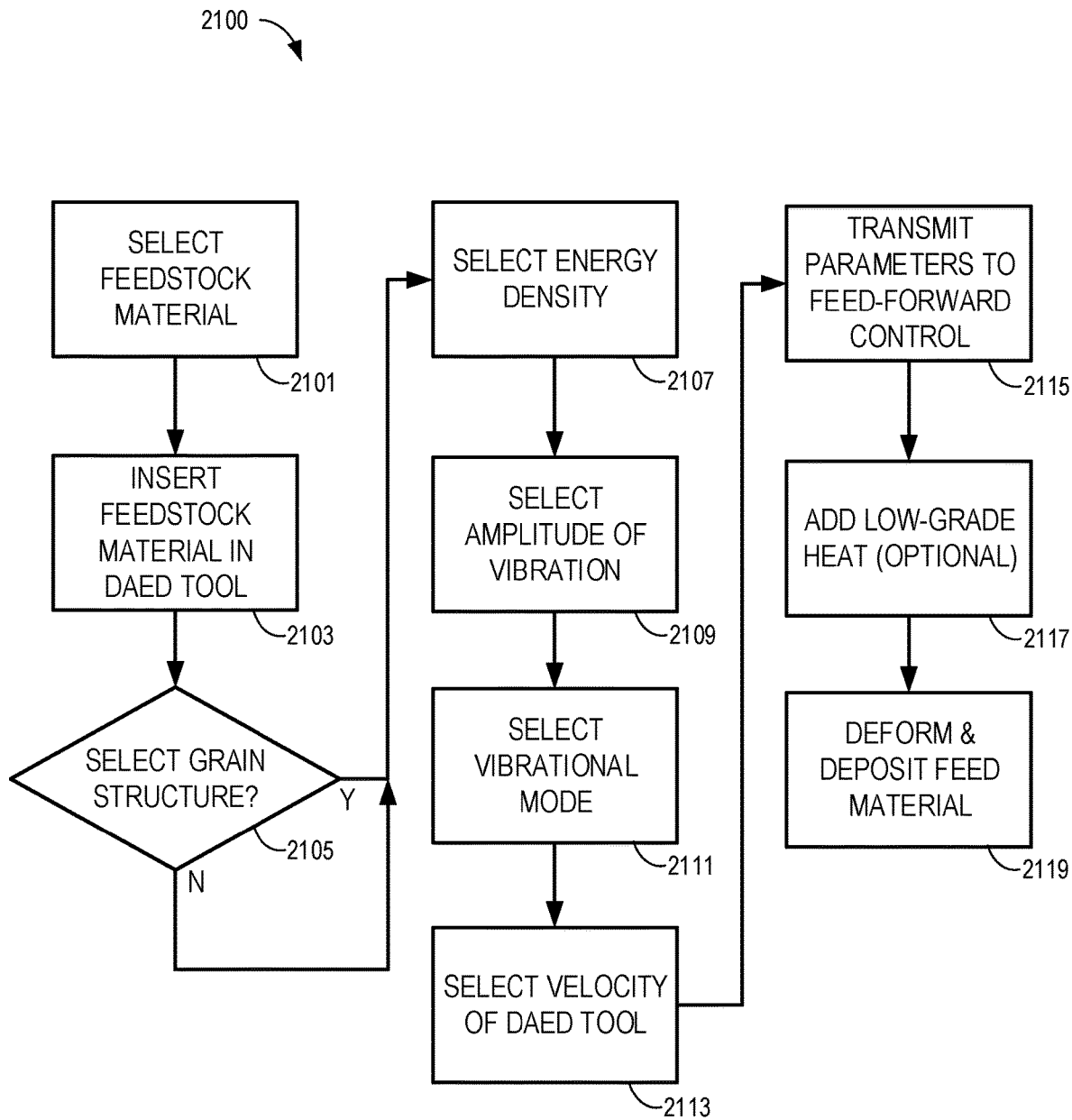
FIG. 21 shows an exemplary embodiment of a method of for deforming and depositing a feedstock material.

In various embodiments, the disclosed subject matter includes a variety of methods for deforming and depositing a feedstock material. A person of ordinary skill in the art, upon reading and understanding the disclosed subject matter, will recognize a number of different methods for deforming and depositing a feedstock material that have already been presented herein, or can readily be determined, with reference to the structure, operation, and design of the DAED tool. However, in one specific exemplary embodiment, an example of a method is shown and described in more detail. With concurrent reference to FIG. 21 that shows an exemplary embodiment of a method 2100 for deforming and depositing a feedstock material, the method 2100 includes, at operation 2101, selecting the feedstock material, inserting the feedstock material into a Directed Acoustic Energy Deposition (DAED) tool at operation 2103, and selecting at least one parameter to control the DAED tool. The selectable parameters include selecting an energy density at operation 2107, selecting an amplitude of vibration at operation 2109, selecting a vibrational mode at operation 2111, and selecting a velocity of the DAED tool 2113. The selection of parameters however may not be required if all parameters are already stored in a database or look-up table and correlated to, for example, a specific feedstock material and/or a desired grain structure, for example, as shown at operation 2105, for the selected feedstock material.

Once the parameters are selected, the parameters may be transmitted to, for example, a feed-forward control system, at operation 2215, as described elsewhere herein. The feedstock material is then deformed and deposited, at operation 2119, in accordance with the various descriptions and figures supplied herein. In various embodiments, low-grade heat may also be added (operation not shown specifically) to at least one of the DAED tool and the feedstock material as described with reference to, for example, FIG. 4D.

The insights reported here improve upon the current understanding of the effect of ultrasonic energy irradiation during deformation on the microstructure of FCC metals. It advances the understanding of correlation between the post-processing microstructure and deformation conditions for processes such as ultrasonic consolidation, ultrasound-assisted incremental forming, wire bonding, and other ultrasonic energy assisted forming processes. A deeper understanding of ultrasonic energy-metal interaction derived from this work will help to increase the adoption of ultrasonic energy in the manufacturing industry.

Overall, a person of ordinary skill in the art will appreciate that important aspects or characteristics of the additive-manufacturing operations of the DAED tool 113 (see FIG. 1) include (1) the mechanical stress, and therefore mechanical-energy input, used to "shape" the solid filament into a desired 3D geometry as the filament is reduced in the presence of applied acoustic (e.g., sonic or ultrasonic) energy as compared with the yield strength of the material; (2) the amount of mass transport across the inter-filament and inter-layer interfaces to form the various bonds (e.g., metallurgical bond in the case of a solid-metal filament) observed is more than 10,000 times higher than what the Fick's diffusion equation (known to a skilled artisan) predicts under the applied conditions; and (3) the temperature rise of the acoustic-energy process is nearly negligible, a reflection of the high coupling efficiency from acoustic energy input into the required plasticity and mass transport. These unique characteristics enable the acoustic-energy processes disclosed herein to be implemented within a desktop 3D printing environment, as well as within a high-precision, high-fidelity industrial additive-manufacturing setting.

Additionally, the unique nature of the additive-manufacturing operations of the DAED tool 113 can produce fully-dense metal and non-metal 3D printing at room (or ambient) temperature enables simultaneous printing of polymers and metals, a materials combination not feasible in melt-fuse-based metal-additive manufacturing processes. Further, the additive-manufacturing operations of the DAED tool 113 can control both grain size (microstructure) and grain orientation, as described herein. Also, as noted above, the various embodiments can readily be applied to various types of material-repair operations, even in less-manufacturing-friendly environments, such as underwater ship, submarine, or aerospace operations (including deep space environments) repair operations. The ability for the disclosed subject matter to operate in environments such as underwater, or alternatively, in the vacuum of space, is in stark contrast to thermal-diffusion processes of the prior art that relies on furnaces and other heat-generation mechanisms (often operating at hundreds or thousands of degrees Celsius) to change the structure of a material.

Furthermore, the athermal acoustic process described herein operate at the speed of sound in a given material, which can be at least three to four orders of magnitude higher than the prior art thermal processes, even after an appropriate amount of time has passed for the material to ramp up to the level of the furnaces and other thermal devices. Additionally, the acoustic process of the disclosed subject matter is far more energy efficient than thermal processes of the prior art. For example, a 1 W acoustic wave can deposit/repair material more quickly than a 1 MW thermal process of the prior art.

Therefore, the description above includes illustrative examples, devices, systems, and methods that embody the disclosed subject matter. In the description, for purposes of explanation, numerous specific details were set forth in order to provide an understanding of various embodiments of the disclosed subject matter. It will be evident, however, to those of ordinary skill in the art that various embodiments of the subject matter may be practiced without these specific details. Further, well-known structures, materials, and techniques have not been shown in detail, so as not to obscure the various illustrated embodiments.

As used herein, the term "or" may be construed in an inclusive or exclusive sense. Further, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various combinations.

Although various embodiments are discussed separately, these separate embodiments are not intended to be considered as independent techniques or designs. As indicated above, each of the various portions may be inter-related and each may be used separately or in combination with other portions or embodiments.

Consequently, many modifications and variations can be made, as will be apparent to the person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims.

Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

REFERENCES

[1] B. Langenecker, "Effects of Ultrasound on Deformation Characteristics," IEEE Transasction of sonics and ultrasonics, Vols. SU-13, no. 1, March 1966.

[2] C. Yang, X. Shan and T. Xie, "Titanium wire drawing with longitudinal-torsional composite ultrasonic vibration," International Journal of Advanced Manufacturing Technology, vol. 83, pp. 645-655, 2016.

[3] S. Amini, A. H. Gollo and H. Paktinat, "An investigation of conventional and ultrasonic-assisted forming of annealed AA1050 sheet," International Journal of Advanced Manufacturing Technology, 2016.

[4] A. Abdullah, M. Paknejad, S. Dashti, A. Pak and A. M. Beigi, "Theoretical and experimental analyses of ultrasonic-assisted indentation forming of tube," Journal of Engineering Manufacture, vol. 228, no. 3, pp. 388-398, 2014.

[5] Y. B. Zhong, C. S. Wu and G. K. Padhy, "Effect of ultrasonic vibration on welding load, temperature and material flow in friction stir welding," Journal of Materials Processing Technology, vol. 239, pp. 273-283, 2017.

[6] J. A. George G. Harman, "The ultrasonic welding mechanism as applied to aluminum- and gold-wire bonding in microelectronics," IEEE Transaction on parts, Vols. PHP-13, no. 1, December 1977.

[7] W. F. L. H. J. Z. Junhui Li, "Theoretical and experimental analyses of atom diffusion characteristics on wire bonding," JOURNAL OF PHYSICS D: APPLIED PHYSICS, vol. 41, 2008.

[8] M. L. J.-M. K. D.-W. K. C. W. Hongjun Ji, "Nano features of Al/Au ultrasonic bond interface observed by high resolution transmission electron microscopy," Materials Characterization, vol. 59, pp. 1419-1424, 2008.

[9] E. Mariani and E. Ghassemieh, "Microstructure evolution of 6061 O Al alloy during ultrasonic consolidation: An insight form electron backscatter diffraction," Acta Materialia, vol. 58, pp. 2492-2503, 2009.

[10] J. Sietins, J. Gillespie and S. Advani, "Transmission electron microscopy of an ultrasonically consolidated copper-aluminum interface," Journal of Materials Research, vol. 29, no. 17, pp. 1970-1977, 2014.

[11] J. W. G. J. S. G. A. T. A. B. Steve Koellhoffer, "Role of friction on the thermal development in ultrasonically consolidated aluminum foils and composites," Journal of Materials Processing Technology, vol. 211, no. 11, pp. 1864-1877, November 2011.

[12] A. Macwan and D. L. Chen, "Microstructure and mechanical properties of ultrasonic spot-welded copper-to-magnesium alloy joints," Materials and Design, vol. 84, pp. 261-269, 2015.

[13] C. Q. Zhang, J. D. Robson, O. Ciuca and P. B. Prangnell, "Microstructural characterization and mechanical properties of high power ultrasonic spot-welded aluminum alloy AA6111-Ti—Al6V4 dissimilar joints," Materials characterization, vol. 97, pp. 83-91, 2014.

[14] H. Peng, D. Chen and X. Jiang, "Microstructure and mechanical properties of an ultrasonic spot-welded aluminum alloy: The effect of welding energy," Materials, vol. 10, pp. 449-464, 2017.

[15] G. Liu, X. Hu, Y. Fu and Y. Li, "Microstructure and mechanical properties of ultrasonic welded joint of 1060 Aluminum alloy and T2 pure copper," Metals, vol. 7, pp. 361-371, 2017.

[16] A. Deshpande and K. Hsu, "Acoustoplastic Metal Direct-write: Towards Solid Aluminum 3D Printing in Ambient Conditions," Additive Manufacturing, vol. 19, pp. 73-80, 2018.

[17] A. Rusinko, "Analytical description of ultrasonic hardening and softening," Ultrasonics, vol. 51, pp. 709-714, 2011.

[18] E. G. Amir Siddiq, "Thermomechanical analyses of ultrasonic welding process using," Mechanics of Materials, vol. 40, pp. 982-1000, 2008.

[19] G.-Y. K. Z. W. L. F. Q. Z. D. M. Z. C. Zhehe Yao, "Acoustic softening and residual hardening in aluminum: Modeling," International Journal of Plasticity, vol. 39, pp. 75-87, 2012.

[20] H. Zhou, H. Cui, Q.-H. Qin, H. Wang and Y. Shen, "A comparative study of mechanical and microstructural characteristics of aluminum and titanium undergoing ultrasonic assisted compression testing," Materials Science & Engineering A, vol. 682, pp. 376-388, 2017.

[21] K. W. Siu, A. H. W. Ngan and I. P. Jones, "New insight on acoustoplasticity—Ultrasonic irradiation enhances subgrain formation during deformation," International journal on plasticity, vol. 27, pp. 788-800, 2011.

[22] A. Deshpande and K. Hsu, "Acoustic energy enabled dynamic recovery in aluminum and its effects on stress evolution and post-deformation microstructure," Materials Science & Engineering A, vol. 711, pp. 62-68, 2018.

[23] T. Sakai, A. Belyakov, R. Kaibyshev, H. Miura and J. J. Jonas, "Dynamic and post-dynamic recrystallization under hot, cold and severe plastic deformation conditions," Progress in Material Science, vol. 60, pp. 130-207, October 2013.

[24] K. Huang and R. E. Loge, "A review of dynamic recrystallization phenomena in metallic materials," Materials and Design, vol. 111, pp. 548-574, 2016.

[25] W. Blum, Q. Zhu, R. Merkel and H. J. McQueen, "Geometric dynamic recrystallization in hot torsion of Al-5Mg-0.6Mn," Materials Science & Engineering A, vol. 205, pp. 23-30, 1996.

[26] A. Hadadzadeh, F. Mokdad, M. A. Wells and D. L. Chen, "A new grain orientation spread approach to analyze the dynamic recrystallization behavior of a cast-homogenized Mg—Zn—Zr alloy using electron backscatter diffraction," Materials Science & Engineering A, vol. 709, pp. 285-289, 2018.

[27] A. M. Wusatowska-Sarnek, "The new grain formation during warm and hot deformation of copper," Journal of Engineering Materials and Technology, vol. 127, pp. 295-300, 2005.
[28] H. J. McQueen and C. A. C. Imbert, "Dynamic recrystallisation: plasticity enhancing structural development," Journal of alloys and compounds, vol. 378, pp. 35-43, 2004.
[29] H. J. McQueen, S. Spigarelli, M. E. Kassner and E. Evangelista, Hot Deformation and Processing of Aluminum Alloys, CRC press, 2011.
[30] W. H. Van Geertruyden, W. Z. Misiolek and P. T. Wang, "Grain structure in a 6061-aluminum alloy during torsion," Materials Science & Engineering A, vol. 419, pp. 105-114, 2006.
[31] H. J. McQueen and I. Poschmann, "Subgrain development in hot working of Al and Al-5Mg," Materials Science & Engineering A, vol. 1997, pp. 830-833, 1997.
[32] S. G. A. J. W. G. J. T. A. B. Gregory S. Kelly, "A model to characterize acoustic softening during ultrasonic consolidation," Journal of Materials Processing Technology, vol. 213, pp. 1835-1845, 2013.

What is claimed is:

1. An acoustic-energy deposition and repair system to deposit material from a feedstock material, the system comprising:
   at least one Directed Acoustic Energy Deposition (DAED) tool configured to apply acoustic energy to soften the feedstock material, the applied acoustic energy being selectable from at least one of three distinct vibrational modes to couple the acoustic energy from the DAED tool into the feedstock material to perform operations of material formation and material bonding; and
   a drive system to move the DAED tool in at least one of three-coordinate positions.

2. The acoustic-energy deposition and repair system of claim 1, wherein the three vibrational modes include a first transverse mode in a first direction, a second transverse mode in a second direction that is substantially orthogonal to the first direction, and a longitudinal mode.

3. The acoustic-energy deposition and repair system of claim 1, wherein the at least one of three vibrational modes is selected based on a crystalline structure of the feedstock material.

4. The acoustic-energy deposition and repair system of claim 1, wherein the at least one of three vibrational modes is selected based on a material-type selection of the feedstock material.

5. The acoustic-energy deposition and repair system of claim 1, wherein the feedstock material is selected from at least one material selected from materials including metals and polymers.

6. The acoustic-energy deposition and repair system of claim 1, further comprising at least one in-situ metrology tool mounted proximate to the DAED tool.

7. The acoustic-energy deposition and repair system of claim 6, wherein the at least one in-situ metrology tool is configured to measure at least one of a grain size of the deposited material and a surface-roughness value of the deposited material.

8. The acoustic-energy deposition and repair system of claim 6, wherein the at least one in-situ metrology tool is coupled to a control system of the DAED tool to measure, in substantially real time, a microstructure of the deposited material to achieve a desired microstructure of the material being deposited.

9. The acoustic-energy deposition and repair system of claim 6, wherein the at least one in-situ metrology tool includes at least one metrology tool selected from metrology tools including an atomic force microscope, an optical profilometer, a mechanical profilometer, a differentia-interference contrast microscope, and a scanning electron microscope.

10. The acoustic-energy deposition and repair system of claim 6, wherein the at least one in-situ metrology tool is configured to be driven separately from the DAED tool in at least one of three-coordinate positions.

11. The acoustic-energy deposition and repair system of claim 6, wherein the at least one in-situ metrology tool is configured to provide feedback control to the DAED tool based on a determination of a desired characteristic of the deposited material.

* * * * *